(12) United States Patent
Edwards

(10) Patent No.: US 11,070,573 B1
(45) Date of Patent: Jul. 20, 2021

(54) PROCESS TREE AND TAGS

(71) Applicant: Capsule8, Inc., Brooklyn, NY (US)

(72) Inventor: Brandon M. Edwards, Brooklyn, NY (US)

(73) Assignee: Capsule8, Inc., Brooklyn, NY (US)

( * ) Notice: Subject to any disclaimer, the term of this patent is extended or adjusted under 35 U.S.C. 154(b) by 19 days.

(21) Appl. No.: 16/698,918

(22) Filed: Nov. 27, 2019

Related U.S. Application Data

(60) Provisional application No. 62/773,892, filed on Nov. 30, 2018, provisional application No. 62/825,737, filed on Mar. 28, 2019.

(51) Int. Cl.
*G06F 21/55* (2013.01)
*G06F 21/57* (2013.01)
*H04L 29/06* (2006.01)

(52) U.S. Cl.
CPC ........ *H04L 63/1416* (2013.01); *G06F 21/554* (2013.01); *G06F 21/577* (2013.01); *H04L 63/1425* (2013.01); *H04L 63/1433* (2013.01)

(58) Field of Classification Search
None
See application file for complete search history.

(56) References Cited

U.S. PATENT DOCUMENTS

| | | |
|---|---|---|
| 5,991,856 A | 11/1999 | Spilo |
| 9,659,182 B1 | 5/2017 | Roundy |
| 10,033,759 B1 | 7/2018 | Kabra |
| 10,430,591 B1 | 10/2019 | Pratt |
| 2003/0023956 A1 | 1/2003 | Dulberg |
| 2004/0162061 A1 | 8/2004 | Abrol |
| 2005/0076237 A1* | 4/2005 | Cohen ............... G06F 9/468 726/4 |
| 2005/0132232 A1 | 6/2005 | Sima |
| 2005/0278706 A1 | 12/2005 | Garza |
| 2007/0078915 A1 | 4/2007 | Gassoway |
| 2007/0204257 A1 | 8/2007 | Kinno |
| 2008/0034430 A1 | 2/2008 | Burtscher |
| 2009/0116651 A1* | 5/2009 | Liang ............... H04L 9/321 380/278 |
| 2009/0216869 A1 | 8/2009 | Kennedy |
| 2010/0031360 A1 | 2/2010 | Seshadri |
| 2011/0219449 A1 | 9/2011 | St Neitzel |
| 2012/0204193 A1 | 8/2012 | Nethercutt |

(Continued)

FOREIGN PATENT DOCUMENTS

CN 106713277 5/2017

OTHER PUBLICATIONS

Ashwin Ramaswamy, Detecting Kernel Rootkits, Masters Thesis Proposal Dartmouth Computer Science Technical Report TR2008-627, Sep. 2, 2008.

(Continued)

*Primary Examiner* — Fatoumata Traore
(74) *Attorney, Agent, or Firm* — Van Pelt, Yi & James LLP

(57) ABSTRACT

Information associated with a process is received. At least a portion of the received information is used to modify a Process Tree. Modifying the Process Tree includes at least one of: (1) adding a Tag to the Process Tree and (2) modifying a Tag in the Process Tree. An Alert is generated based at least in part in response to determining that a Strategy has been matched.

35 Claims, 38 Drawing Sheets

(56) References Cited

U.S. PATENT DOCUMENTS

| | | | | |
|---|---|---|---|---|
| 2012/0324575 A1* | 12/2012 | Choi | ........................ | G06F 21/52 |
| | | | | 726/23 |
| 2015/0128250 A1 | 5/2015 | Lee | | |
| 2016/0042179 A1* | 2/2016 | Weingarten | ........... | G06F 21/566 |
| | | | | 726/23 |
| 2016/0378587 A1 | 12/2016 | Zhang | | |
| 2016/0381032 A1 | 12/2016 | Hashmi | | |
| 2017/0220795 A1 | 8/2017 | Suginaka | | |
| 2018/0060569 A1 | 3/2018 | Kim | | |
| 2018/0285561 A1 | 10/2018 | Frank | | |
| 2019/0138715 A1 | 5/2019 | Shukla | | |
| 2019/0180036 A1 | 6/2019 | Shukla | | |
| 2019/0243964 A1 | 8/2019 | Shukla | | |
| 2019/0311115 A1* | 10/2019 | Lavi | ........................ | G06F 21/44 |

OTHER PUBLICATIONS

David Long, Kprobes Event Tracing on Armv8, Linaro, Dec. 16, 2016.

Alexander M. Hoole, Security Vulnerability Verification through Contract-Based Assertion Monitoring at Runtime, 2016.

Andrey Konovalov, News and Updates from the Project Zero Team at Google, 2015.

Bala et al., Session Hijacking Prevention Using Magic Cookie with MAC, Asian Journal of Electrical Science, Aug. 2015.

Bjorn Dobel, Request Tracking in DROPS, Technische Universitat Dresden Fakultat Informatik, May 30, 2006.

Luhtala et al., Instrumentation of a Linux-Based Mobile Device, 2015.

Pohlack et al., Towards Runtime Monitoring in Real-Time Systems, Proceedings of the Eighth Real-Time Linux Workshop, 2006.

Sudhanshu Goswami, An Introduction to KProbes, Apr. 18, 2005.

Sun et al., The Study of Data Collecting Based on Kprobe, 2011 Fourth International Symposium on Computational Intelligence and Design, 2011.

Tian et al., An Online Approach to Defeating Return-Oriented-Programming Attacks, Cyberspace Safety and Security: 9th International Symposium, Oct. 2017.

Hossain et al., Sleuth: Real-time Attack Scenario Reconstruction from COTS Audit Data, Proceedings of the 26th USENIX Security Symposium, Aug. 2017.

* cited by examiner

```
# port
monitor_port: 9010 number of times to connect to nats on boot
initial_reconnect_attempts: 3 listen_addr: "unix:///var/run/capsule8/sensor.sock"

service:
  # arbitrary metadata as a string of key value pairs separated by an equal
  labels: "region=US-EAST-1 az=US-EAST-1A"

nats:
  url: nats://capsule8-server:4222
  client_cert_file: /etc/capsule8/client.crt
  client_cert_key_file: /etc/capsule8/client.key
  client_ca_cert: /etc/capsule8/nats_ca.crt
  # number of seconds to wait between reconnection attempts
  reconnect_wait: 5
  # number of reconnection attempts to try
  max_reconnects: 120
  # amount of telemetry data to buffer before droping events when disconnected
  # from the server in megabytes
  reconnect_buf_size_in_mb: 10 bundler:
  # number of telemetry events to bundle together into a single message that is
  # sent to the server
  events_per_message: 250
  # largest amount of latency
  flush_timeout: 100ms opentracing:
  # log spans to a jaeger instance (note we expect the agent to be configured locally)
  tracer_type: jaeger
  # log tracer information to standard out
  tracer_log: false debug: false embedded analytics package (coordinated with server)
use_analytics: true
```

FIG. 3

```
structure timeoutMap:
    hash map values[keys] to *uservalues
    hash map valueTimes[timestamps] to string keys
    timetree  (effectively a van emde boas / radix tree for timestamps)
    mutex Function NewTimeoutMap(timeoutInSeconds):
    allocate memory for timeoutMap
    initialize timeoutMap timetree
    run new thread with function timeoutThread(timeoutMap, timeoutInSeconds)
    return timeoutMap Function timeoutMap Retrieve(key)
    lock timeoutMap mutex
    value = timeoutMap.values.Get(key)
    unlock timeoutMap mutex
    return value Function timeoutMap Insert(key, value):
    lock timeoutMap mutex get clock time as Now
    timeoutMap.timetree.Insert(Now)
    timeoutMap.valueTimes[Now] = key
    timeoutMap.values[key] = value unlock timeoutMap mutex Function timeoutThread(timeoutMap, timeoutInSeconds):
    for ever loop:
        sleep timeoutInSeconds / 2   (this is arbitrary)
        lock timeoutMap mutex
        get clock time as Now
        timeoutTime = Now - timeoutInSeconds oldestTimeBeforeTimeout = timeoutMap.timetree.Search(timeoutTime)

if oldestTimeBeforeTimeout is not 0:
            timestamp = timeoutMap.timetree.First()
            while timestamp is greater than 0 and less than or equal to oldestTimeBeforeTimeout:

valueKey = timeoutmap.valueTimes.Get(timestamp)
                call timeoutMap.values.Remove(valueKey)
                call timeoutMap.valueTimes.Remove(timestamp)
                timestamp = timeoutMap.timetree.SeekAfter(timestamp)

timeoutMap.timetree.RemoveTimestampAndAllOlder(timestamp)

unlock timeoutMap mutex
```

FIG. 8

Securitybot APP 1:35 PM
There's an alert. Blocklisted Program Executed, that's associated with your username.
Here's some more information on the alert: — 1202

ID: /usr/tin/wget at 2019-03-03T18:34:27.0890100089Z
Container: N/A
Process: /usr/bin/wge:
User: peterm
Host: ubuntu1804
Rule: match programName == "/usr/bin/wget"

1204 — Did you do this?
Respond with either "yes" or "no" followed by an explanation in one message.

I'm sorry. I can't understand. Try saying help for more information.

pete 1:35 PM
yes

Securitybot APP 1:35 PM
Great! To confirm this I'm going to send a 2FA to your device. Are you ok with that? Respond with either "yes" or "no" on their own. — 1206

FIG. 12

| Purpose | Preferred Data Sources | Alternate Data Sources |
|---|---|---|
| Process Creation Monitoring | Tracepoint: task/task_newtask | Kprobe: do_fork or _do_fork *and* Tracepoint:sched/sched_process_fork |
| Cgroup Monitoring | Kprobe: __cgroup_procs_write *Or* Kprobe: __cgroup1_procs_write | Kprobe: attach_task_by_pid |
| Program Execution Monitoring | Kprobe: do_execveat_common | Kprobe: do_execve |
| Process Exit Monitoring | Kprobe: do_exit | N/A |
| Privilege Monitoring | Kprobe: commit_creds | N/A |
| Directory Monitoring | Kretprobe: set_fs_pwd | N/A |
| File Rename Monitoring | Kprobe: sys_renameat | N/A |
| File Delete Monitoring | Kprobe: sys_unlinkat | N/A |

FIG. 26

| CAPSULE8 | Alerts | Queries | System | | | Settings |
|---|---|---|---|---|---|---|

Alerts

View Resolved

Type to filter...

Learn about filters

☐ Resolve                           ⌐ ⌐   ↓       | Columns ∨ |

| ☐ | Time | Name | Description | Scope | Image |
|---|---|---|---|---|---|
| ☐ | 2018 Nov 06, 9:42:33 AM | Unauthorized Network Connection | The program "/usr/bin/curl" with PID 13416 in container "/k8s_capsule8-shell_capsule8-shell-... | Process | us.gcr.io/cap8-buil... |
| ☐ | 2018 Nov 06, 9:42:14 AM | Interactive Shell Executed | The interactive shell "/bin/bash" with PID 13264 was executed by the program "/usr/bin/doc... | Container | us.gcr.io/cap8-buil... |
| ☐ | 2018 Nov 06, 9:42:14 AM | Remote Interactive Shell Executed | The interactive shell "/bin/bash" with PID 13264 in container "/k8s_capsule8-shell_capsule8-s... | Process | us.gcr.io/cap8-buil... |
| ☐ | 2018 Nov 05, 5:26:36 PM | Interactive Shell Executed | The interactive shell "/bin/bash" with PID 13915 was executed by the program "/usr/bin/doc... | Container | us.gcr.io/cap8-buil... |
| ☐ | 2018 Nov 05, 5:26:36 PM | Remote Interactive Shell Executed | The interactive shell "/bin/bash" with PID 13915 in container "/k8s_capsule8-shell_capsule8-s... | Process | us.gcr.io/cap8-buil... |
| ☐ | 2018 Nov 05, 3:13:03 PM | Interactive Shell Executed | The interactive shell "/bin/bash" with PID 8572 was executed by the program "/usr/bin/dock... | Container | us.gcr.io/cap8-buil... |
| ☐ | 2018 Nov 05, 3:13:03 PM | Remote Interactive Shell Executed | The interactive shell "/bin/bash" with PID 8572 in container "/k8s_capsule8-shell_capsule8-sh... | Process | us.gcr.io/cap8-buil... |
| ☐ | 2018 Nov 05, 2:14:05 PM | Interactive Shell Executed | The interactive shell "/bin/bash" with PID 9833 was executed by the program "/usr/bin/dock... | Container | us.gcr.io/cap8-buil... |
| ☐ | 2018 Nov 05, 2:14:05 PM | Remote Interactive Shell Executed | The interactive shell "/bin/bash" with PID 9833 in container "/k8s_capsule8-shell_capsule8-sh... | Process | us.gcr.io/cap8-buil... |

Showing 1 - 9 of 9 results

FIG. 31

PROCESS TREE AND TAGS

CROSS REFERENCE TO OTHER APPLICATIONS

This application claims priority to U.S. Provisional Patent Application No. 62/773,892 entitled SECURITY PLATFORM filed Nov. 30, 2018 and to U.S. Provisional Patent Application No. 62/825,737 entitled SECURITY PLATFORM filed Mar. 28, 2019 both of which are incorporated herein by reference for all purposes.

BACKGROUND OF THE INVENTION

Malicious entities are increasingly targeting computer server infrastructure (e.g., corporate infrastructure, educational institution infrastructure, etc.). Unfortunately, keeping such systems up-to-date can be highly resource intensive. Accordingly, attackers often focus on exploiting unpatched systems with out-of-date software. Further, even in environments where infrastructure is diligently maintained, zero-day attacks can be used to exploit previously unknown flaws. There therefore exists an ongoing need to help secure computing infrastructure and minimize the efficacy of zero-day attacks on such infrastructure.

BRIEF DESCRIPTION OF THE DRAWINGS

Various embodiments of the invention are disclosed in the following detailed description and the accompanying drawings.

FIG. 3 illustrates an example /etc/capsule8/capsule8-sensor.yaml file.

FIG. 8 illustrates example pseudo code for implementing a timeout-drive hash map.

FIG. 12 illustrates an example of a bot querying a user.

FIG. 26 outlines example and fallback tracepoints and kprobes that Sensors use for core facilities, grouped by the purpose the telemetry serves.

FIG. 31 illustrates an example Alert interface.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Introduction and Architecture Overview

Figure 1A:
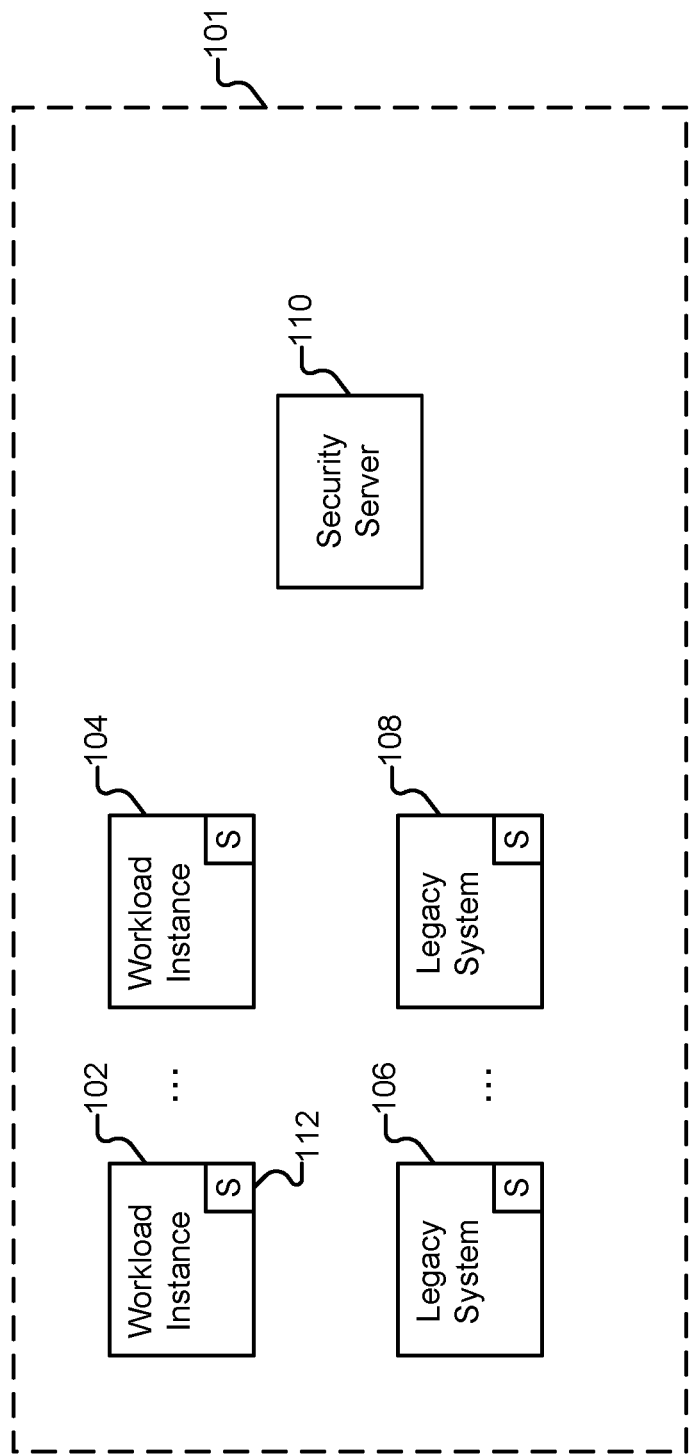
FIG. 1A illustrates an example of a computing environment in which security and other services are provided.

FIG. 1A illustrates an example of a computing environment in which security and other services are provided. Using techniques described herein, a typical flood of alarms and false positives can be reduced to a trickle of high value, high context Alerts of real time attacks. Included in FIG. 1A are logical components of an example corporate network (e.g., belonging to a fictitious company hereinafter referred to as "ACME"). The corporate network comprises both self-hosted and third-party hosted resources. Using techniques described herein, zero-day and other attacks can be detected, in real-time, and disrupted/otherwise mitigated. Further, the techniques described herein can scale detection to tens of thousands of nodes without impacting performance, and without deploying kernel modules.

Environment 101 includes a set of workload instances 102-104 hosted by a third party (e.g., cloud) provider. Example providers of such cloud-based infrastructure include Amazon (e.g., as Amazon Web Services), Google (e.g., as Google Cloud), and Microsoft (e.g., as Microsoft Azure). Environment 101 also includes a set of legacy computing systems 106-108 (e.g., a legacy database server, a legacy web server, etc. executing on hardware owned by ACME). Factors such as regulatory, performance, and cost considerations will impact how various embodiments of techniques described herein are deployed in various environments. The techniques described herein can also be used in other types of environments (e.g., purely self-hosted, purely third-party hosted, containerized, etc.).

Each of systems 102-108 has an associated sensor/analytics component (e.g., Sensor 112)—one per kernel. An example way of implementing Sensor 112 is using Go. The Sensor is configured to employ a variety of techniques to capture telemetry data. The analytics component can be collocated with the Sensor and can also be located remotely (e.g., on a different node). Telemetry and other data (e.g., as collected by the Sensor) are analyzed to generate events. Events (and combinations of events, as applicable) that match a Strategy pattern can be used to trigger real-time alerts and take other actions as applicable, such as strategically and automatically killing attacker connections and restarting workloads.

Further, analytics can also be optionally performed cluster wide (i.e., across multiple workload instances/servers) by using an optional security server 110 configured to harvest alerts and perform analytics on information received from each of systems 102-108. One example of a cross-node Strategy is a segfault, where, e.g., Apache is seen to crash five times. In a modern environment, e.g., with load balancers, connections may come in and Apache may crash in a variety of different locations. Attackers may intentionally try to spread out an attack across multiple nodes, hoping to hide among the occasional segfaults that happen in a production environment (and are sophisticated enough to avoid trying to segfault a single node 50 times). With a cross node strategy, Alerts can be accumulated until, e.g., a triggering threshold is reached (e.g., more than five crashes in an hour indicates the cluster is under attack). In this example, a local (to a single node) segfault strategy could be used to emit segfault events, and the cross node strategy could consume those events and generate its own (e.g., as thresholds are met), applying Tags to hosts indicating number of segfaults reported, etc. Other cross node strategies can also be used, e.g., with individual nodes providing information to security server 110, and security server 110 including Strategies that leverage the alerts produced by multiple nodes. A second example of a cross node strategy is a lateral movement strategy (e.g., where a report of compromise associated with a first node and a connection reported from a second internal node), can be matched to indicate that the compromised node is communicating with a different node.

Figure 30:
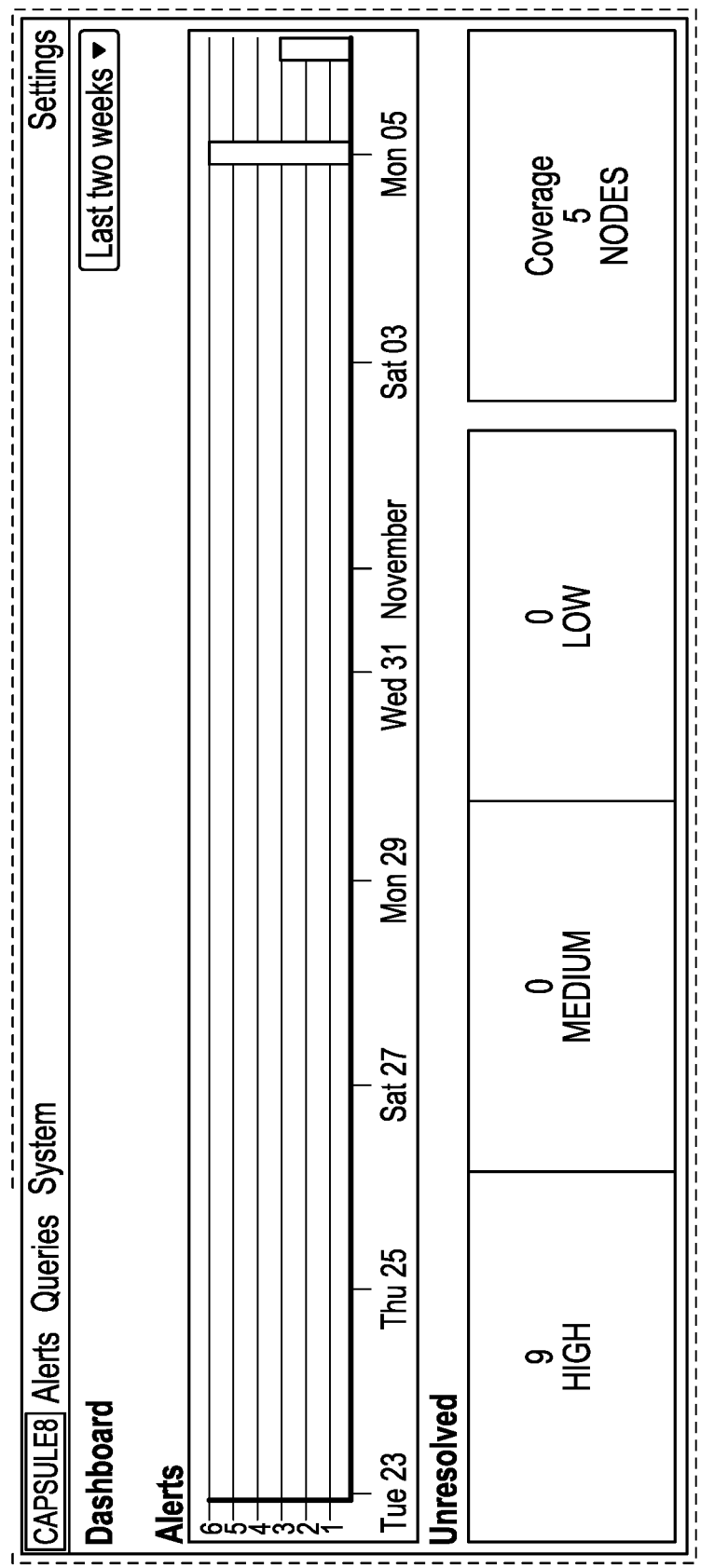
FIG. 30 illustrates an example dashboard.
Figure 32:
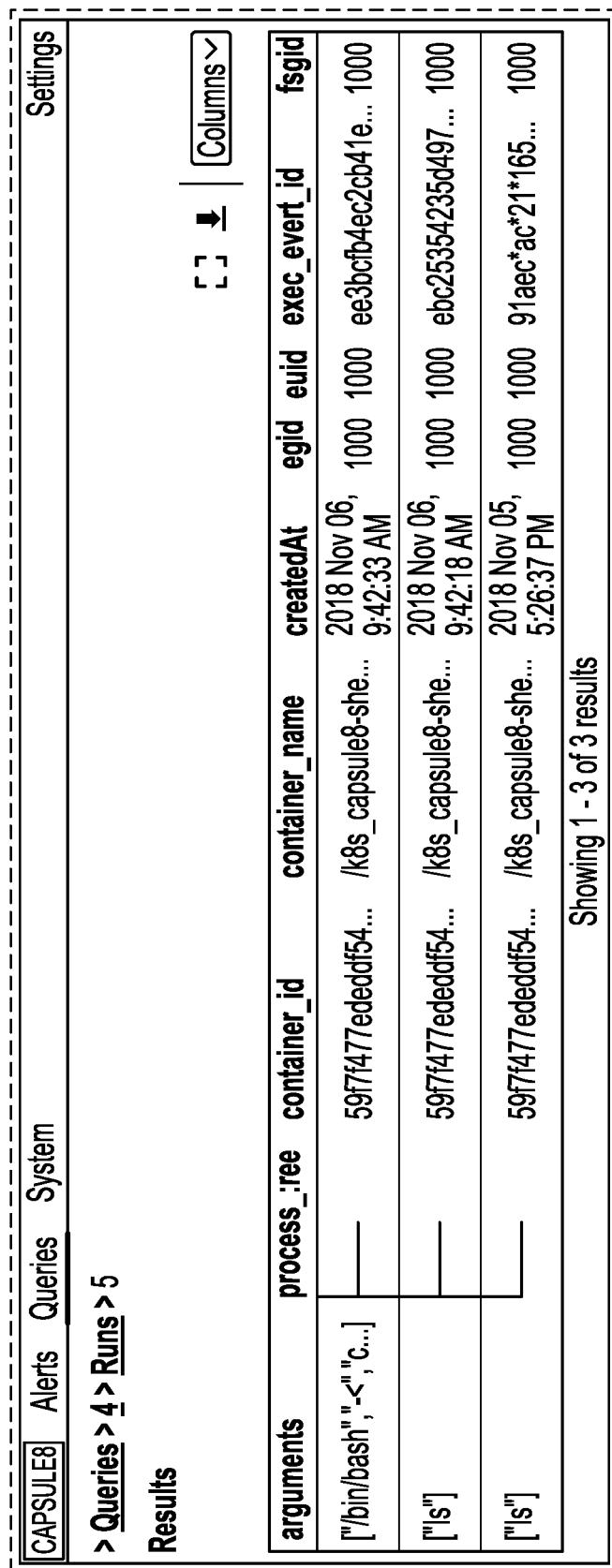
FIG. 32 illustrates an example query interface.

Server 110 also can perform other tasks, such as providing an administrative console/dashboard, deploying configuration, etc. An example dashboard is shown in FIG. 30. An example Alert interface is shown in FIG. 31. An Example query interface is shown in FIG. 32. In various embodiments, multiple security servers are deployed, e.g., for redundancy, performance, scaling, or segmentation reasons. Other infrastructure can also be optionally included in environment 101, such as an Elasticsearch, Logstash, Kibana ("ELK") Stack, third party logging service (e.g., Splunk), etc. Results generated using techniques described herein can be shared with such additional infrastructure instead of/in addition to sharing with server 110, as applicable. Similarly, information can be shared from such additional infrastructure with infrastructure described herein as implementing the techniques described herein. Results generated using techniques described herein can also be placed in a durable storage such as Amazon S3.

Figure 1B:
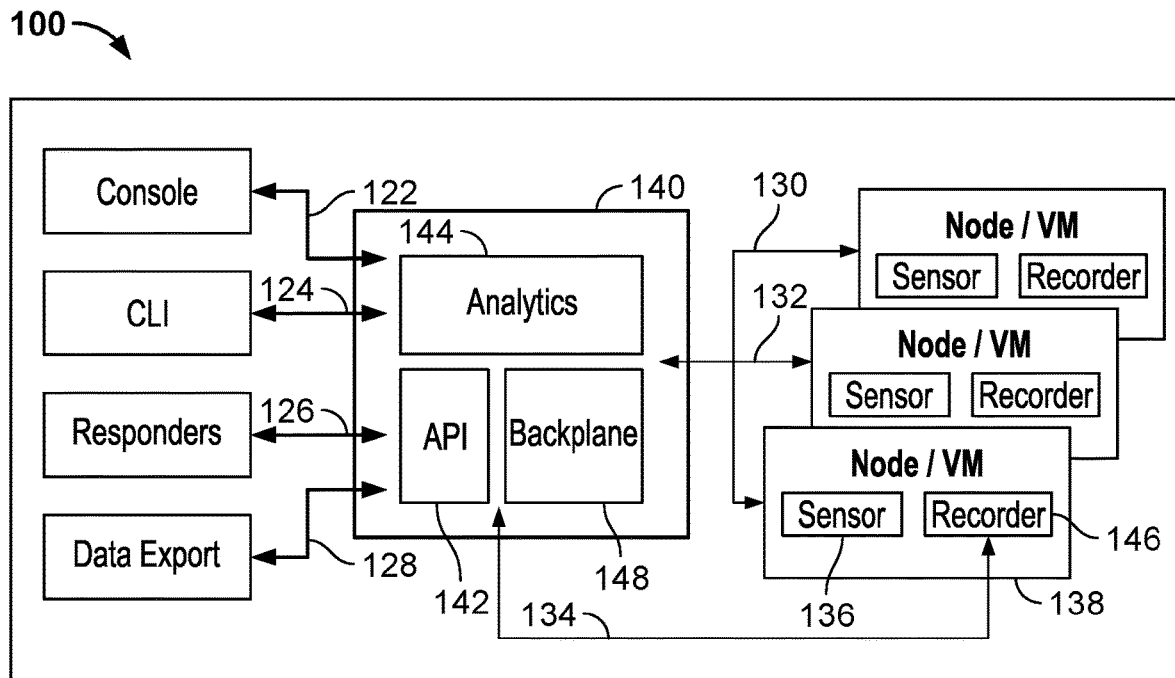
FIG. 1B illustrates a representation of a Platform.

Sensors 102-108 and optional Security Server 110 are collectively referred to herein as a Platform. In various embodiments, the Platform comprises middleware using go-micro and is built in a moonrepo structure that simplifies deployment and optimizes infrastructure to support automation (including integration testing and load/performance testing). An example representation of a Platform (100) is shown in FIG. 1B. As shown in FIG. 1B, sensors (e.g., sensor 136 which is an embodiment of sensor 112) collect security relevant telemetry from workload instances/nodes (e.g., node 138 which is an embodiment of workload instance 102). Server 140 (an embodiment of server 110) provides an API server/gateway 142 and embedded analytics 144 (an embodiment of analytics framework 400) to consume telemetry and produce Alerts. One example type of API clients that can communicate with server 140 is a set of Responders 126, each of which enacts a response action in response to an Alert. Other example types of API clients include a command line interface (124) and web application based console (122) for configuring various components of Platform 100, displaying Alerts, Alert responses, and/or other contextual information. Connections to durable or other storage can be made through one or more data export APIs (128) as applicable. As shown in FIG. 1B, backplane 148 includes a real-time messaging bus that connects Sensors (wherever they are deployed) to stream requested real-time events and, as applicable, historical events from an optional recorder 146 (also referred to herein as a "flight recorder") configured to locally store Event and other information. Responders 126, Sensors (e.g., Sensor 136), and Recorders (e.g., Recorder 146) are examples of backend services. In an example embodiment of Platform 100, communications/connections 122-128 are made using GRPC/Websocket, and communications/connections 130-134 are made using a Pub/Sub Message Broker. Other techniques can also be used, as applicable.

Figure 1C:
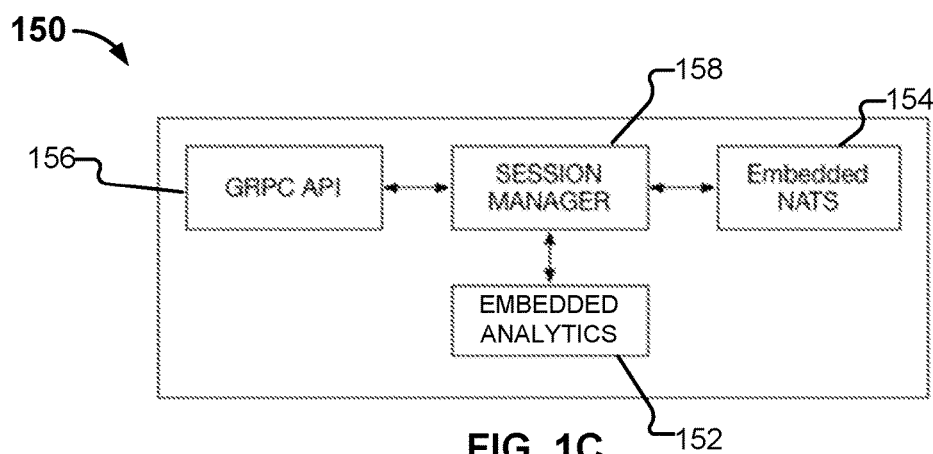
FIG. 1C illustrates an embodiment of an API Server.

FIG. 1C illustrates an embodiment of a single binary API Server. Multiple API servers can be meshed with one another using an appropriate embedded or other communications tool (e.g., NATS or Pub/Sub), transmitting change logs to each other (resulting in eventual consistency with fast convergence). As illustrated in FIG. 1C, in various embodiments, components of Platform 100, such as Analytics 144 can be embedded in the API server (e.g., as Embedded Analytics 152). Other functionality can also be embedded into an API server as applicable, such as Embedded NATS (154). Other components of the single binary API Server include a set of GRPC APIs that provide a frontend for external client facing APIs, and a Session Manager 158 that provides a façade over go-micro over NATS and raw NATS.

Figure 1D:
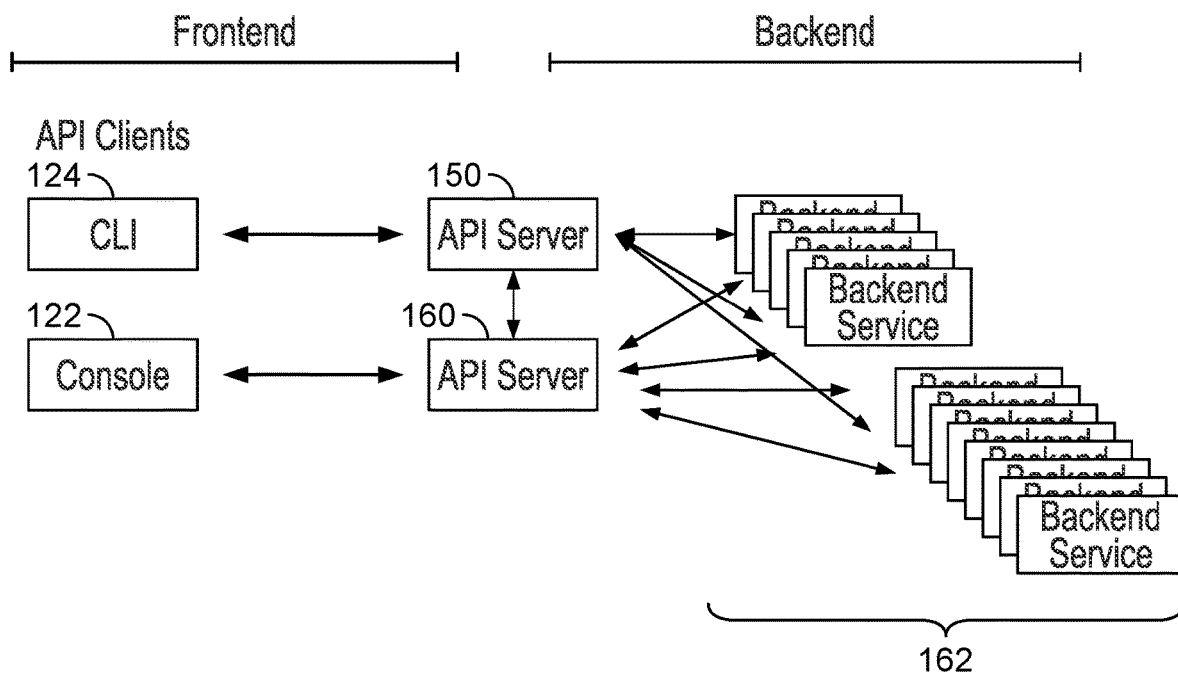
FIG. 1D illustrates various logical roles provided by a Platform.

An illustration of various logical roles provided by Platform 100 are shown in FIG. 1D. CLI 124 and console 122 communicate, respectively, with API servers (e.g., API server 150) using GRPC. API servers 150 and 160 communicate with one another using NATS clustering. Backend services 162 communicate with one another and API servers 150 and 160 using NATS or Pub/Sub as applicable.

Figure 1E:
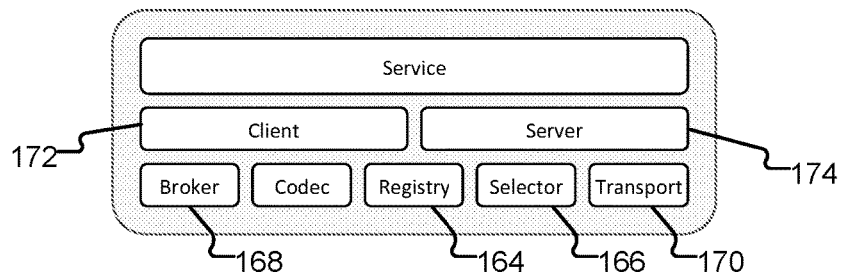
FIG. 1E illustrates a generic example of a go-micro microservice.

One way of implementing backend services 162 is as microservices defined using go-micro. A generic example of a go-micro microservice is illustrated in FIG. 1E. Other frameworks can also be used in conjunction with techniques described herein as applicable. Registry 164 provides a pluggable service discovery library to find running services, keeping track of service instances, metadata, and version. Examples of information collected (e.g., on boot of a service) include: whether or not it is running in a container, network interfaces, underlying node kernel version and node hostname, container host, and any user defined metadata (e.g., from config or environment). Selector 166 provides a load balancing mechanism via a metadata service/server metadata. When a client makes a request to a service it will first query Registry 164 for the service, receiving a list of running nodes representing the service. Selector 166 will select one of the nodes to be used for querying. Multiple calls to Selector 166 allow balancing techniques to be used. Broker 168 is a pluggable message interface (e.g., for Pub/Sub) and can be used to provide command and control. Transport 170 is a pluggable interface over point to point transfer of messages. Client 172 provides a way to make RPC queries. It combines Registry 164, Selector 166, Broker 168, and Transport 170. It also provides retires, timeouts, use of context, etc. Server 174 is an interface to build a running microservice. It provides a way of serving RPC requests.

In various embodiments, go-micro RPCs with selectors (relying on metadata) are used for individually calling RPCs on services and groups of services. Services that are configurable provide a Config method that takes their configuration as an argument and returns a response with a status code and any errors. Multiple components can be accomplished using go-micro selectors (e.g., selector 166) to direct queries to multiple components. An example of a configuration that can be made is, "cause these four Responders to ignore remote interactive shell alerts." Group commands can be sent using subscriptions to topics. A telemetry subscription example is "cause all sensors attached to this API server to start publishing data related to this subscription." In various embodiments, a reserved namespace (e.g., capsule8.*) is used for topics. Four example topics include:
  capsule8.<service>.commands: asynchronous commands that a service takes (e.g., capsule8.sensors.commands)
  capsule8.alerts: all Alerts are published here
  capsule8.alerts.responses: all Alert responses are published here
  capsule8.events: all status and error notifications are published here.

Figure 1F:
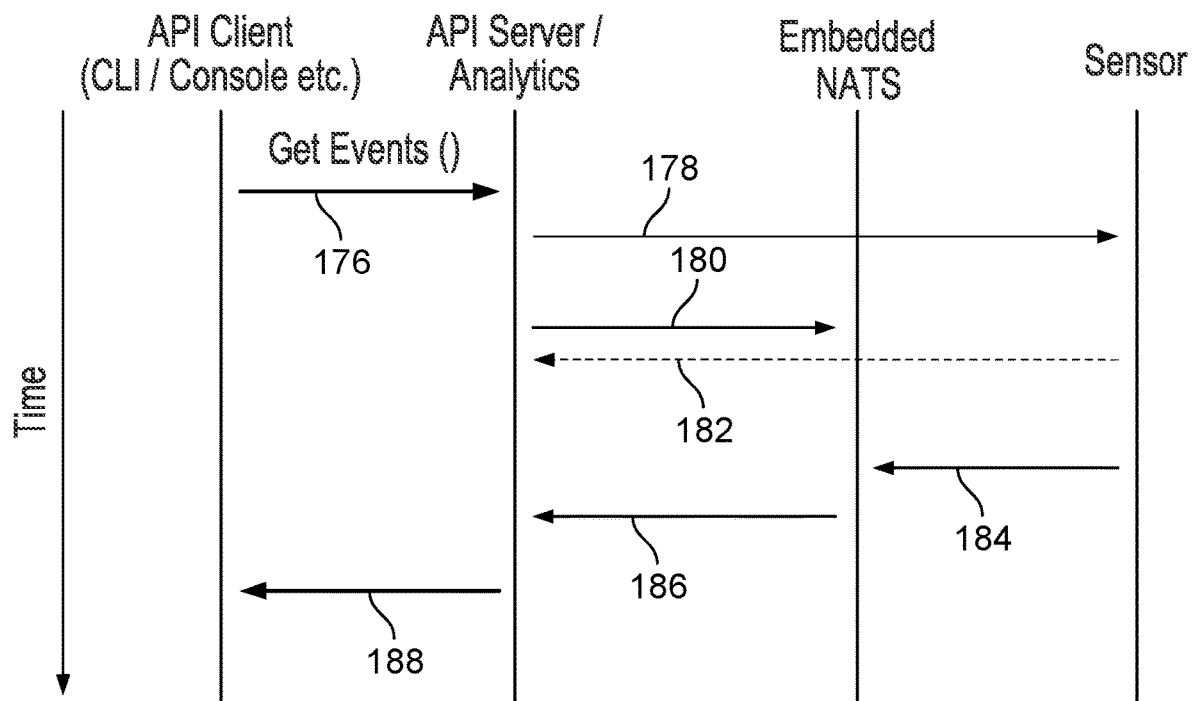
FIG. 1F illustrates an example data plane used by backend services.

FIG. 1F illustrates an example data plane used by backend services. As shown, the data plane uses go-micro to negotiate NATS/PubSub for a topic and have services publish directly to it, avoiding framing costs. An API Client (e.g., CLI 124, console 122, etc.) initiates a request for Events from an API server (e.g., API server 150), e.g., using GRPC API 156 (indicated by line 176). Session manager 158 picks a NATS topic and sends it to one or more sensors, e.g., using go-micro (indicated by line 178). Session manager 158 begins listening to the NATS topic, e.g., using direct NATS, e.g., provided by embedded NATS 154 (indicated by line 180). The sensor sends a sub response, e.g., using go-micro (indicated by line 182). The sensor also creates a subscription and begins sending telemetry to the NATS topic, e.g., using direct NATS (indicated by line 184), the API server receives events as NATS messages (indicated by line 186), and forwards them to the client, e.g., using GRPC (indicated by line 188).

Figure 1G:
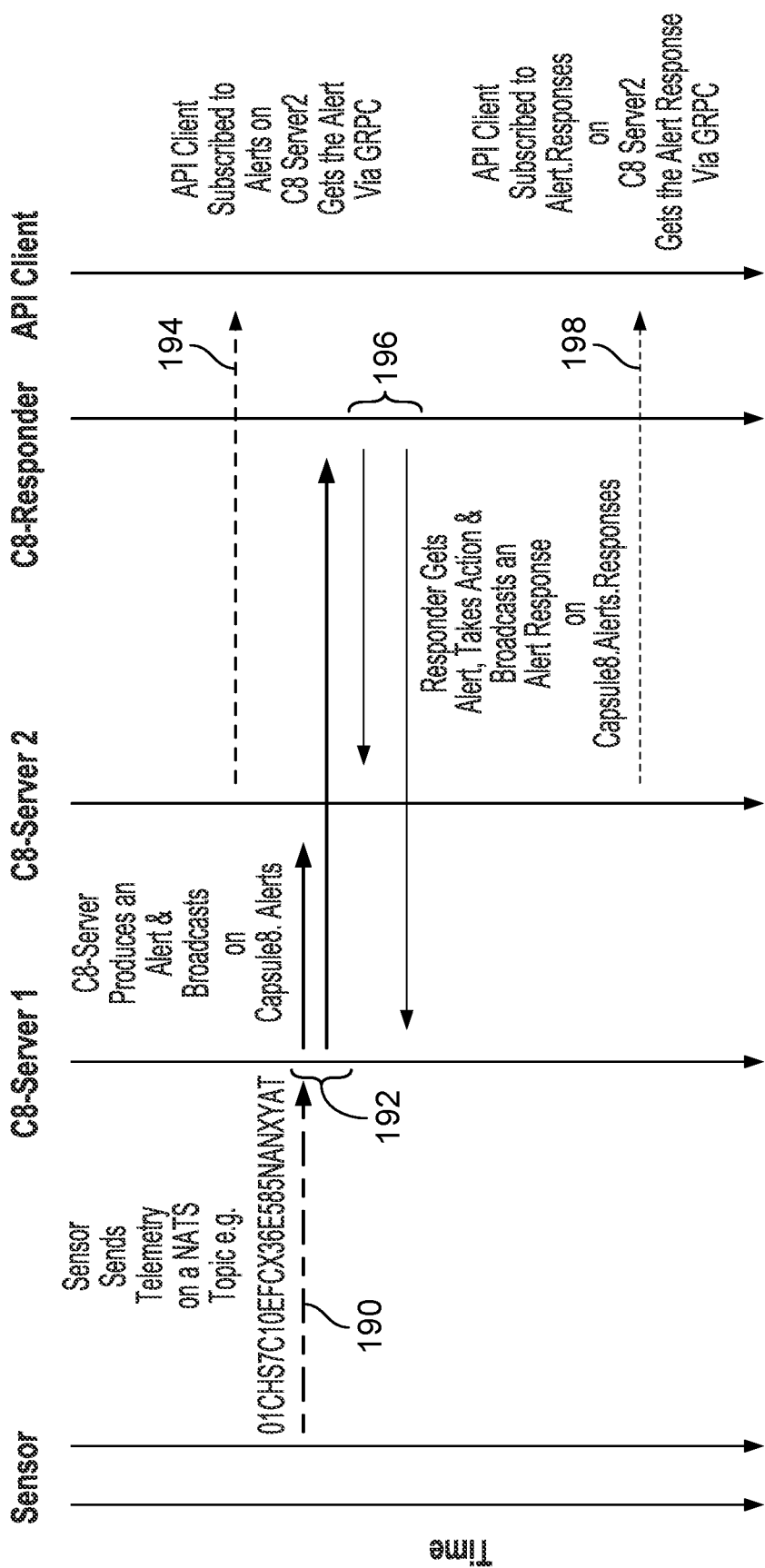
FIG. 1G illustrates an example of how various components of a Platform react as messages propagate.

FIG. 1G illustrates how various components of Platform 100 react as messages propagate. In the example shown, a Sensor, two Servers, a Responder, and an API client are shown. The Sensor sends telemetry on a NATS topic (190). The first server produces an Alert and broadcasts it on capsule8.alerts (192), resulting in the second server and responder receiving a copy of the Alert. The API client is subscribed to Alerts via the second server, and gets a copy of the Alert via GRPC (194). When the Responder receives the Alert, it takes action and broadcasts an Alert Response on capsule8.alerts.responses (196), resulting in the second server and first server receiving a copy of the Alert Response. The API Client is also subscribed to Alert.Responses via the second server and will also get a copy of the Alert Response via GRPC (198).

II. Sensors

In the following discussion, suppose Alice is a computer administrator of infrastructure 100 or portions thereof (e.g., in a security operations role). One way that Alice can deploy a Sensor (e.g., Sensor 112) to a node (e.g., workload instance 102) is by obtaining a package (e.g., a statically compiled binary) and installing it using whatever manner is appropriate to the existing deployment management infrastructure used by environment 100 (e.g., using "rpm -i"). The installer for Sensor 112 does not modify the kernel of workload instance 102 (i.e., Sensor 112 is deployed in userland) and places configuration/binary files in an appropriate location, such as /etc/capsule8 (for configuration files), /var/lib/capsule8 (for library files), and /user/local/bin (for binary files). Capabilities such as CAP_SYS_ADMIN and CAP_DAC_OVERRIDE are used (without root) to set kernel probes. As applicable, Sensor 112 can also be deployed as a container.

A. Initialization

Figure 2:
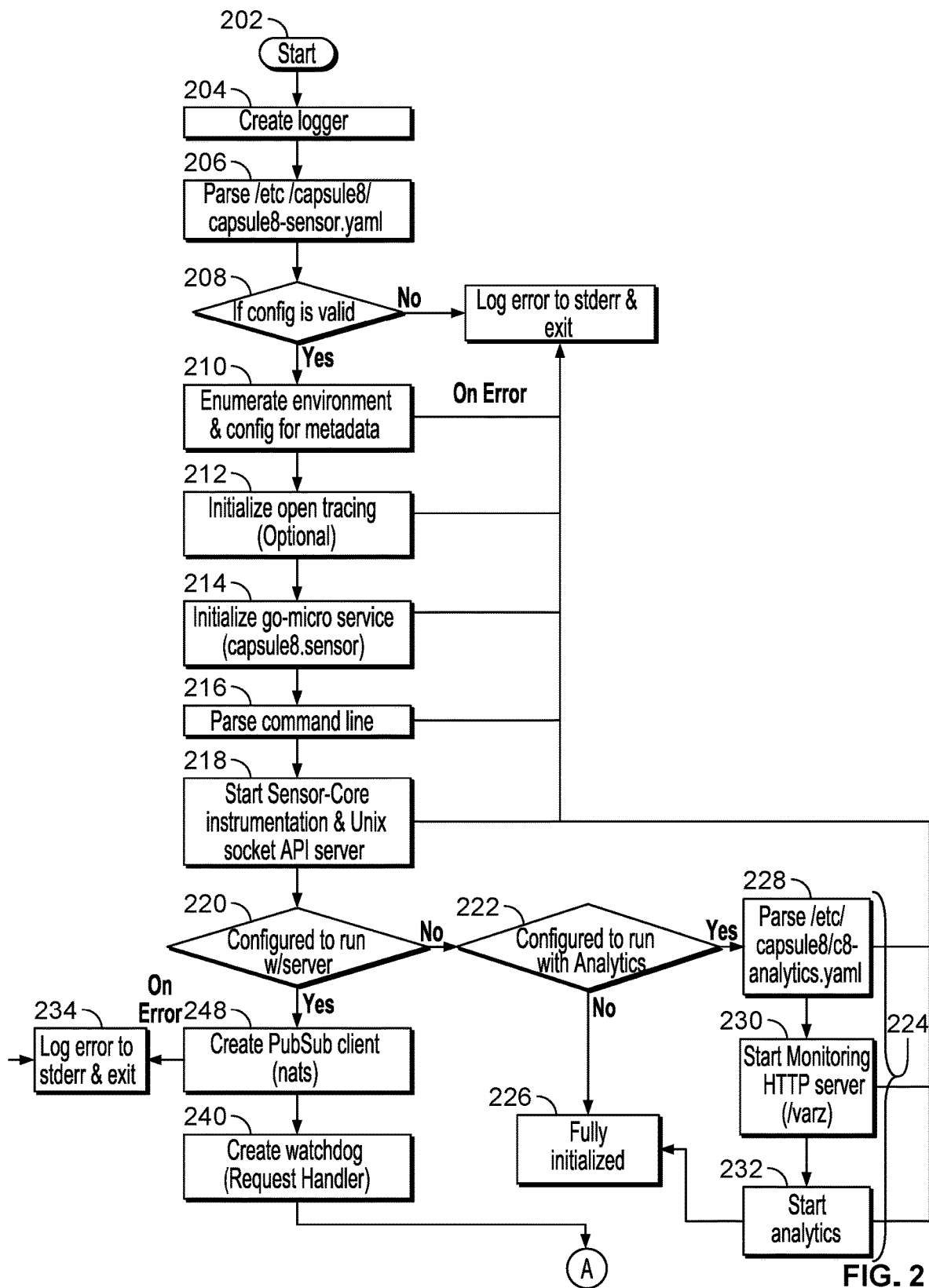
FIG. 2 illustrates example actions taken from when a Sensor is started through when it begins handling subscription requests.
Figure 2:
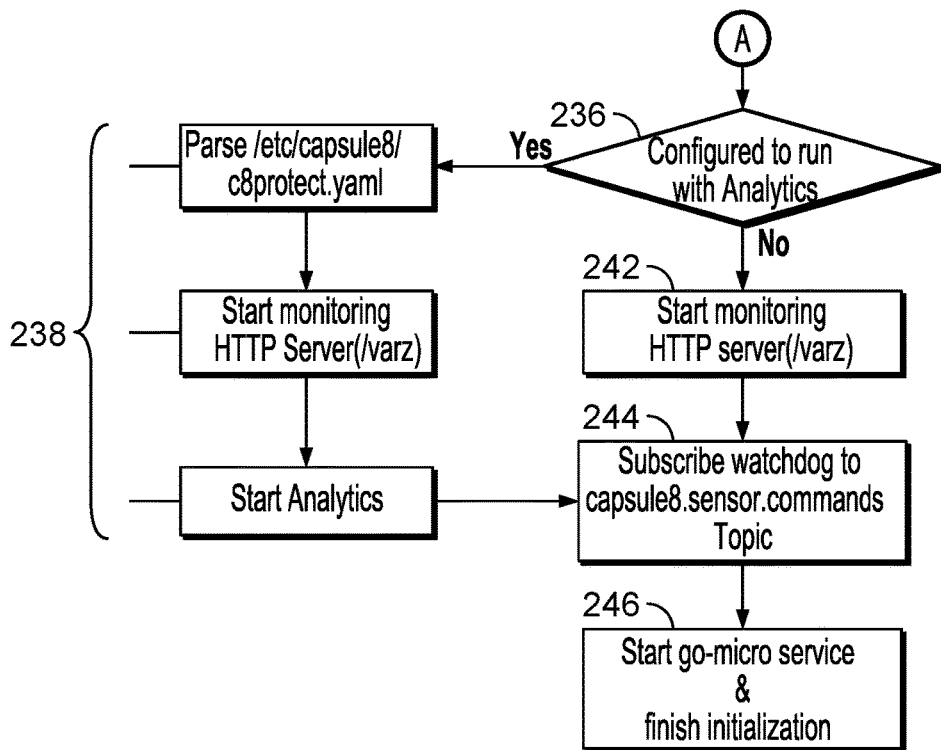

Sensor 112 will be started at boot time and loads an appropriate configuration. If a Sensor is deployed in a container environment, it can be run as a daemon set. An example way that Sensor 112 can initialize itself is in accordance with the process shown in FIG. 2. In particular, FIG. 2 illustrates actions taken from when the Sensor is started through when it begins handling subscription requests. As illustrated in FIG. 2, the actions begin with a common path and then diverge depending on whether the Sensor was configured to work with security server 110.

1. Common Steps a. Creating the Logger and Config

After initial execution (202), a logger object is created (204). One example way to implement the logger is using a logrus instance. An optional local configuration is read (206), and if valid (208), a configuration object is created to store the configuration.

b. Determining Metadata

The Sensor then enumerates its environment and configuration for metadata (210). This metadata is later fed to the go-micro service and/or embedded analytics instance described in more detail below. Examples of metadata that can be collected include:

Cloud metadata such as AZ and region the Sensor is running in,
The container runtime that the Sensor is running in, if any,
Reading files from the file system to determine OS,
OS Version,
Host networking interfaces,
Underlying node hostname, and
Kernel version.

Additionally, these properties can be defined as a set of key value pairs via the configuration or CAPSULE8_LABELS environment variable. Additional information on Environmental Variables is provided below. These properties are then stored internally in a go map of type map[string]string in which a normalized key value stores the value (e.g., CAPSULE8_SENSOR_ID) to store the Sensor ID.

c. Go-Micro Service Initialization and Command Arg Processing

The next major step is the configuration of the go-micro Service options. This can include NATS options and other PubSub options, as applicable, used by go-micro's Broker, Transport and Service Registry. This can be abstracted away using the micro_options package to facilitate using other PubSub or other go-micro supported transport protocols, such as consul or Google PubSub.

A go-micro Service instance is initialized with the metadata (214) and the command line options are parsed (216), e.g., using go-micro's Flag module. In embodiments where the Sensor-Core is using glog, go-micro's command line processing is used to set go's flag packages options. The config can also be checked to see if an OpenTracing tracer should be created, and if so (212) added to the service so that it may be used for debugging. At this point, command line arguments are parsed using the go-micro Services' Init method.

d. Sensor-Core Initialization & Unix Socket API

After creating the service and parsing the command line options, the Sensor-Core is initialized (218). The Sensor-Core instance instruments the kernel, and provides telemetry. This is started with an ID that is shared with the go-micro service. Additionally the Sensor's API server is started on a Unix socket at /var/run/capsule8/sensor.sock. This server handles the API presented by the Open Source Sensor.

After initializing the Sensor-core the Sensor checks its configuration to see if it is configured to run with a security server (e.g., security server 110) (220). In various embodiments, this step is replaced by one that does instrumentation initialization based on the metadata values enumerated earlier.

2. Running without the Server

By default Sensor 112 does not attempt to connect to server 110. If the config option in use_analytics is set to true in/etc/capsule8/capsule8-sensor.yaml or the environment variable CAPSULE8_USE_ANALYTICS=true (222), then the embedded analytics is started (224). Otherwise, initialization is complete (226).

a. Initializing Analytics

If the embedded Analytics was enabled via configuration, the function startEmbeddedProtect is called. This function first reads the Analytics configuration file /etc/capsule8/capsule8-analytics.yaml (228). If it encounters an error parsing the file the error is returned and it is treated as a fatal error.

After parsing the Analytics config, a standalone in a Sensor Analytics CommsClient instance is created, with a reference to the Sensor-Core instance, and the Analytics varz handler. The CommsClient is responsible for connecting the embedded Analytics to the Sensor and ensuring that Alerts and MetaEvents are emitted somewhere that they can be retrieved or published on the backend. Alerts are a special kind of Event created from one or more Events that entities may wish to receive notifications of MetaEvents are Events of interest that are published back to the platform via the API. The CommsClient's constructor takes an argument for a NATS client in the event that this function was called with the server option (248). In that case the CommsClient would use that to publish the Alerts and MetaEvents to server 110.

Upon successful creation of the CommsClient, an instance of the Analytics Gateway 404 is created with a reference to the CommsClient and the Analytics config. The Gateway is responsible for creating and configuring Strategies used by the embedded Analytics. It provides an internal API for Strategies and also acts as an intermediary with a Platform API and Arbiter (e.g., Arbiter 408). In the event that the Gateway failed to be created an error is returned by the function and treated as a fatal error.

After the Gateway is created, its Run method is called to start the Analytics instance. An example way to do this is as a go routine with a recover so that any unexpected panics do not crash the whole Sensor. Instead, such errors will merely cancel the subscription of events used by the Analytics at which point it will be restarted, and resubscribe in the new instance, as all previous state will have been lost. These errors are logged to stderr.

After starting the Analytics instance (232), the monitoring server is started and the Sensor waits for a SIGINT, or a SIGTERM to signal shutdown. At this point initialization without the server is finished (226).

b. Starting the Monitoring Server

The Sensor runs an embedded webserver to serve version (/version), healthcheck (/healthz), and metrics information (/varz). This server is started (230, 242) on a port specified by the monitor_port config option in/etc/capsule8/capsule8-sensor.yaml or the environment variable CAPSULE8_MONITOR_PORT.

If the Sensor was configured to run with a server, then the/healthz endpoint reports on its connected status returning a 200 HTTP status code if it is successfully connected to the Capsule8-Server or 500 otherwise.

If the Sensor was configured to run without the server this returns a 200 status code as its health is essentially represented by whether or not the process is running.

The /varz endpoint contains memory allocation statistics and other metrics specific to the Analytics. If the Sensor was configured to run without the embedded Analytics then these metrics will be blank.

3. Running with the Server

The following section describes how the Sensor is initialized if it was configured to run with the server after the common initialization steps (202-220). Two ways to connect the Sensor (e.g., Sensor 112) to the Security Server (e.g., Security Server 110) are to set either the config option run_without_server or the environment variable CAPSULE8_RUN_WITHOUT_SERVER to the string true.

a. Connecting to the Server Backend

If the Sensor is configured to run with the server after completing the common initialization steps, it then creates an embedded NATS client (248). This is a wrapper around the official NATS golang client library that reads in the configuration object and updates the settings accordingly, for things like TLS certificates.

The constructor for the embedded_nats client immediately attempts to connect to the Server specified by the nats.url config option (also 'CAPSULE8NATS_SERVER' env var) and returns an error if it is unable to connect. The Sensor by default attempts to connect three times to the specified Server, waiting 10 seconds in between attempts. If the Sensor is unable to connect to its Server, then this is considered a fatal error and the Sensor exits, logging that it could not connect (234). If the connection to the NATS server was successful then the embedded Analytics is started (238), if configured to do so (236).

b. Starting the Handler and the Watchdog

A request handler is created that contains all of the logic for handling telemetry API subscriptions from the Server (240). This provides the session handling and Telemetry serialization and bundling logic and tracks subscriptions. This is then passed to a WatchDog instance which supervises these subscriptions and any errors they may produce, logging the errors. The WatchDog contains one method and a reference to the Sensor-Core instance. This is used primarily to connect go-micro events on the topic capsule8.sensor.commands to the request handler which starts the subscriptions via the Sensor-Core instance tracking their subscriptions in the specified session. After the WatchDog is created, it is then registered to listen to the capsule8.sensor.commands topic (244).

c. Starting the go-Micro Service

The go-micro service (capsule8.sensor service) is then started when the .Run( ) method is called and executed until an error is encountered. This should not happen unless actively terminated. The Sensor is now started (246).

B. Environmental Variables

This section describes example environment variables and configuration file values used by embodiments of sensor 112. By default, the Sensor looks in /etc/capsule8 for a capsule8-sensor.yaml file, an example of which is shown in FIG. 3. Values from this file are read first and then values from environment variables override these values. Configuration file values are written as object.subobject. As one example, the following YAML entry:

nats:

url: nats://localhost:4222 is written as nats.url.

Various example environmental variables and default values used by a Sensor (e.g., Sensor 112) are as follows:

| Variable Name | Configuration File Value | Type | Meaning | Default | Example |
|---|---|---|---|---|---|
| CAPSULE8_CONFIG | N/A | string | Alternate location and name of the capsule8-sensor.yaml file | /etc/capsule8/ capsule8-sensor.yaml | CAPSULE8_CONFIG = /var/run/myconfig.yaml |
| CAPSULE8_LABELS | service.labels | string | a string of key value pairs separated by = metadata about the sensor host | " " | CAPSULE8_LABELS = "mtahost = true" |
| CAPSULE8_DEBUG | debug | boolean | whether or not to enable debugging/ profiling features and logging | false | CAPSULE8_DEBUG = true |
| CAPSULE8-NATSURL | nats.url | string | The address of the Capsule8 Server's NATS instance | nats://localhost: 4222 | |
| CAPSULE8-NATSMAX_RECONNECTS | nats.max_reconnects | integer | number of times the client should attempt to reconnect after it's already been connected | 10000 | CAPSULE8-NATSMAX_RECONNECTS = 3 |
| CAPSULE8-NATSRECONNECTBUFSIZEINMB | nats.reconnectbufsizeinmb | integer | amount of data to buffer in the event of a disconnection in megabytes | 10 | CAPSULE8-NATSRECONNECTBUFSIZEINMB = 1 |
| CAPSULE8-NATSRECONNECT_WAIT | nats.reconnect_wait | integer | number of seconds the NATS client should wait between connection attempts | 10 | CAPSULE8-NATSRECONNECT_WAIT = 3 |
| CAPSULE8-NATSCLIENTCERTFILE | nats.clientcertfile | string path to x509 certificate | A TLS client certificate to present to the Capsule8 Server NATS instance (must be used with CAPSULE8NATS-CLIENTCERT-KEY_FILE) | " " | CAPSULE8-NATSCLIENTCERTFILE = /home/user/client.crt |

| Variable Name | Configuration File Value | Type | Meaning | Default | Example |
| --- | --- | --- | --- | --- | --- |
| CAPSULE8-NATSCLIENTCERT-KEY_FILE | nats.client-certkey_file | string path to x509 certificate key | The path to the key for the certificate in CAPSULE8NATS-CLIENTCERT-FILE ( must be used with CAPSULE8NATS-CLIENTCERT-FILE) | " " | CAPSULE8-NATSCLIENTCERT-KEY_FILE = /home/user/client.crt |
| CAPSULE8-NATSCLIENTCACERT | nats.clientcacert | string path to x509 CA certificate | An additional TLS CA certificate to use to verify the client. By default the system CAs are used | " " | CAPSULE8-NATSCLIENTCA-CERT = /usr/local/cas/myCA.crt |
| CAPSULE8-INITIALRECON-NECT_ATTEMPTS | initialreconnect-attempts | integer | the number of times the sensor attempts to connect to the server before giving up at startup | 3 | CAPSULE8-INITIALRECON-NECT_ATTEMPTS = 8 |
| CAPSULE8-MONITORPORT | monitor_port | integer | TCP port to serve health checks, version, varz and profiling endpoints | 9010 | CAPSULE8-MONITORPORT = 9999 |
| CAPSULE8-LISTENADDR | listen_addr | string | socket address for the sensor telemetry service to listen on (can be a unix socket) | unix://var/run/ capsule8/sensor.sock | CAPSULE8-LISTENADDR = localhost:8443 |
| CAPSULE8-EVENTSPER_MES-SAGE | bundler.events-permessage | integer | number of telemetry events to send to the server at a time, useful for microbatching/ controlling network impact of the sensor | 1 | CAPSULE8-EVENTSPER_MES-SAGE = 250 |
| CAPSULE8-EVENTSFLUSH_TIME-OUT | bundler.flush_time-out | duration string | maximum amount of time Telemetry Events can stay buffered in the sensor before being sent to the Capsule8 Server | "100 ms" | CAPSULE8-EVENTSFLUSH_TIME-OUT = "250 ms" |
| CAPSULE8-OPENTRACING-TRACER_TYPE | opentrac-ing.tracer_type | string | a supported open tracing implementation right now only jaeger is supported | " " | CAPSULE8-OPENTRACING-TRACER_TYPE = jaeger |
| CAPSULE8-OPENTRACING-TRACER_LOG | opentrac-ing.tracer_log | boolean | log opentracing information to standard out | false | CAPSULE8-OPENTRACING-TRACER_LOG = true |
| CAPSULE8USE ANALYTICS | use_analytics | boolean | activate embedded analytics package (activate's further configuration for analytics) | true | CAPSULE8USE ANALYTICS = false |
| CAPSULE8-TRIGGERON | trigger_on | boolean | enable the event trigger | true | CAPSULE8-TRIGGERON = false |
| CAPSULE8-TRIGGER-INTERVAL | trigger_interval | time.Duration | set the event trigger interval | 10 s | CAPSULE8-TRIGGER-INTERVAL = 1 s |

| Variable Name | Configuration File Value | Type | Meaning | Default | Example |
| --- | --- | --- | --- | --- | --- |
| CAPSULE8-TRIGGER-SYSCALL | trigger_syscall | enum string | set the event trigger syscall | "setxattr" | CAPSULE8-TRIGGER-SYSCALL = setxattr |

C. Hard Resource Limits

As applicable, Sensor 112 can be configured to stay under CPU/RAM/other resource thresholds. A hard stop can be used (e.g., at a certain amount of CPU or RAM usage) at which point throttling/dropping of data can be performed so that performance of the node being monitored is not adversely impacted. This section describes the design, implementation, and usage of the Sensor's hard resource limiting capabilities. One example way to enforce such limitations is by using Linux cgroups under the CPU and Memory subsystems. The cgroup the Sensor uses is called capsule8-sensor. The implementation uses a supervisor process which executes and monitors the actual sensor. This accomplishes multiple desired behaviors. First, this forces all routines of the Sensor process to reside in the cgroups. Since the supervisor process must be done as the root user, this design also allows for dropping privileges of the Sensor by executing the child process as a separate user. It also allows the supervisor process to restart the child sensor process when it exits and to monitor the sensor process for performance and violations.

1. Usage

The resource configurations are read in from the sensor's configuration file. This is by default at/etc/capsule8/capsule8-sensor.yaml. The path can be changed using the configuration file with the CAPSULE8_CONFIG environment variable. The following section describes the hard resource limit configuration fields.

a. Configuration

The following are fields that can and should be set in the Sensor configuration file. They are also bound to environment variables.

use_supervisor—A Boolean value specifying whether or not to use the supervisor, and therefore the hard resource limits.
Environment Variable: CAPSULE8_USE_SUPERVISOR
Example: true, false
Default: false use_resource_limits—A Boolean value specifying whether or not to use the hard resource limiter functionality of the supervisor.
Environment Variable: CAPSULE8_USE_RESOURCE_LIMITS
Example: true, false
Default: false memory_limit—The exact amount of memory that the Sensor process is allowed to consume. This is a string ending in G (gigabyte) or M (megabyte). A special value of "0" indicates no limit.
Environment Variable: CAPSULE8_MEMORY_LIMIT
Example: 512M, 1G, 0
Default: 256M cpu_limit—The percentage of total CPU time that the Sensor will be allowed to be scheduled for. This is a float value with no suffix. A special value of 0 indicates no limit.
Environment Variable: CAPSULE8_CPU_LIMIT
Example: 10.0, 15, 20.5, 0
Default: 10.0 sensor_user—The user that the Sensor process will run as. This is a string of the user name.
Environment Variable: CAPSULE8_SENSOR_USER
Example: myuser, root, grant
Default: capsule8 log_cgroup_metrics—A Boolean value specifying whether or not to log cgroup metrics to stderr. This is on two minute intervals.
Environment Variable: CAPSULE8_LOG_CGROUP_METRICS
Example: true, false
Default: false b. Verification One way to determine that the cgroup configuration is properly working is by using the "top" utility. When running, the memory and CPU usage of the Sensor process should be shown in the form of percentages of total resources. For CPU, the Sensor should never go above the configured CPU limit multiplied by the amount of cores on the machine (the shell utility nproc will print number of cores). For memory the percentage of the machine's total memory can be calculated, which is displayed in top in KiB by default.

2. Violations and Monitoring

The cgroups for memory and CPU handle violations differently. When the sensor process runs out of memory it will be killed by the kernel and restarted by the supervisor process. The CPU cgroup uses a concept of periods and quotas. The period is a configured amount of time and the quota refers to a number of microseconds per period. The Sensor uses a period of one second and the quota is based on the configured percentage. When the Sensor process has used up its quota of CPU time it will be throttled, meaning it will not be scheduled on the CPU until the end of the period. Both of these will have effects on the Sensor's coverage of telemetry events. The cgroup exposes statistics about CPU throttling which are then exposed by the supervisor process via logs to stderr. This can be turned on via the log_cgroup_metrics configuration option.

3. Restarts

When the Sensor child process exits for cgroup violations, or otherwise, the supervisor process will restart it. This event is logged to stderr.

D. Analytics Framework

Figure 4:
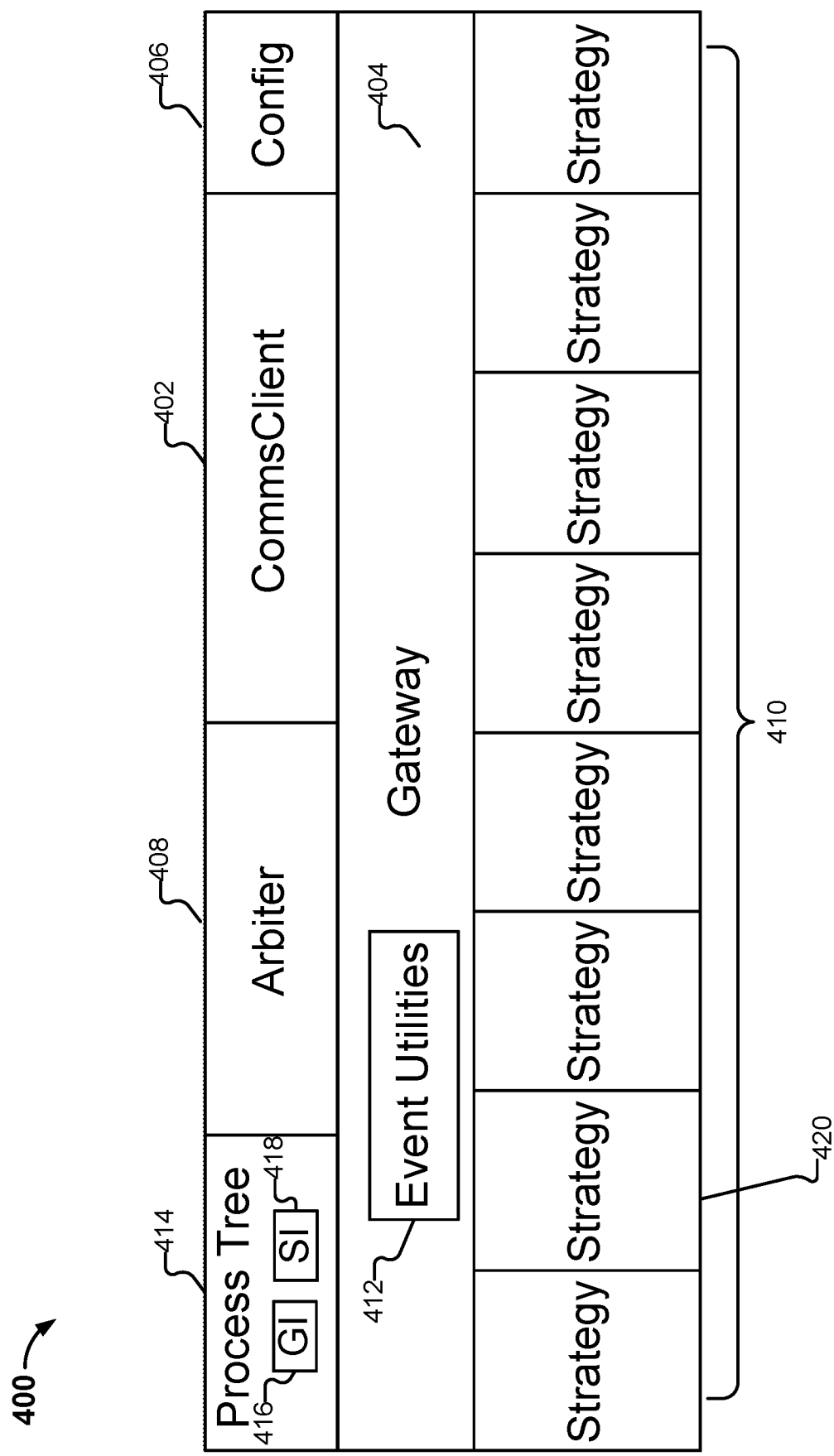
FIG. 4 illustrates an embodiment of an analytics framework.

FIG. 4 illustrates an embodiment of an analytics framework. The framework can be used by a Sensor (e.g., Sensor 112) when analytics support has been configured (e.g., at 222 or 236 in FIG. 2) and can also be used by other components in other embodiments (e.g., a standalone Analytics module working in conjunction with a telemetry source).

CommsClient 402 contains logic for retrieving telemetry subscriptions and for publishing Alerts and Events of interest. It interfaces with an API server or other mechanism configured to generate Events. It gathers external data that a Factory can translate into/produce Events for consumption by other components of Framework 400 (and/or components of Platform 100, as applicable). One way of implementing CommsClient 402 is as a callback paradigm, to allow Gateway 404 to register callbacks for when Events are received on different topics. CommsClient 402 is also responsible for discovering the API server, which it does via configuration 406. Config 406 is a configuration package that provides a configuration registry built (in an example embodiment) on top of the Go configuration tool, Viper. Strategies or other components register their configuration within a section of a configuration instance from the configuration package.

Gateway 404 is used to initiate each of the components of the framework and their respective configurations. It is at this initiation time that each component registers its default configuration values with the Config instance. After initialization is complete, Gateway 404 collects all of the Event types needed by each of the Strategies and components and creates a subscription with Platform 100 via CommsClient 402. It is then used to route Events from the Comms instance to each of the Strategies and to relay any subsequent Alerts or Events of interest to the Arbiter. It then passes any Alerts from Arbiter 408 to the CommsClient instance to publish them on the given alerting topic. Gateway 404 also provides services for Strategies 410 to use so as to consolidate logic that would be used across multiple Strategies, such as Process Tree 414, which consumes Events and maintains a map of process relationships using the Events.

Event Utilities 412 is a set of utilities used by Gateway 404 that consume and enrich data that will be used by Strategies 410, producing higher level Events and/or updates to durable storage. Event Utilities can take actions such as generating additional Events, Generating MetaEvents, and augmenting Process Tree 414. Each Utility included in the set of Event Utilities 412 provides a single-source for state tracking that would otherwise need to be repeated across multiple Strategies, significantly reducing overhead.

Figure 5:
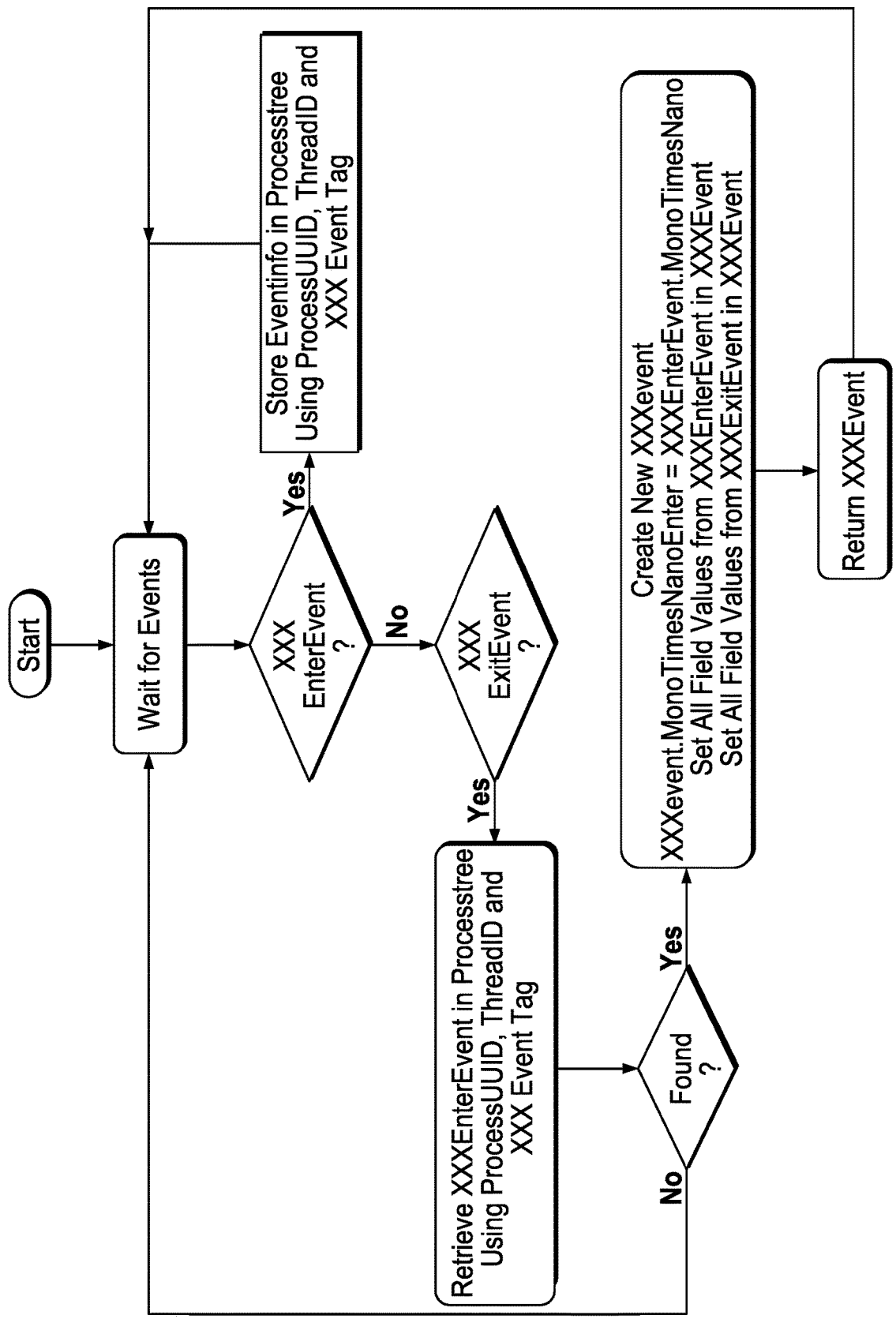
FIG. 5 illustrates an example state diagram for the Event-Combinator Utility.

An example prototype for HandleEvent for each Utility is: HandleEvent(event *ProtectEvent, utilities *UtilityInterface) ([ ]ProtectEvent.Event, [ ]metaevent.Event, error). Examples of different Utilities included in Event Utilities 412 are as follows:

EventCombinator: Combines call (enter) Events and return (exit) Events from telemetry for a variety of syscall and network events, in order to match caller arguments with the returned value, and to know that the call completed and how long it took. Every received XXXEnter Event is stored in ProcessTree 414 using its ProcessUUID, ThreadID, and XXXEventTag. When an XXXExit Event is received, the corresponding Enter event is retrieved using ProcessUUID, ThreadID and XXXEventTag, and then XXX Event (combined of XXXEnter and XXXExit) is returned. If two consecutive Enter events occur, the first is ignored. If an Exit occurs before an Enter the Event is also ignored. Examples of Events combined by EventCombinator include: DUP, DUP2, DUP3, Mprotect, Mmap, Brk, Connect, Accept, Bind, Sendto, and Recvfrom. An example state diagram for the EventCombinator Utility is shown in FIG. 5.

CurrentWorkingDirectory: Collects directory related events and manages the current-working-directory tags for processes in Process Tree 414.

Interactivity: Monitors for behaviors indicating that a process is TTY-aware or otherwise interactive, and applies a tag appropriately.

Shell: Monitors executed programs to determine if they are shells, and tags them appropriately.

Figure 6:
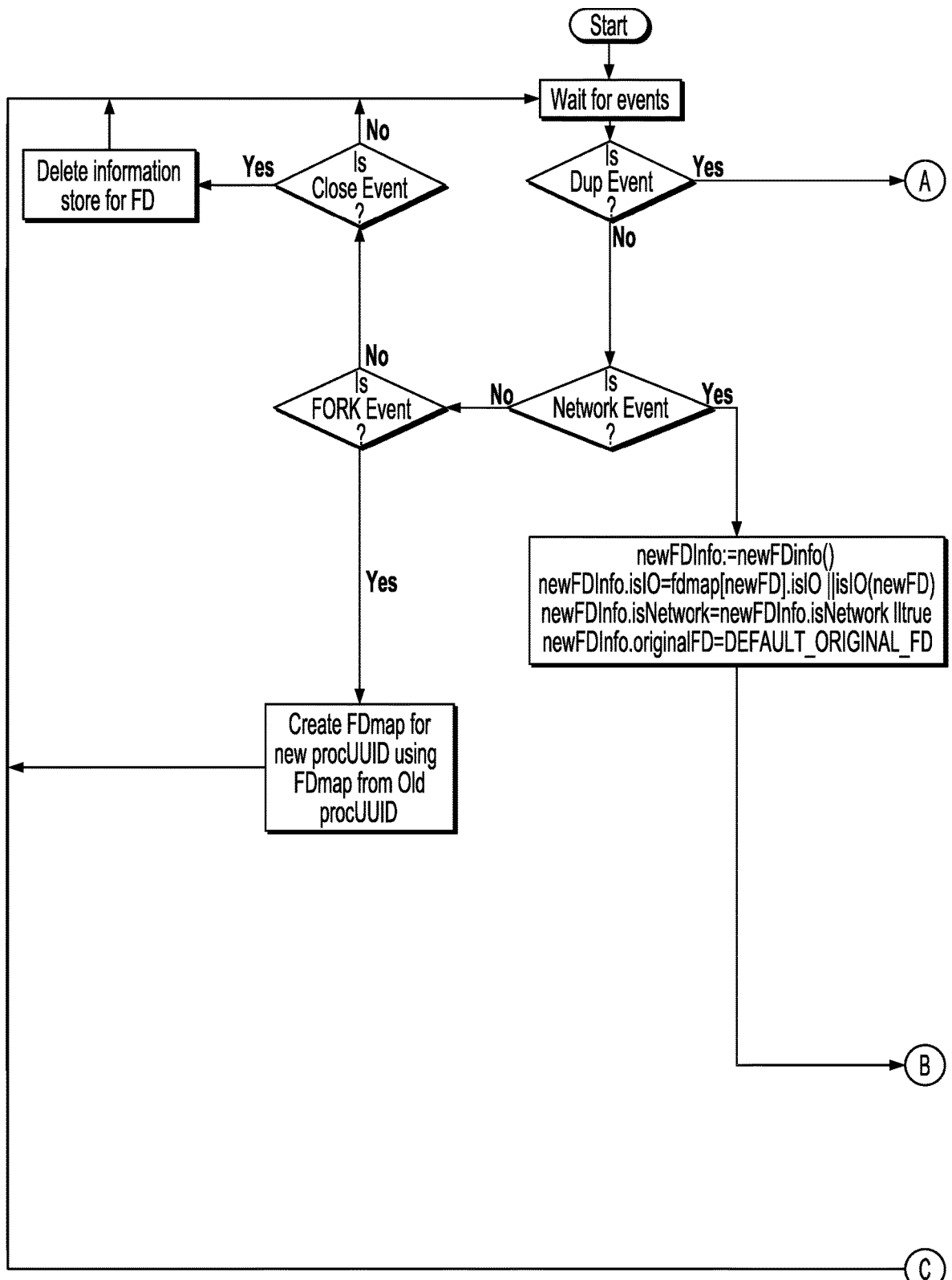
FIG. 6 illustrates an example state diagram for the Network Bound I/O Utility.
Figure 6:
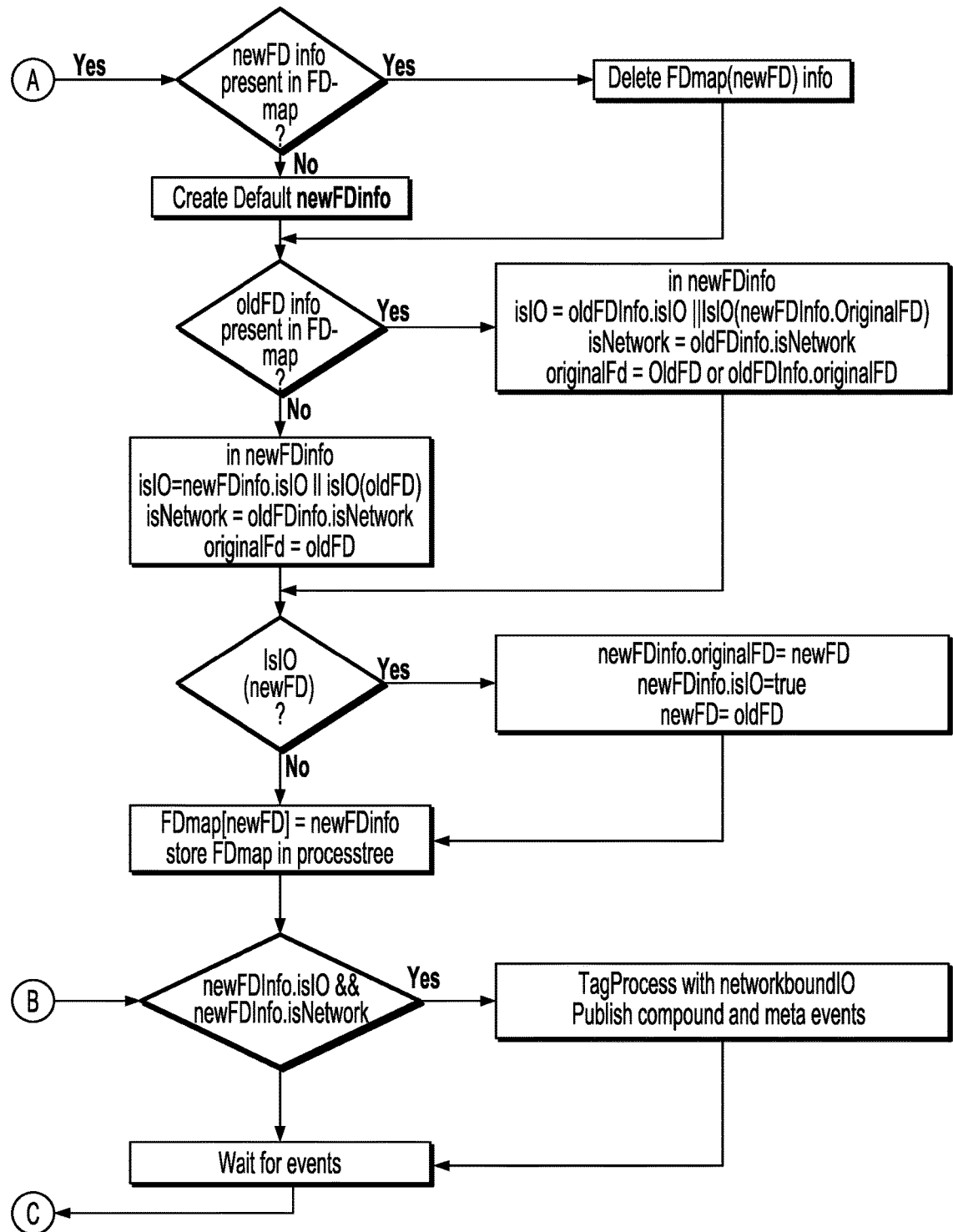

Network Bound I/O: Uses tags to track the socket descriptors and use of descriptor mapping functions to determine if a process has its Standard Input/Output descriptors mapped to sockets. In particular, the Network Bound I/O Utility consumes FORK, DUP, DUP2, DUP3, Accept, Connect, and Close Events. It correlates I/O file descriptors to network file descriptors, and generates Compound Events and MetaEvents. An example state diagram for the Network Bound I/O Utility is shown in FIG. 6.

Network Event: Tracks network connections by consuming network related Event data and emitting higher-level network Events. The following is an example list of Events consumed (e.g., scalar sys call hooks), and can vary based on the amount of Sensor information available: sys_connect, sys_connect return, sys_accept, sys_accept return, sys_bind, sys_bind return, sys_listen, sys_listen return, and sys_close. Example logic for handling network information is as follows. From the sys_connect, the socket descriptor (and in the future sockaddr struct) is recorded. On return of sys_connect, one of the following would be generated: (1) if the connect was successful, emit a NETWORK_EVENT_CONNECT describing all information recorded; (2) if the connect was not successful, emit a NETWORK_EVENT_CONNECT_ATTEMPT describing information recorded and reason for failure. Both of these can also be a MetaEvent. From the sys_bind, the socket descriptor (and, as applicable, sockaddr struct) is recorded. On return of sys_bind: (1) if successful, the information would be stored for future tracking across sys_listen and sys_accept; (2) if not successful, emit a MetaEvent indicating a failed attempt to bind. From the sys_listen: on sys_listen success, emit a NETWORK_EVENT_LISTEN event, and matching MetaEvent. From the sys_accept record the socket descriptor (and, as applicable, record client sockaddr): on sys_accept emit a NETWORK_EVENT_ACCEPT describing the socket descriptor. From sys_close, retrieve the argument: if the argument is a socket descriptor emit a NETWORK_EVENT_CLOSE.

Network Service: Observes calls to listen on a port, and tags the process as a network service.

Privileges/UID: Tracks the user ID/group ID and related IDs for a process, along with Events to change those, and thus tracks if a process has gained privileges legitimately.

Process Tree: A mechanism for keeping track of processes and their tags. Process Tree 414 is a special case Event Utility. It is the first component to consume Events, so that it can be aware of processes prior to any other component and be prepared for queries on those processes. Process Tree 414 is exposed to the other Event Utilities 412 and Strategies 410 through interface(s) that allow the other Event Utilities and Strategies so that they can query the tree and add information (e.g., tags) to the processes in the tree. Tags are used to associate information to processes. There are two types of tags: "Tags," and "Private Tags." Tags are used by almost all components to associate and query information about processes. Tags can be associated to a process in three ways: (1) Process only: this associates data to a process which is not inheritable by descendants (e.g., "has touched filesystem"); (2) Inheritable: an attribute which begins with this process and is inherited by its descendants during process creation (e.g., "Network Service" or "Interactive Shell"); and (3) Inherited: attributes which were inheritable at some point in the process's lineage. Private Tags are only exposed to Utilities themselves, so that they can store additional (potentially incomplete) state information without exposing it to other components. Private Tags are all process-only (no automatic propagation is performed by the Process Tree). Process Tree 414 includes a Gateway Interface 416 and a Strategy Interface 418. Gateway Interface 416 is used by Gateway 404 and other components, such as Event Utilities 412 to perform special operations which are not exposed to Strategies. These operations include: private tagging, process lineage, and the ability to manipulate core Process Tree components. Strategy Interface 418 allows Strategies to query process tags and associate new tags.

Stack Bounds: Tracks the recorded start/stop of the stack, updating it as the kernel may grow the stack, to determine acceptable bounds for the stack pointer (to detect exploitation).

Strategies 410 represent the functional logic used to convert a stream of Events into a set of Alerts. Strategies follow a strategy pattern, and implement an interface that abstracts how a given Strategy handles Events via a HandleEvents method which can return a slice of Alerts, a slice of MetaEvents, or an error. Gateway 404 will call the HandleEvents method when it has received an Event from CommsClient 402. Additionally, the interface defines the Events needed by the Strategy, and its configuration options. A Strategy registers its configuration options with Config 406's registry when it is created. By default, all Strategies have at least one configuration option, which indicates whether the Strategy is enabled or not. A SetConfig method of the Strategy interface is called once at startup and then subsequently when a configuration message is received from Gateway 404.

Arbiter 408 provides logic for Alert filtering and is ultimately what determines whether an Alert should be emitted. It is a rule system and uses an Alert filter to discard Alerts generated by Strategies. An instance of Arbiter 408 is created when the analytics framework starts and a reference to it is held by Gateway 404. During this startup phase, Arbiter 408 gets its configuration from the Config 406. Arbiter 408 uses its own filter language which is configured via the Arbiter's configuration filters value. It expects one filter per string entry in the filters configuration value.

Additional detail regarding various components of the analytics framework are provided in various sections below.

III. Process Tree and Tags

A. Process Tree

As mentioned above, Process Tree 414 is both a core data structure and a utility in Event Utilities 412. The Process Tree is used by other utilities in Event Utilities 412, and by Strategies 410 to assign and retrieve process and program information, and to track program state via Tags.

All Event Utilities and Strategies implement a HandleEvent callback function, and the Process Tree is special in that it is the first of any to have its HandleEvent callback called for all telemetry and Events. This is to ensure that it has pre-populated process and program structures before any other Event Utilities or Strategies attempt to query the Process Tree or set/retrieve Tags.

Figure 7:
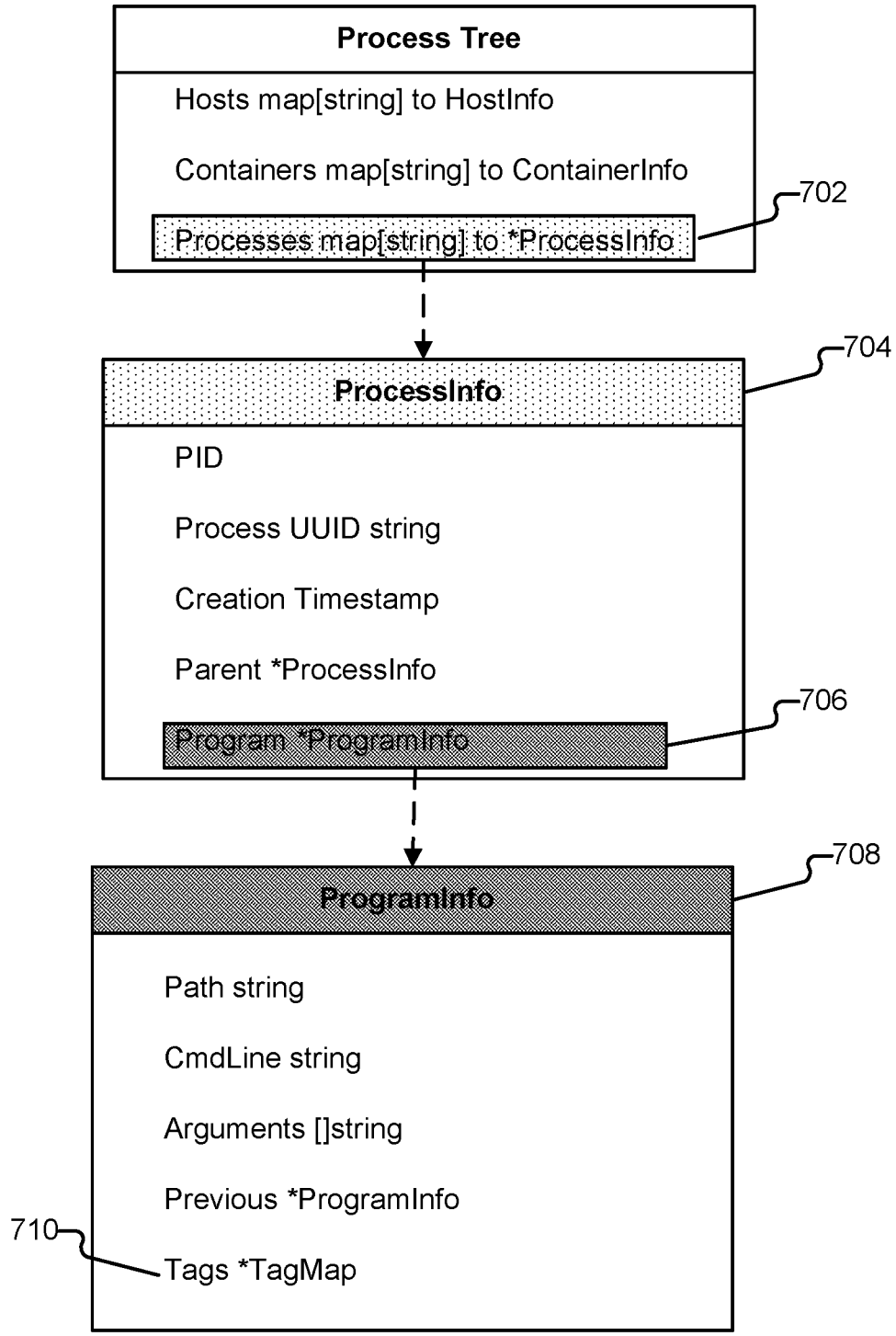
FIG. 7 illustrates basic Process Tree structures and their relationships.

Basic Process Tree structures and their relationships are depicted at a high level in FIG. 7. The Process Tree tracks host information, container information, and process information in ProcessInfo structures. The Process element of the tree (702) is used to resolve a pointer to a corresponding ProcessInfo structure (704) from the process' unique ID/UUID and is stored in a timeout-driven hash map. Example ways of implementing a timeout-driven hash map include using a data structure such as a Van Emde Boas tree or radix tree in conjunction with timestamp management (referred to herein as a "timetree"). Example pseudo code for implementing a timeout-driven hash map is shown in FIG. 8.

The ProcessInfo structure tracks information about the process, which is treated separately from the program currently running in that process. The ProcessInfo entries in the hash map are keyed by each respective process' unique identifier string (e.g., process UUID). Event Utilities 412 and Strategies 410 access information about processes in the tree by specifying the respective process UUID when calling Process Tree functions. The timeout-driven hash map is used to expire entries if they have not been accessed within a given time window. Additional detail about the design and operation of these timeout-driven hash maps is provided below. Each ProcessInfo structure tracks information relevant to the process, such as PID, time of creation, and (among other things) a structure member Program (706) which is a pointer to a ProgramInfo structure (708) representing the currently running program. The ProgramInfo structure contains information about programs currently running in processes. This structure is where Tags (710) are stored, which are used for tracking the state of the program and the process in whole. The ProgramInfo structure is separate from the ProcessInfo structure because a process is not bound to host one program during its existence—calling the exec system call invokes a new program into the calling process (and processes may exec an arbitrary amount of times).

B. Tags

Event Utilities 412 and Strategies 410 can store and access state information related to processes and programs using Tags. Tags are accessed via a data structure called the TagMap, a pointer to which is stored in the ProgramInfo structure member named Tags (710). External operation and access to the TagMap is similar to a hash map, in that each is Tag in the TagMap keyed by a unique string, which is used to store and retrieve the tag.

Tags are designed to support state transitions and propagations between processes and programs. For a structure to be a Tag it must conform to the Tag Interface, which defines that Tags must implement a Fork( ) and Exec( ) callback, each of which also returns a Tag (or nil), and are called by the Process Tree during Fork and Exec process events respectively. These events may trigger state transitions or propagations: a program Tag may want to create and a new or different Tag to a subprogram upon Exec, or create a copy of itself, or any number of possibilities. For example, since the default POSIX behavior is to propagate file descriptors on to subprocesses and subprograms, Tags can be used to track the state of file descriptors: on Fork( ), the file descriptor tag returns a copy of itself, and on Exec( ) it returns itself (the same pointer already referring to the tag). For another example, consider that a program tagged with an Interactive Shell Tag can label subprograms as Commands by returning a new Command Tag upon Exec( ). Tags can optionally also implement a callback for Exit( ), which is useful if multiple Tags share state across multiple processes.

Figure 9:
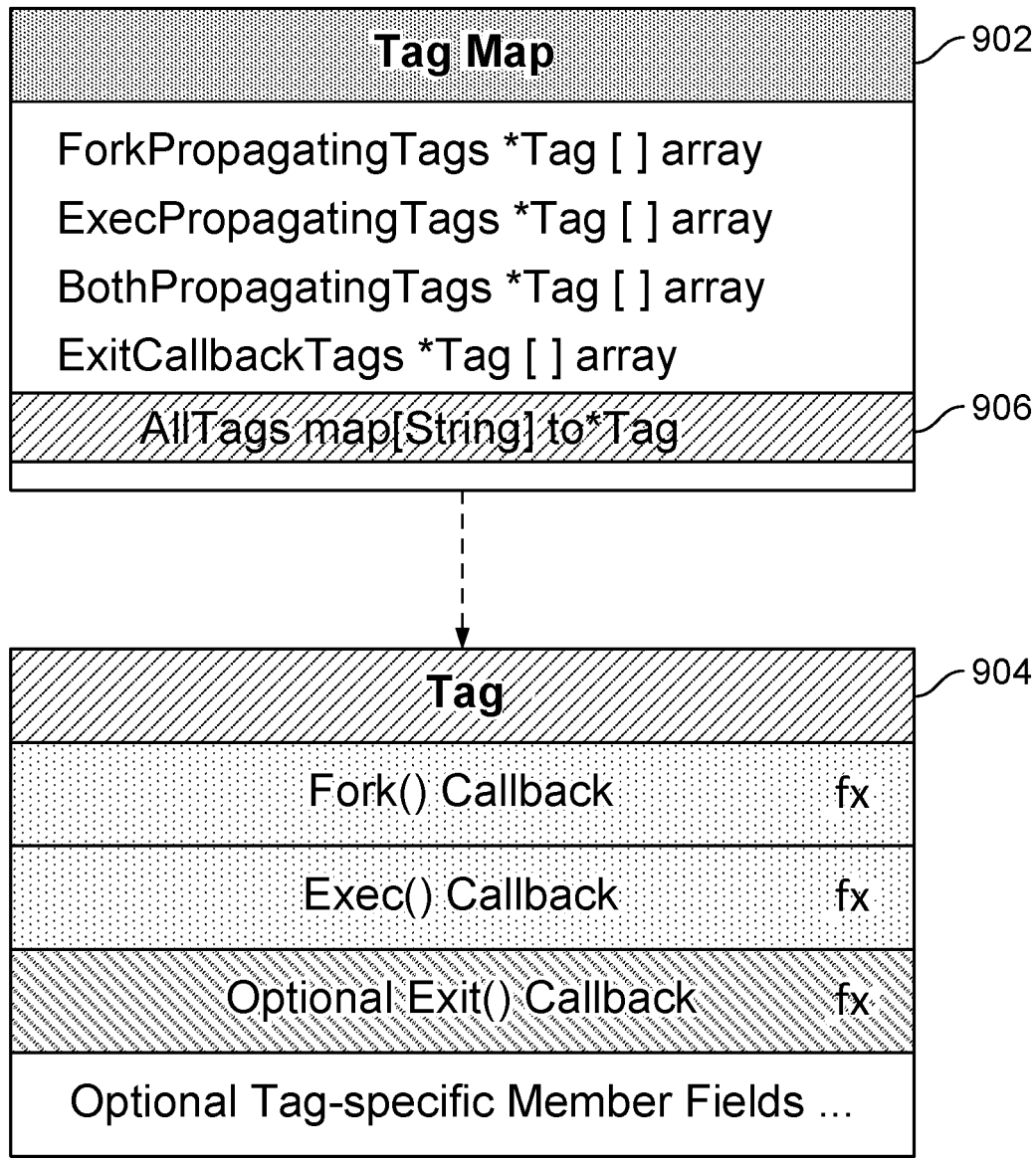
FIG. 9 illustrates an abstraction of the internal structure of the TagMap and its relation to Tags.

An abstraction of the internal structure of the TagMap and its relation to Tags is depicted in FIG. 9. In FIG. 9, TagMap 902 is shown as a data structure, while Tag 904 is shown as a code component. This is because a Tag is anything that matches the Interface requirement of implementing the Fork & Exec callback, and can have any other arbitrary structure members.

TagMap 902 is an abstraction over a set of arrays and maps used for organizing and retrieving pointers to Tag structures. Most of this organization internally is for optimization, to only call handlers on Tags that exhibit non-default/specialized behavior on Fork and Exec. Tags are retrieved by name from the TagMap using a Lookup( ) function, which retrieves the tag from its own internal map (labeled in FIG. 9 as AllTags (906)). The TagMap itself also has handler functions for Exec( ) and Fork( ), which result in the TagMap returning a new TagMap—one which contains the resulting Tags returned from the calls to Exec( ) or Fork( ) on each of the Tags in the TagMap. This propagation does not necessarily call the Exec/Fork handler on each Tag. For optimization, some Tags can be declared as always returning NIL for Exec( ), Fork( ), or both, and by declaring them in this way, the TagMap knows to skip these callbacks for these Tags. One way to achieve this is by using Go's Interface typesystem which will enforce that Tags have callbacks for Exec( ) and Fork( ) implemented, but in a way that allows the TagMap to identify the implementation as being one which returns NIL and stores those Tags differently.

The Tag structure is an interface Type which implements a callback for Fork( ) and Exec( ) callbacks, both of which themselves return a Tag interface (or NIL). Logic here determines if/how a Tag propagates between new processes (forks) or new programs (execs). If a Tag implements an Exit( ) callback, that callback is called by the Process Tree on Exit process events.

C. Event Driven and Context-Aware Tag Propagation Examples

1. Interactive Shell

Detecting that a shell program (e.g., /bin/bash) is being used interactively, as opposed to being used to execute a subprogram or script, is a capability that Platform 100 can provide. Additional detail on approaches to detecting such a shell is provided in more detail in Section IV below. By detecting interactive shells, users are able to write rules around the conditions in which an interactive shell is permitted by their security policies. To make the user experience less cumbersome, built in logic permits subsequent interactive shells to be executed as long as they descend from an alive instance of a permitted interactive shell. In various embodiments, this is tracked using a tag with specific propagation logic.

Figure 10A:
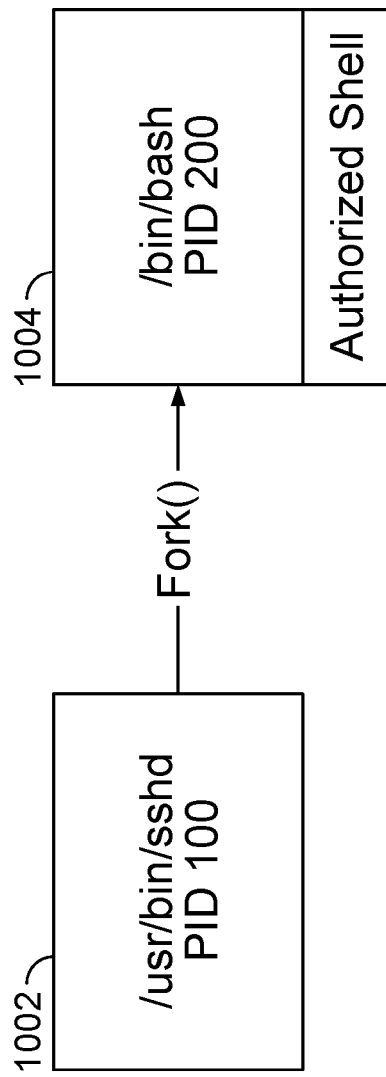
FIG. 10A illustrates an example of a child process forking.

In the following scenario, suppose that policy declares that /usr/sbin/sshd can execute/bin/bash. As shown in FIG. 10A, when a user logs in, sshd (1002) forks off a child process (1004), which executes/bin/bash and becomes the user's shell session. If the user now chooses to run a different shell, e.g., via su, sudo, or otherwise, the authorized shell tag will determine if it should propagate based on the life status of the original authorized shell. This works by the shell tag being informed of certain process events. Whenever the Process Tree sees a process event, which is one of a Fork, Exec, or Exit, it determines if there are any tags associated with the process responsible for that event, and then determines if the tag expects to have a callback called for that event (tags might care about one, some, all, or no events).

Figure 10B:
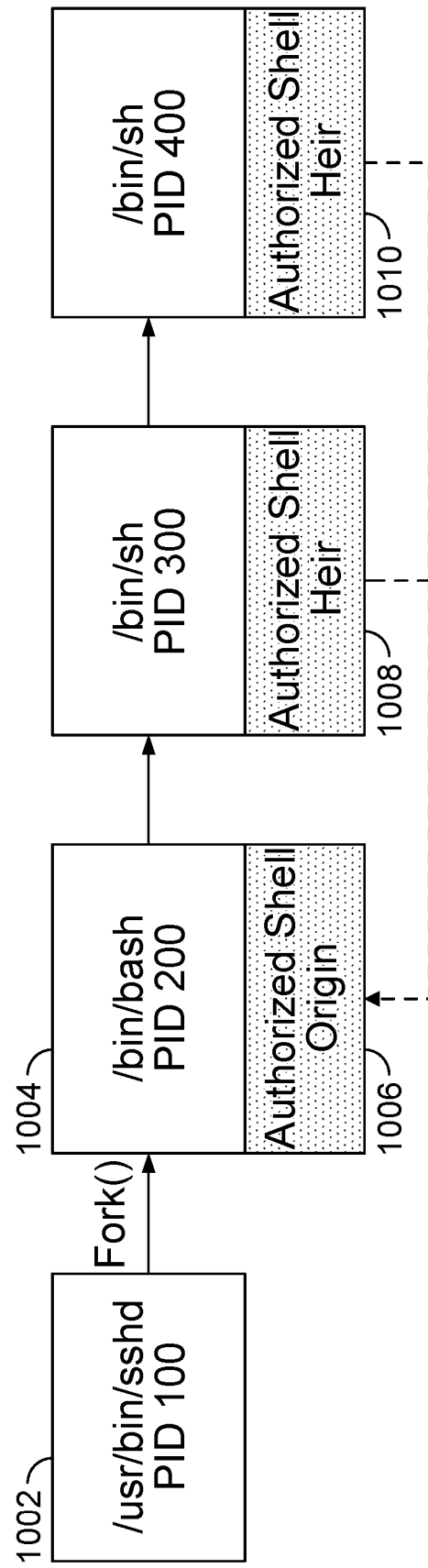
FIG. 10B illustrates an example of tag propagation.

FIG. 10B illustrates an example of tag propagation. In the case of the authorized shell tag, the following is an example of logic that can be used:

On Fork & Exec Events:
  If the Tag is the original authorized shell Tag (1006), it returns a new authorized shell heir Tag (1008).
  If the Tag is an authorized shell heir Tag (1008), it will check its pointer back to the authorized shell Tag (1006), to determine if the original authorized shell process is still alive, and if so, it returns itself (literally its own pointer) for the Process Tree to propagate to the newly forked process (1010). If the original authorized shell is dead, it returns NIL.

On Exit Event:
  The original authorized shell Tag updates its state to reflect that the original authorized shell is now dead, so that heir Tags can see this state should they receive fork/exec events.

The logic is that the permission to execute subsequent shells is transitive so long as the original source of the permission exists. This behavior permits scenarios like a user transitioning to another subshell during their session, without making themselves accidentally vulnerable to allowing programs they started during their session to spawn interactive shells after they log out. As an example, suppose the user logged in to launch Apache, then logged out. The user would not want Apache to then be allowed to spawn interactive shells. In various embodiments, re-parenting is also provided for, and the same event-driven context-awareness remains present.

2. Original User Tag

Process Tree 414 tracks UID (GID, etc.) using tags, which it updates based on specific events, in order to understand the state of the process and how/why its UID (or GID, etc.) might have changed. Such information can be particularly interesting when processes become root. By tracking the events related to legitimate privilege transitions, privilege-escalation by way of exploitation can be detected. For example, if a tag indicates that a process was UID 1000, and was not currently engaged in any calls to setuid to change its UID, a Strategy (e.g., Strategy 420) can alert that there has been an illegitimate transition to root.

Additionally, the UID (GID, etc.) tags allow Process Tree 414 (and thus Strategies 410) to track who was originally the user involved. If someone logs in as a UID associated with Mallory, sudo's to root, then su's to Alice and performs some other nefarious action, the fact that it was actually Mallory performing all of the actions (and not Alice) can be surfaced.

3. Alert Grouping

Tags facilitate grouping of Alerts once there has been an Alert where the scope-of-damage is process-wide. Once there has been a security event where the whole process is deemed to be malicious (e.g., a blacklisted program, exploited service, or non-permitted shell), then any other Alert by that process or its children will inherit the same Alert grouping. This is desirable because these subprocesses and their events are necessarily associated with the initial malice. Even if there is an alert which is not necessarily process-wide (e.g., a connection being made to a non-whitelisted IP, which could be misconfiguration etc.), it can be grouped with others so long as a process-wide alert has previously been established. This allows analytics framework 400 to not only group Alerts, but also group Events (which themselves didn't necessarily trigger Alerts) with the Alert.

D. Example Process

Figure 11:
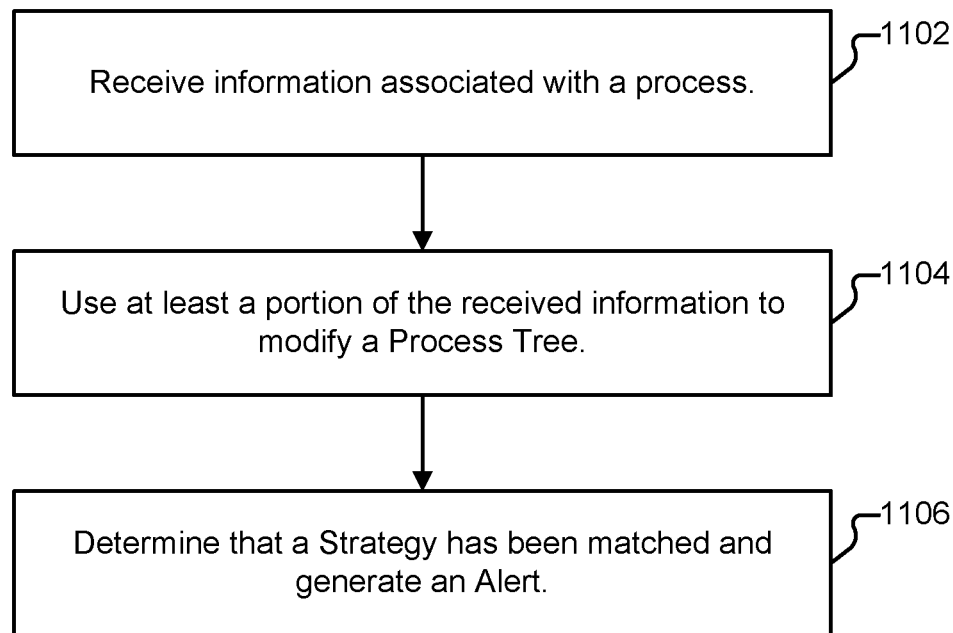
FIG. 11 illustrates an embodiment of a process for generating an alert.

FIG. 11 illustrates an embodiment of a process for generating an alert. In various embodiments, process 1100 is performed by analytics framework 400. Process 1100 begins at 1102 when information about a process is received. As one example, telemetry information indicating that a process has forked is received from a Sensor at 1002. At 1104, at least a portion of the received information is used to modify a Process Tree. Examples of modifying the Process Tree include: adding nodes, adding tags, etc. At 1106, a determination is made that a Strategy has been matched, and an Alert is generated. As one example of processing that can be performed at 1106, a determination can be made that a user Mallory escalated privilege to a user Alice (e.g., matching a Privilege Escalation Strategy) and an Alert can be generated in response. Alerts can be sent to standard out, to a file that does log rotation, to a server, to S3, etc., based on configuration. Similarly, if configured, MTLS can be used, and certificates set up in conjunction with sensor installation/deployment. As mentioned above, use of a separate server (e.g., for analytics) is optional. Analytics can be performed locally to the sensor and/or remotely based on deployment/configuration.

A variety of additional actions can be taken in response to Alert generation. As one example, a bot can be used to interrogate interactive shell users when Alerts are raised. Suppose that a determination is made (i.e., a Strategy is matched) that an interactive shell does not match a whitelist entry. An Alert is generated (1202), and the implicated user is queried (1204), e.g., by a Slackbot (as depicted in FIG. 12) or other appropriate mechanism, to determine whether the user performed the action (or, e.g., the action was performed without the user's knowledge due to compromise of the user's account). If the user responds with "yes," the user can be challenged to respond to a multi-factor authentication challenge (e.g., on their phone) at 1206. If the user does not respond to the Slackbot, the user indicates that the activity was not performed by them, and/or the user fails the multi-factor authentication, challenge, a deadman switch approach can be used, e.g., terminating specific processes, all of the user's processes, shutting down any associated containers, terminating network access to the node the user is logged into, notifying an administrator, etc., based on severity/scope of the problem.

IV. Interactive Shell Event Detection

A. Introduction

This section provides a detailed discussion of analytics framework 400's ability to detect and tag interactive shells and commands. This capability is the basis for the Interactive Shell policy type, and for the Shell Command MetaEvents used by other mechanisms, such as the flight recorder. The following discussion is framed from the perspective of Gateway 404, which is the component of framework 400 responsible for instantiating all Strategies 410 and Event Utilities 412, including Process Tree 414. Upon receiving telemetry events (or abstractions of telemetry events emitted by various Event Utilities 412), Gateway 404 calls the HandleEvent callback function of the specific Event Utilities and Strategies which subscribe to that Event type. Process Tree 414 is unique in that it has its HandleEvent function called on all Events, to ensure it is informed of the processes and programs, and is prepared for queries on those processes and programs by other Event Utilities and Strategies.

This section makes use of two types of diagrams. The first type are code component diagrams, which show abstractions of which function is called at which point in the process. The second type are visualizations of data structures affected by/used by the code to complete the operation.

B. Detection of Interactivity

1. Pass Event to the Process Tree

Figure 13:
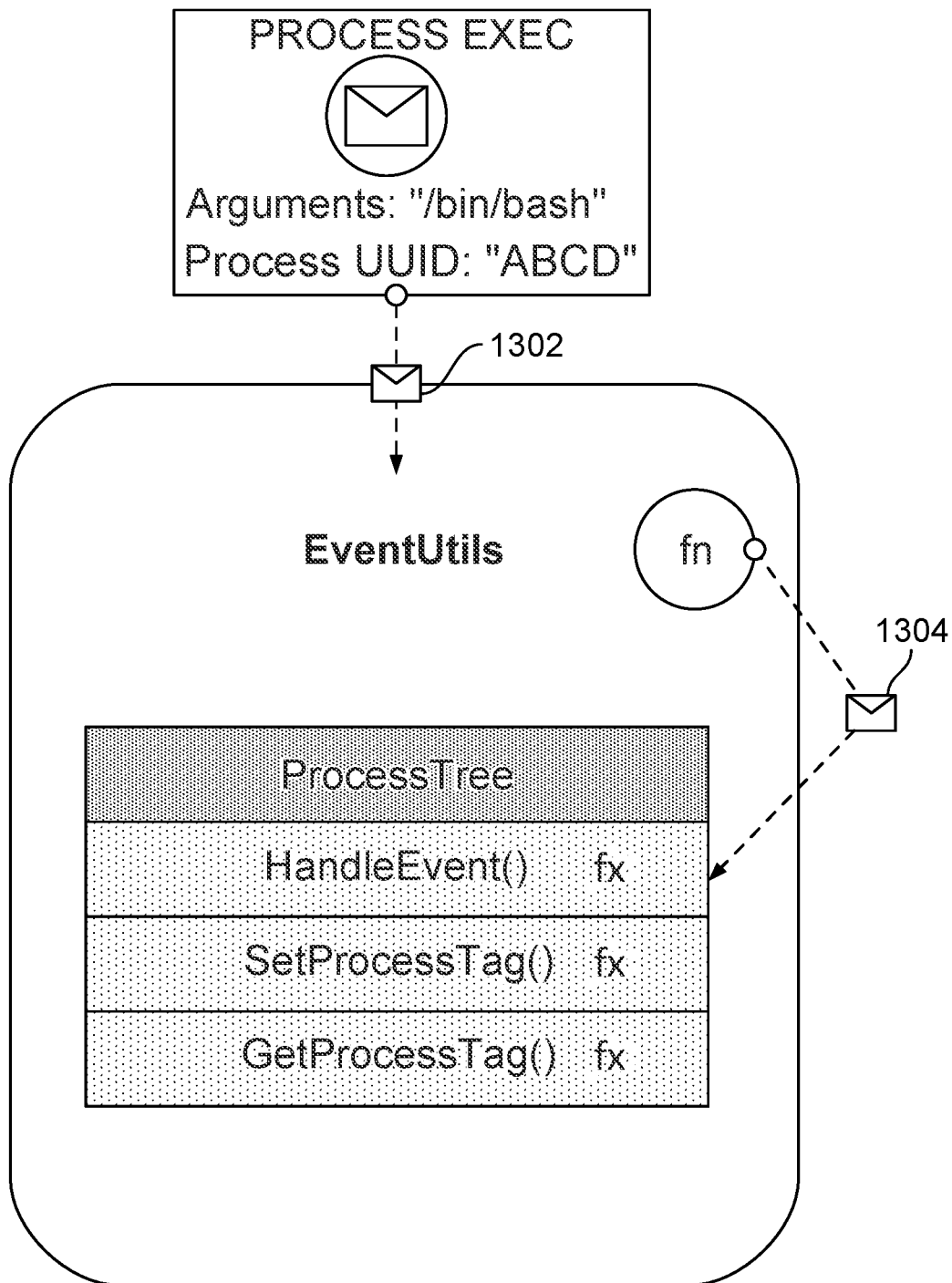
FIG. 13 is a code component diagram.

This walkthrough starts from the point of the Gateway having received telemetry for an Exec( ) Event, which denotes a program being invoked by a process via the execve system call. FIG. 13 is a code component diagram that depicts the Gateway's first action, which is to call into the ProcessTree's HandleEvent function. As shown at 1302, a program exec telemetric record enters Event Utilities 412 and is passed to Process Tree 414 which creates a new ProcessInfo structure if necessary, and creates a new ProgramInfo for the respective process to represent the current state of the program executing. For this example, the program is "/bin/bash" and the path and arguments members of the newly created ProgramInfo structure reflect this information. As illustrated at 1304, only the HandleEvent function is being called in this operation. Other Process Tree component functions depicted in FIG. 13 are included for context, and are called in later operations by other components.

Figure 14:
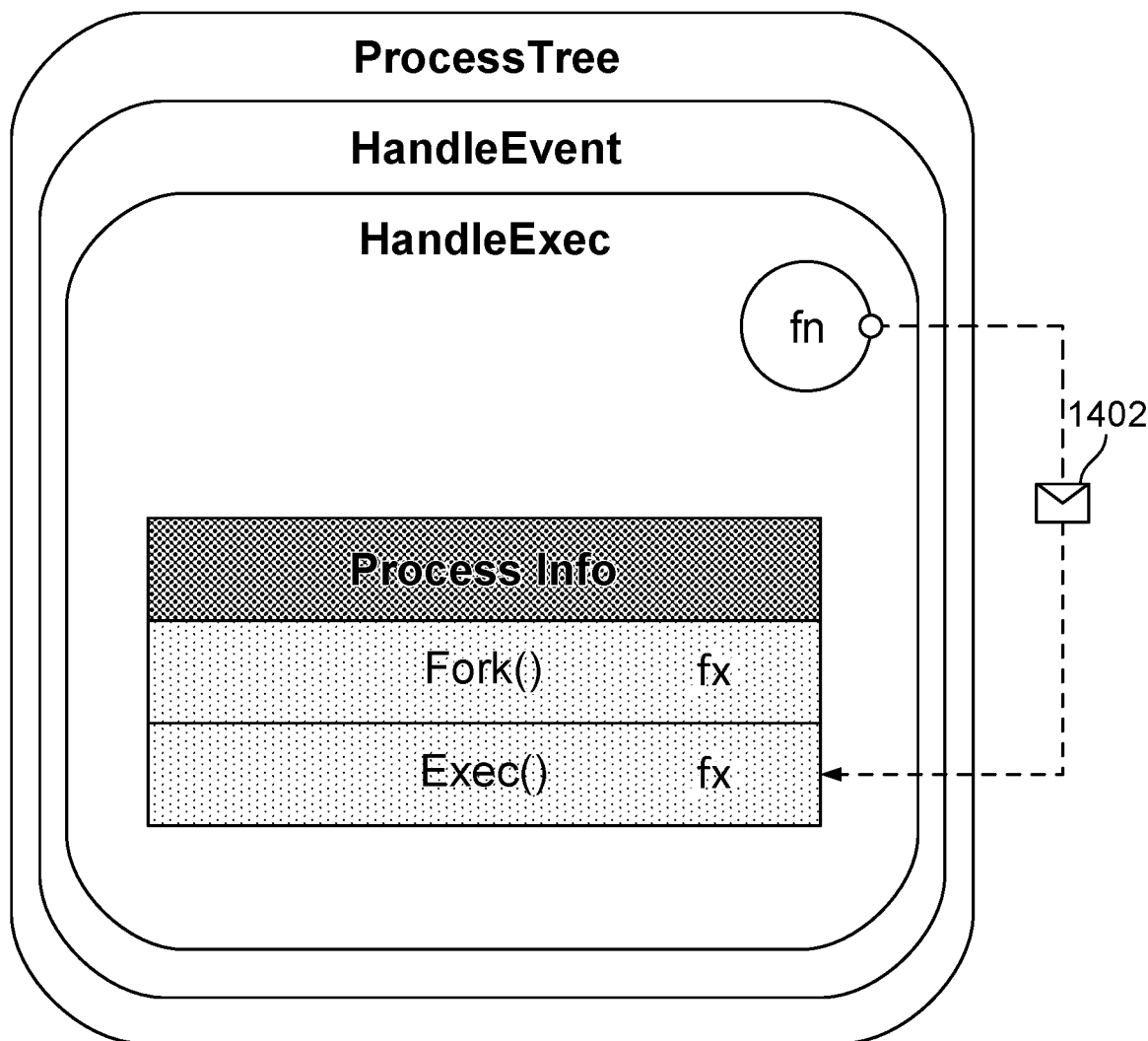
FIG. 14 is a code component diagram.

The HandleEvent function in Process Tree 414 begins by looking up the process' unique ID (e.g., "ABCD"), and if no ProcessInfo structure is present, a new one is created and populated in the hash map. After ensuring that a ProcessInfo object exists, Process Tree 414 then calls its own internal HandleExec( ) method, which then calls the ProcessInfo object's Exec( ) function, as illustrated in FIG. 14 (1402).

Next, the ProcessInfo object accesses its *Program member (a ProgramInfo object instance), and calls its Exec( ) function. The ProgramInfo object's Exec( ) function returns a pointer to a new ProgramInfo object instance populated with information from the Exec( ) event. The ProgramInfo object then replaces its existing ProgramInfo pointer with the pointer to the new instance.

Figure 15:
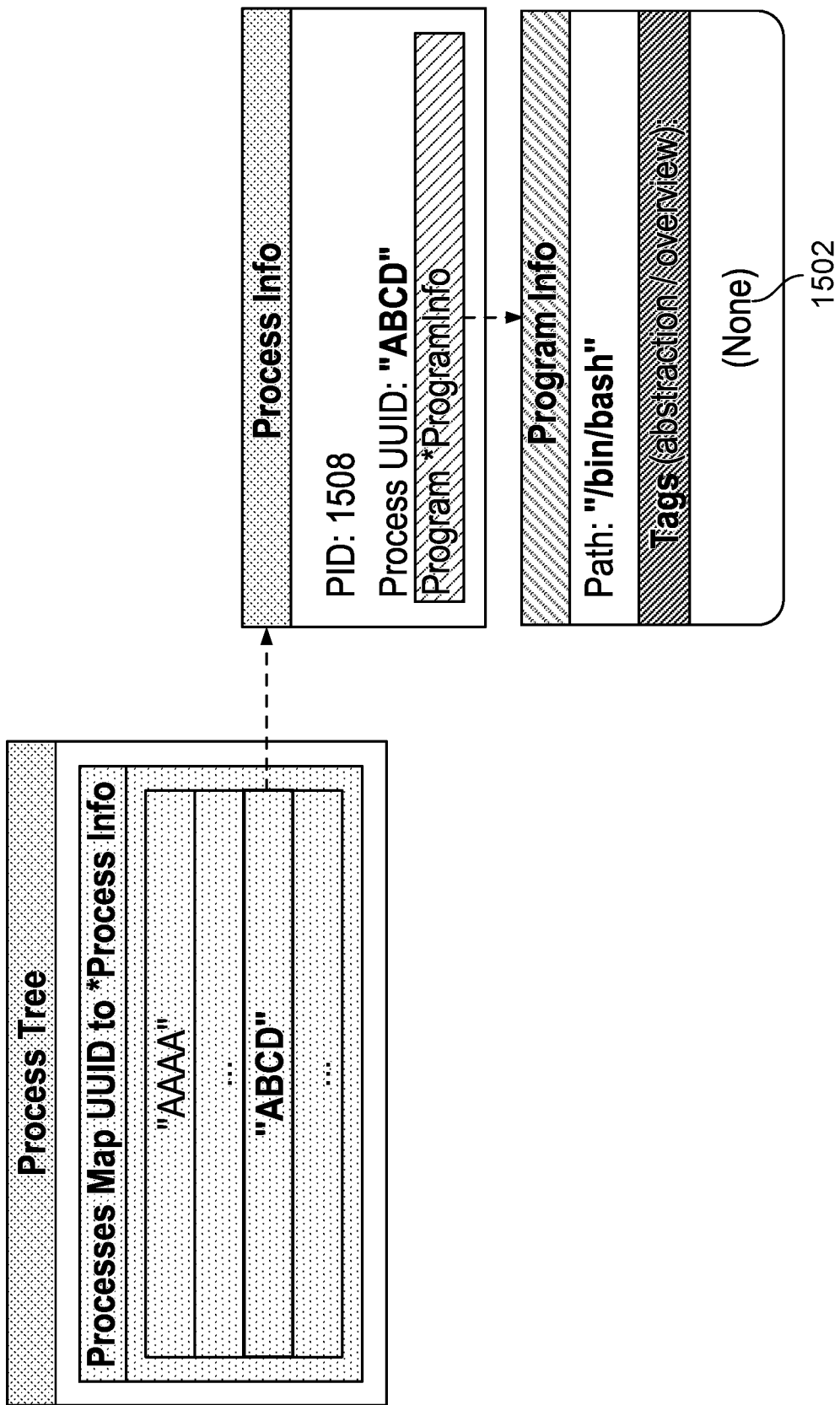
FIG. 15 illustrates example data structures.

FIG. 15 illustrates data structures involved in the ProcessTree from the call to HandleEvent down to the ProgramInfo structure. Note that the Tags section of the ProgramInfo structure reflects that there are currently no Tags (1502). This portion of the ProgramInfo structure will update as Tags are applied in later operations.

2. Pass Event to Other Event Utilities

Figure 16:
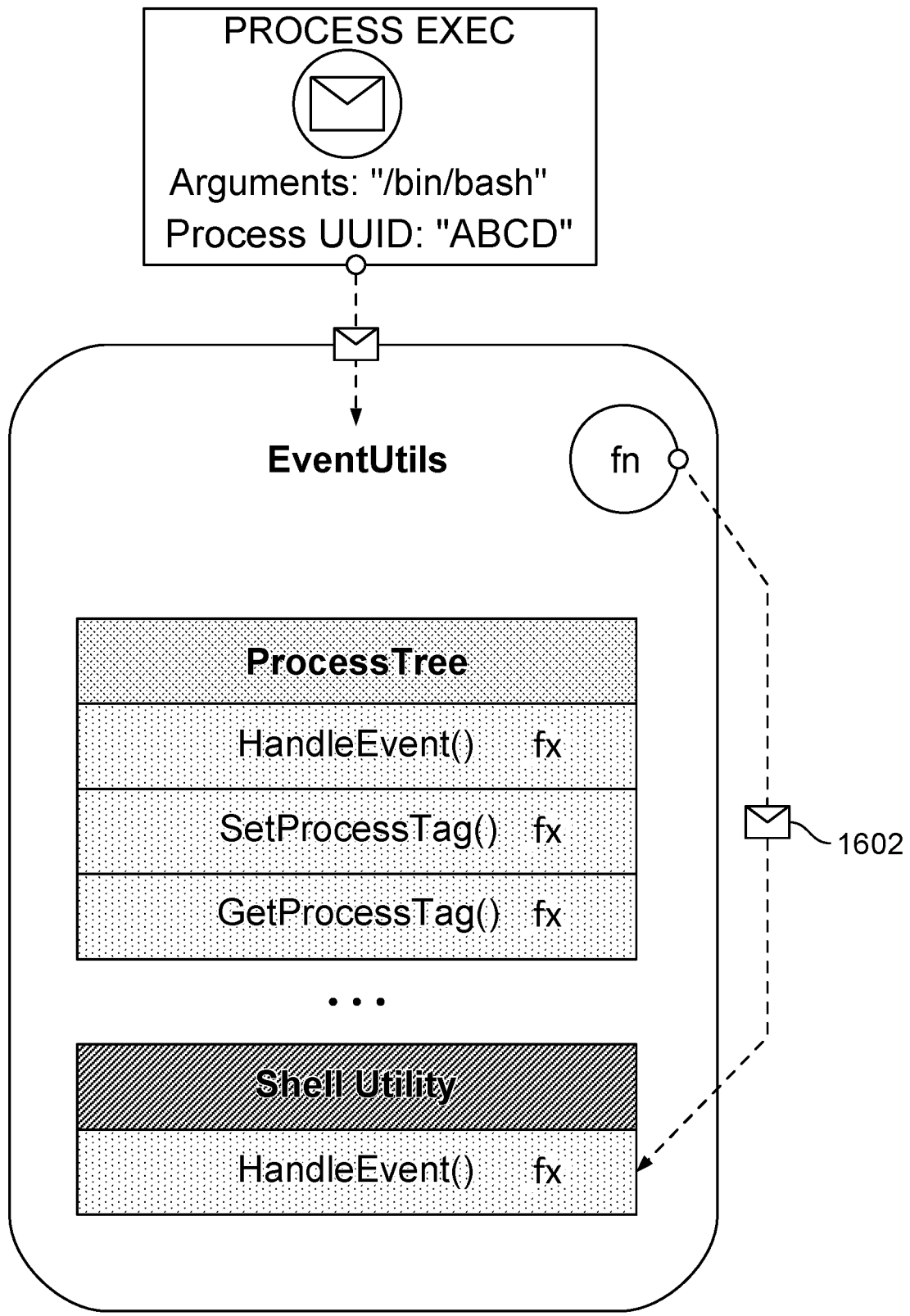
FIG. 16 is a code component diagram.
Figure 17:
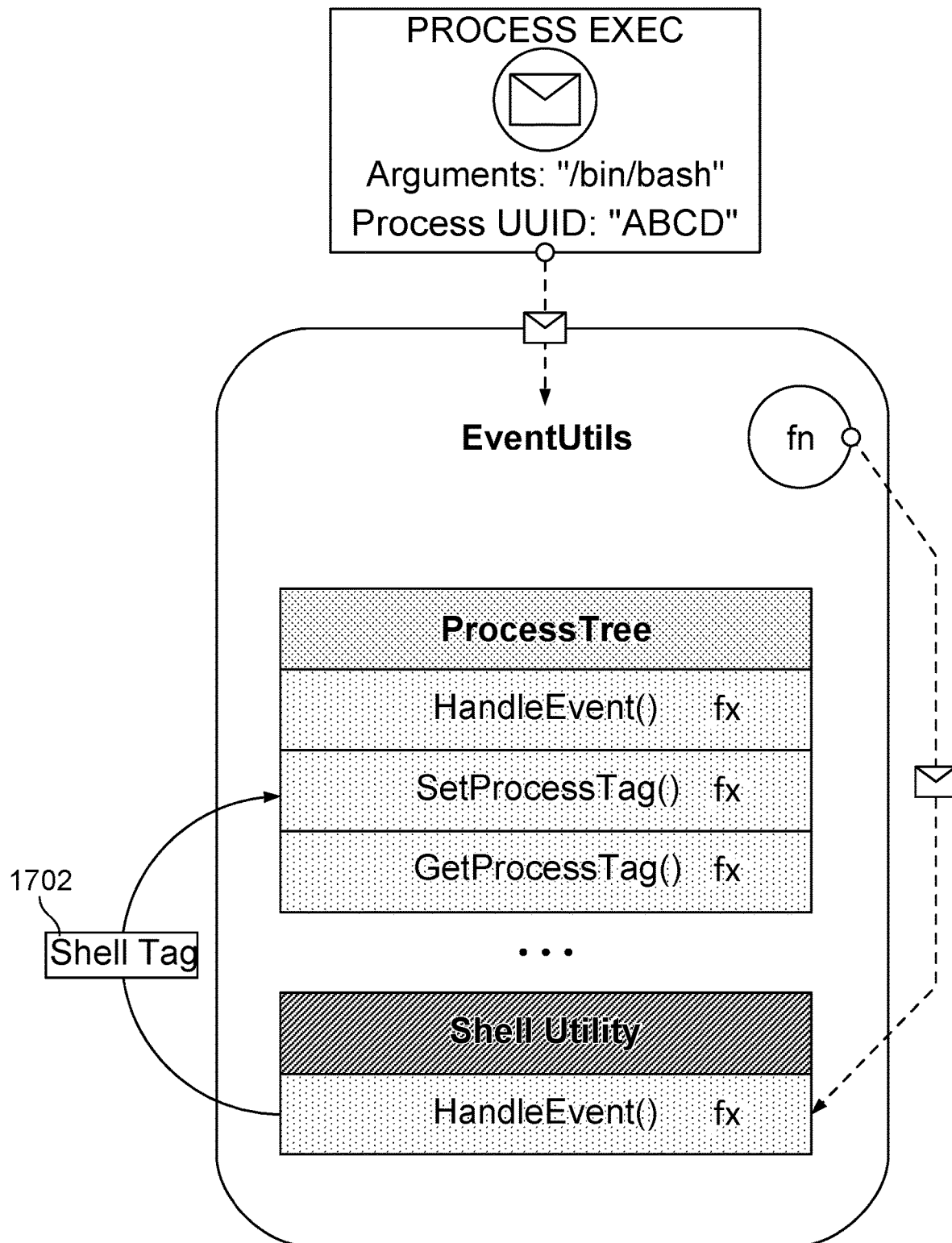
FIG. 17 is a code component diagram.

Once the Process Tree HandleEvent function returns back to Gateway 404, it moves on to other components, as depicted by the component diagrams of FIGS. 16 and 17. As shown in FIG. 16, the ProgramExec telemetry is passed to other Event Utilities which subscribe to that event type. The Shell Utility subscribes to the Exec Process Event, so its HandleEvent callback is called (1602).

The Shell Utility has logic for identifying when telemetry indicates a program is a shell. For simplicity, the logic in this example matches on the program path of "/bin/bash" as being a known shell program. Upon detecting a shell, it calls the Process Tree function SetProcessTag (1702) to set a ShellTag on the process.

Figure 18:
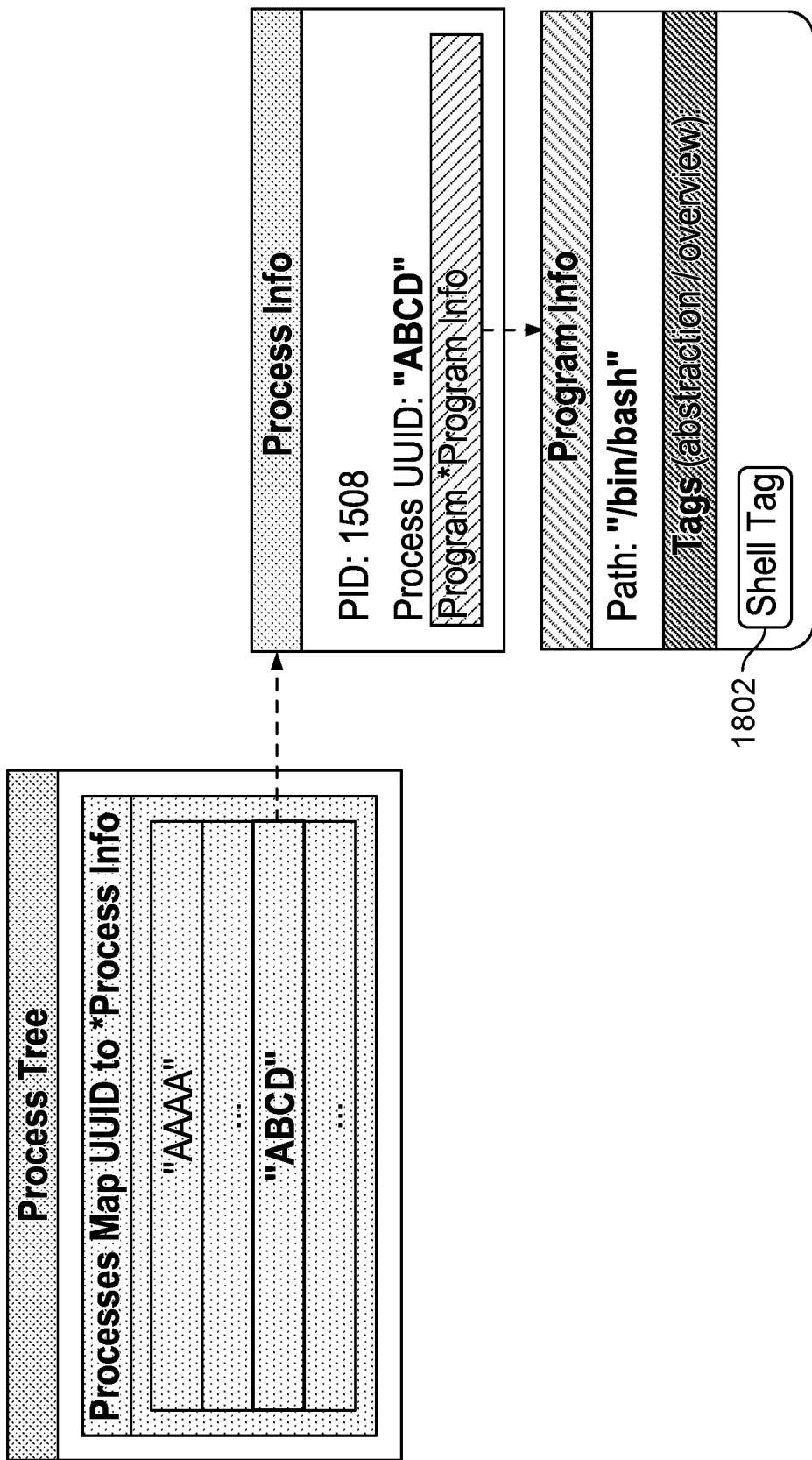
FIG. 18 is a data structure diagram.

FIG. 18 is a data structure diagram that visualizes the effect the SetProcessTag( ) call has on the structures in the ProcessTree. CallingSetProcessTag (e.g., via: SetProcessTag("ABCD",ShellTag)) sets the Shell Tag (1802) on the programming actively running in the process specified by the UUID (which in this example is the UUID "ABCD").

3. Context-Aware, Event-Driven Tag State Change

Figure 19:
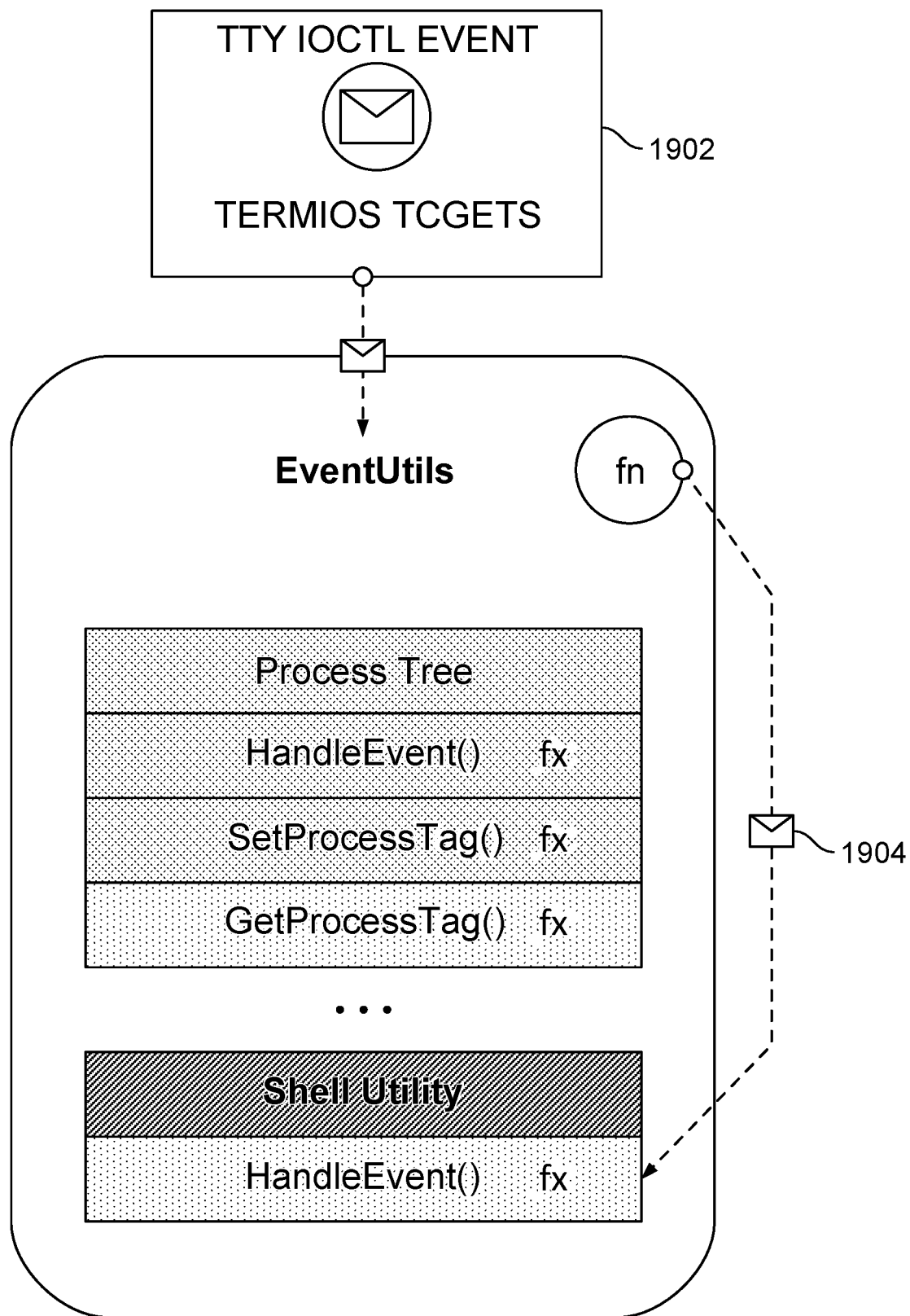
FIG. 19 is a code component diagram.

FIG. 19 is a code component diagram. Suppose that at some point later (though nearly instantly as perceived by a human), a specific telemetric record from a finely tuned kprobe/tracepoint (described in more detail below) is received (1902). This telemetry indicates that the calling program is attempting to query information about its TTY (or determine if any is present). This subscription for this type of telemetry is made by the Shell Utility (1904), which is the only Event Utility to request and consume this telemetry in various embodiments (separate of the Process Tree itself, which consumes all telemetry). In an alternate embodiment, the timing of keystrokes (e.g., the submission of commands) is evaluated. Commands submitted automatically in response to a script will be received significantly faster than commands submitted by a human user. If keystroke timing indicates a human is entering commands, this is indicative of an interactive shell.

Figure 20:
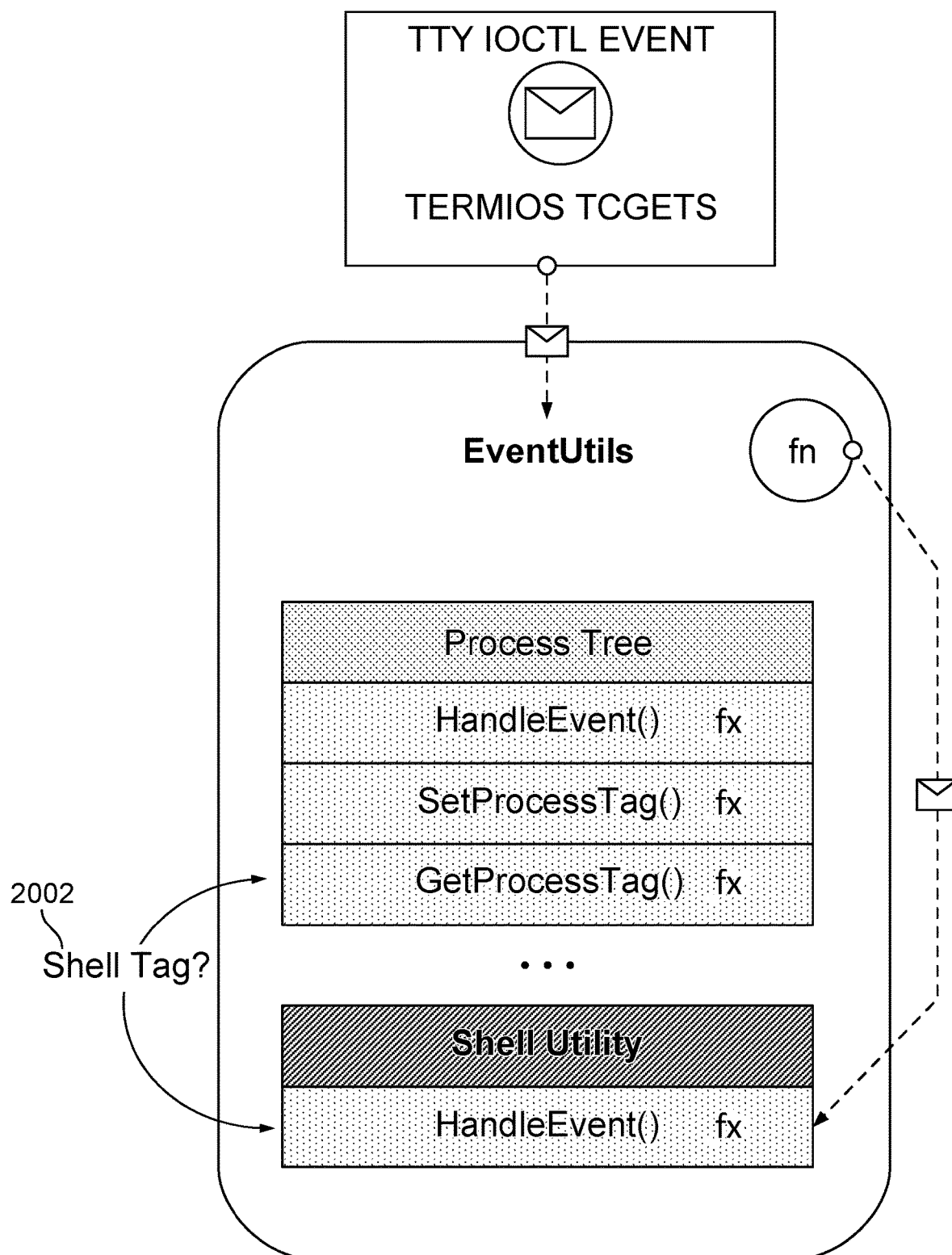
FIG. 20 is a code component diagram.
Figure 21:
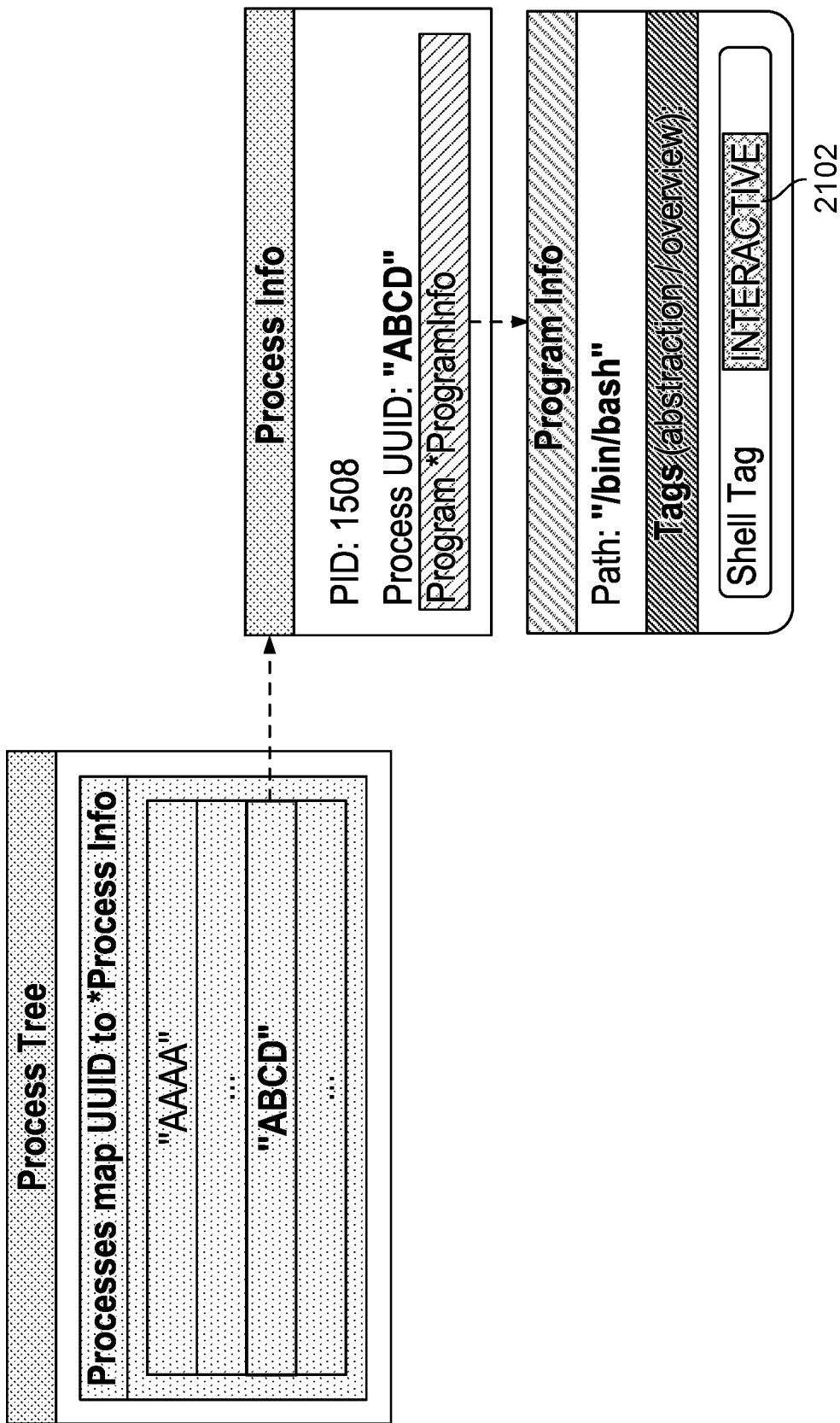
FIG. 21 is a data structure diagram.

FIG. 20 is a code component diagram. The Shell Utility now calls the Process Tree function GetProcessTag to determine if the process has the Shell Tag (2002). If the Shell Tag is found, the Shell Utility then calls the Shell Tag-specific function IsShell( ), which is used to determine if the currently running program is a shell (as contrasted with being the descendent of some other shell program). If the program is indeed a shell, the Shell Utility calls the Shell Tag-specific function SetInteractive( ), which modifies the state of the Shell Tag to reflect that it is interactive. The change in this Tag state is visually represented in the data structure diagram depicted in FIG. 21 (2102).

4. Tag Propagation & Shell Tag

Figure 22:
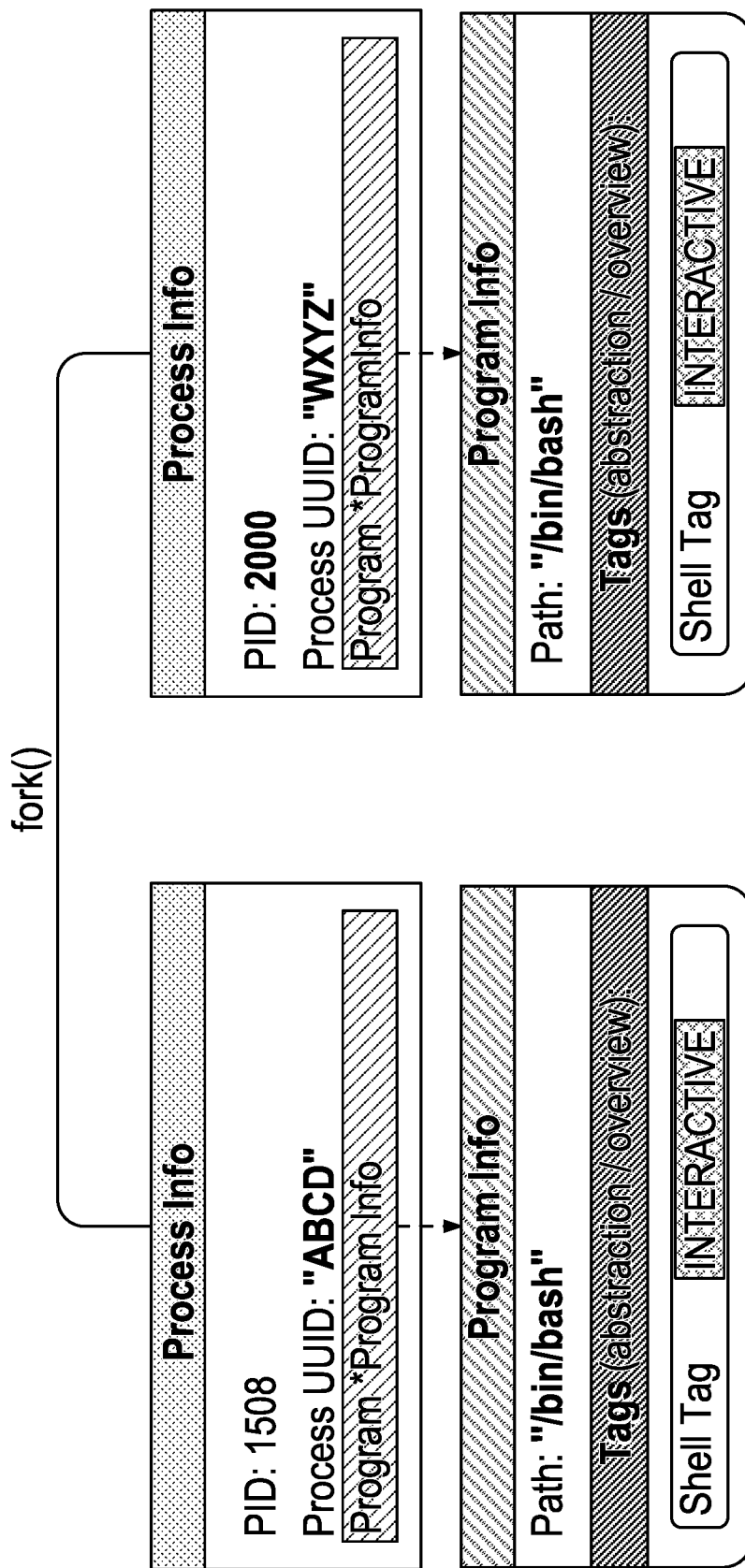
FIG. 22 illustrates an example of ShellTag.Fork( ) returning a copy of itself.

At the beginning of this section, a cascading sequence of calls was shown taking place when handling an Exec event. The sequence was (1) Gateway 404 calls Process Tree 404's HandleEvent( ); (2) HandleEvent( ) calls HandleExec( ); (3) HandleExec calls the Exec( ) function of the corresponding ProcessInfo object; and (4) the ProcessInfo Exec( ) calls Exec( ) on the corresponding ProgramInfo object. This cascade goes further: the TagMap in the ProgramInfo also has an Exec( ) and Fork( ) callback, which is called on each Event respectively, and which returns a new TagMap containing Tags which exhibit Exec( ) or Fork( ) propagation behavior. This propagation could be to propagate the same Tag, a copy of the Tag, a completely different Tag, or nothing at all (NIL). As illustrated in FIG. 22, ShellTag.Fork( ) returns a copy of itself, reflecting the same state.

ShellTag.Exec( ) has more logic-based behavior: if the Shell Tag reflects the state of being interactive, it returns a ShellCommandTag, indicating that this newly executed program is the result of a command being issued at the shell. If the Shell Tag is not interactive, it returns a Shell Automation Tag indicating that the newly executed program is involved in some form of non-human-driven automation, such as a shell script.

Figure 23:
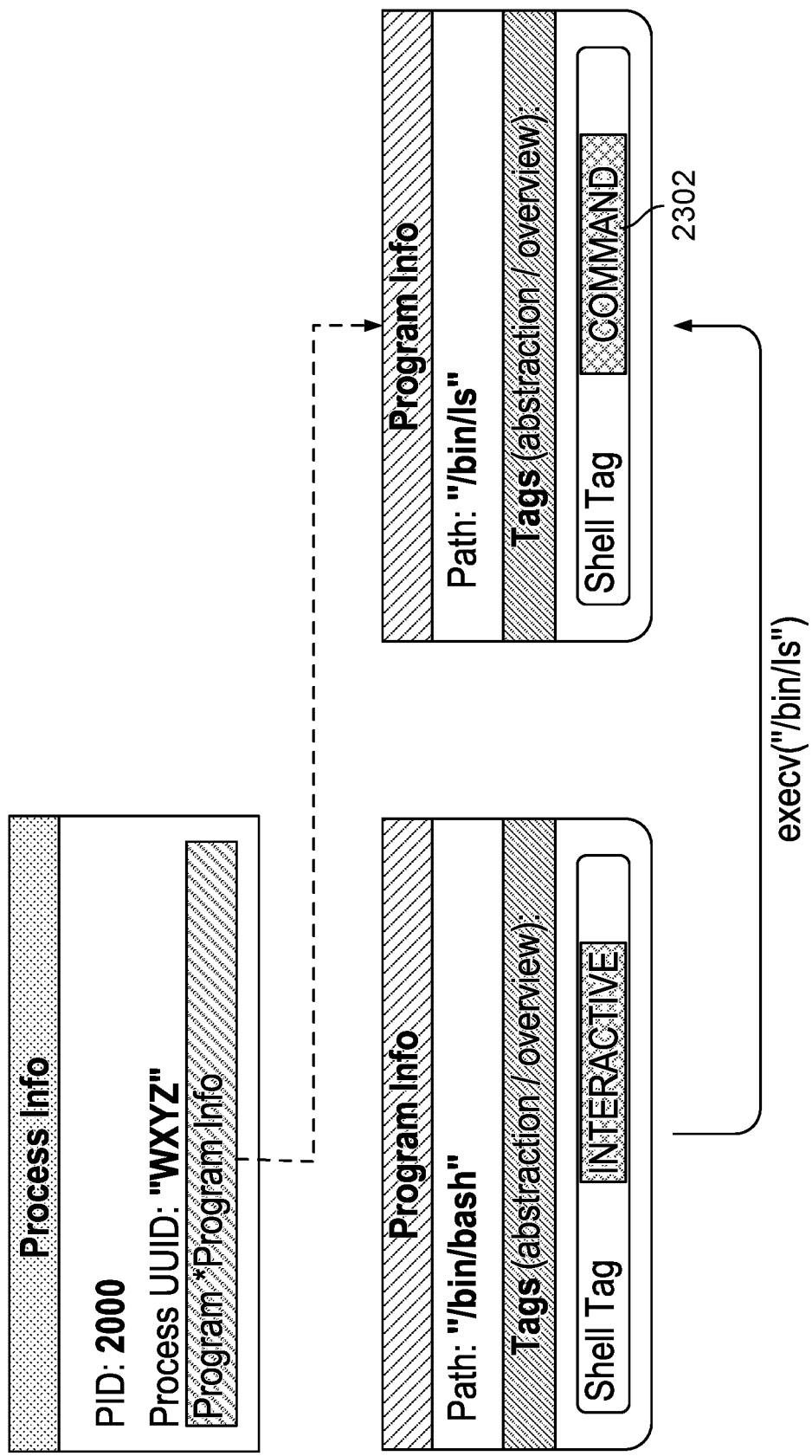
FIG. 23 is a data structure diagram.

FIG. 23 illustrates how an existing ProgramInfo Exec( ) callback returns a new ProgramInfo structure on Exec( ) Events, containing Exec-propagated Tags (and as stated previously in this section, on this event the ProcessInfo structure member "Program" is updated to point to the new ProgramInfo). In this example, "ls" is the program being executed, and because it descends from the interactive shell, a new Tag is propagated to indicate it is a Shell Command (2302).

Figure 24:
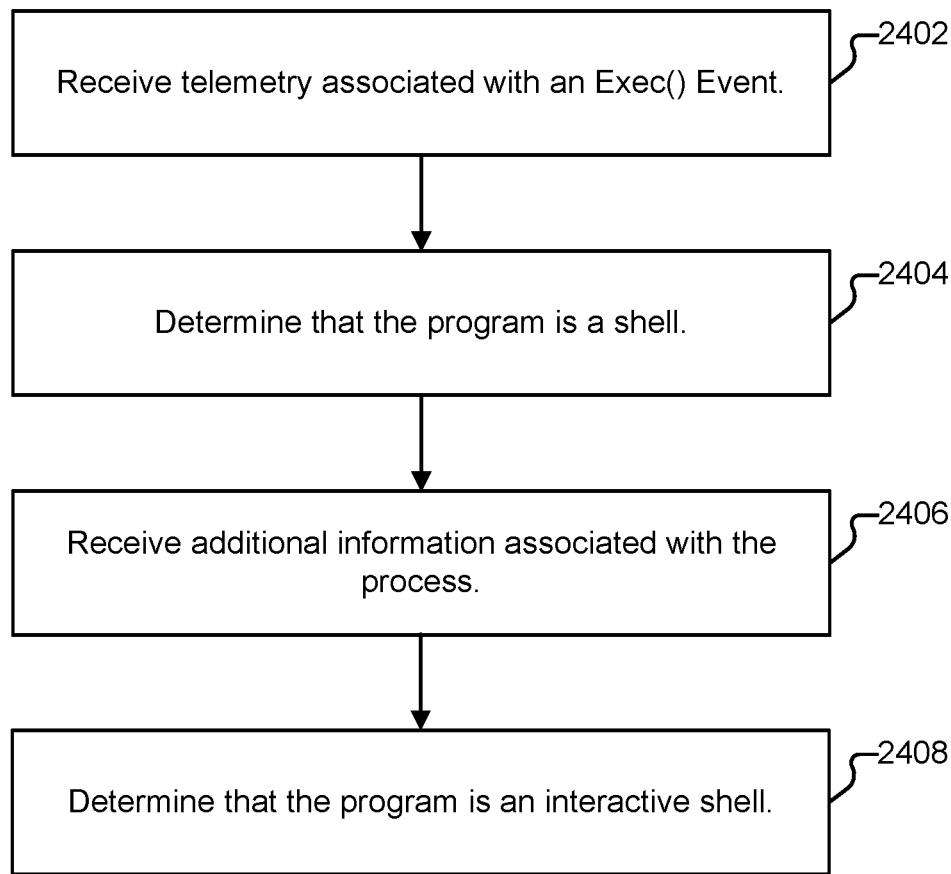
FIG. 24 illustrates an embodiment of a process for detecting an interactive shell.

FIG. 24 illustrates an embodiment of a process for detecting an interactive shell. In various embodiments, process 2400 is performed by analytics framework 400. Process 2400 begins at 2402 when telemetry associated with an Exec( ) Event denotes a program being invoked via a process. At 2404, a determination is made that the program is a shell. As explained above, one approach to determining whether the program is a shell is to use a Shell Utility (e.g., matching the program path of "/bin/bash" against a list of known shell programs). At 2406, additional information associated with the process is received, such as by a particular record being received from a kprobe or tracepoint, or timing information associated with commands. This additional information is used (e.g., at 2408) to determine that the shell is interactive.

A variety of actions can be taken in response to determining that an interactive shell is executing. As one example, commands entered into the interactive shell can be tagged (e.g., as described above) as interactive shell commands. Such commands can then be surfaced (e.g., via Alerts), made queryable, etc., so that a real-time view of which commands are being executed in interactive shells can be made available.

V. Events

Events are platform 100's internal data representation of data supplied to it from a source. This representation is aimed at simplifying analysis and to facilitate Strategy writing.

A. Creating New Types of Events

One example way to create new Events is as follows:

1. Create a new .go file in the pkg/protectevents directory.

2. Add a new Event type in the consts of pkg/protectevents/event_types.go, making sure that BaseEvent (e.g., *BaseEvent) is embedded in the new type.

3. Write unit tests for any new methods provided by the new type (e.g., syscall name to number translation).

4. Update the factories in pkg/protectevents/factory to create Events if necessary.

B. Specific Event Types

Events contain a BaseEvent defined in pkg/protectevent/events.go which defines most of the protectevent.Event interface. This contains common fields such as:

| Field | Type | Meaning | Always Filled In? (Y/N) |
|---|---|---|---|
| Id | string | Unique Identifier for this specific Event | Y |
| ProcessUUID | string | UUID for the process this event occurred in | N |
| ProcessPID | int | the PID/TGID of the process this event occurred in | Y |
| ThreadID | int32 | the thread ID of the task | Y |
| Uid | uint32 | the user ID of the task/thread | N |
| Gid | uint32 | the group ID of the task/thread | N |
| Euid | uint32 | the effective user ID of the task/thread | N |
| Egid | uint32 | the effective group ID of the task/thread | N |
| Suid | uint32 | the saved user ID of the task/thread | N |
| Sgid | uint32 | the save group ID of the task/thread | N |
| FsUid | uint32 | the file system user ID of the task/thread | N |
| FsGid | uint32 | the file system group ID of the task/thread | N |
| ContainerID | string | the UUID of the container where this Event occurred (often a hex-encoded SHA256) | Y |
| ContainerName | string | the string name of the container where this Event occurred | N |
| SensorID | string | the UUID of the Sensor where this event occurred (meaning the container was running on the host monitored by the sensor with the given ID) | Y |

-continued

| Field | Type | Meaning | Always Filled In? (Y/N) |
|---|---|---|---|
| ImageID | string | the UUID of the Image used to build the container where this event occurred (often a hex-encoded SHA256) | N |
| ImageName | string | the string name of the Image used to build the container where the Event occurred | N |
| SequenceNum | uint64 | the sequence number for events emitted as part of a subscription. | Y |
| MonotimeNanos | | the monotime from the Sensor's host's clock at the time of the Event | Y |

Specific events assume these fields as well, where appropriate. The following are various example Events, as well as corresponding example JSON.

1. Container Created

This Event represents when a Container is created but not yet started, on a host monitored by platform 100.

Event Type constant: protectevent.CONTAINER_EVENT_TYPE_CREATED

Additional Fields:

| Fields | Type | Meaning | Always Present (Y/N) |
|---|---|---|---|
| DockerConfigJSON | string | The Docker Config JSON from the Docker Socket Contains additional information | N |
| OCIConfigJSON | string | The Container Config JSON from the OCI compliant container engine | N |

The JSON Factory checks the type field for a string value "cont-create" for container creation events. They include all of the BaseFields and can optionally include the DockerConfigJSON or OCIConfigJSON fields as strings: {"type": "cont-create", "container_id": "4cb5b14f2f6b8e2a3e57188e230d140f-2a8880d236a5f21face723678a2c50a", "container name": "test-container", "image_id": "7328f6f8b41890597575cbaadc884e73-86ae0acc53b747401ebce5cf0d624560", "image_name": "alpine:3.6", "monotime_nanos": 58800000000, "sensor_id": "0d76a2a9ede1bc3df805d26e90501af-54b11eabe180e963c56d27f065d9243f4"}

2. Container Started

This Event represents when a previously created Container is started on a host monitored by a Capsule8's platform.

Event Type constant: protectevent.CONTAINER_EVENT_TYPE_RUNNING

Additional Fields

| Fields | Type | Meaning | Always Present (Y/N) |
|---|---|---|---|
| InitHostPid | int | The PID of the init process in the Container, in the host namespace. | |

The JSON Factory checks the type field for a string value "cont-create" for container creation events. They include all of the BaseEvent fields and can optionally include the DockerConfigJSON or OCIConfigJSON fields as strings: {"type": "cont-start", "container_id": "4cb5b14f2f6b8e2a3e57188e230d140-f2a8880d236a5f21face723678a2c50a", "container name": "test-container", "image_id": "7328f6f8b41890597575cbaadc884e7-386ae0acc53b747401ebce5cf0d624560", "image_name": "alpine:3.6", "monotime_nanos": 58800000000, "sensor_id": "0d76a2a9ede1bc3df805d26e90501-af54b11eabe180e963c56d27f065d9243f4", "init_host_pid": 2222}

3. Container Exited

This Event represents when a previously started Container's Init PID has exited but the container's resources have not yet been reclaimed.

Event Type constant: protectevent.CONTAINER_EVENT_TYPE_EXITED

Additional Fields

| Fields | Type | Meaning | Always Present (Y/N) |
|---|---|---|---|
| ExitCode | int | The ExitCode that the Init Process Exited with | Y |

The JSON Factory checks the type field for a string value of "cont-create" for container exit events. They include all of the BaseEvent fields and include the field exit_code which indicates the integer exit code of the init process in the container: {"type": "cont-exit", "container_id": "4cb5b14f2f6b8e2a3e57188e230d-140f2a8880d236a5f21face723678a2c50a", "container_name": "test-container", "image_id": "7328f6f8b41890597575cbaadc884e-7386ae0acc53b747401ebce5cf0d624560", "image_name": "alpine:3.6", "monotime_nanos": 58800000000, "sensor_id": "0d76a2a9ede1bc3df805d26e90501-af54b11eabe180e963c56d27f065d9243f4", "exit_code": 0}

4. Container Destroyed

This Event represents when a previously exited Container's resources have been reclaimed and thus no longer exist.

Event Type constant: protectevent.CONTAINER_EVENT_TYPE_DESTROYED

Additional Fields

| Fields | Type | Meaning | Always Present (Y/N) |
|---|---|---|---|
| None | | | |

The JSON Factory checks the type field for a string value of "cont-destroy" for container reaped events. They include only the BaseEvent fields: {"type": "cont-destroy",
"container_id": "4cb5b14f2f6b8e2a3e57188e230d140f2-a8880d236a5f21face723678a2c50a",
"container_name": "test-container",
"image_id": "7328f6f8b41890597575cbaadc884e-7386ae0acc53b747401ebce5cf0d624560",
"image_name": "alpine:3.6",
"monotime_nanos": 58800000000,
"sensor_id": "0d76a2a9ede1bc3df805d26e90501af-54b11eabe180e963c56d27f065d9243f4"}

5. Process Fork

This Event represents when a process in a monitored Container forks a new process.

Event Type constant: protectevent.PROCESS_EVENT_TYPE_FORK

Additional Fields

| Fields | Type | Meaning | Always Present (Y/N) |
|---|---|---|---|
| ProcessUUID | string | ProcessUUID in base event is filled in | Y |
| ProcessPID | int | the PID of the process that called the fork | Y |
| ChildPID | int | The PID of the Child process from the fork | Y |
| UpdateCWD | string | The CWD at the time of the fork | Y |

The JSON Factory checks the type field for a string value of proc-fork. It contains the BaseEvent fields and all of the fields in the table above: {"type": "proc-fork",
"container_id": "4cb5b14f2f6b8e2a3e57188e230d14-0f2a8880d236a5f21face723678a2c50a",
"container name": "test-container",
"image_id": "7328f6f8b41890597575cbaadc884-e7386ae0acc53b747401ebce5cf0d624560",
"image_name": "alpine:3.6",
"sensor_id": "0d76a2a9ede1bc3df805d26e9050-1af54b11eabe180e963c56d27f065d9243f4",
"process_uuid": "394bd04468b541bdbe132a71de3671cb",
"monotime_nanos": 58800000000,
"process_pid": 2222,
"child_pid":3333}

6. Process Exec

This Event represents when a process in a monitored Container calls the execve family of syscalls to start a new program.

Event Type constant: protectevent.PROCESS_EVENT_TYPE_EXEC

Additional Fields

| Fields | Type | Meaning | Always Present (Y/N) |
|---|---|---|---|
| ProcessUUID | string | ProcessUUID in base event is filled in | Y |
| ProcessPID | int | the PID of the process that called the fork | Y |
| ProgramName | string | the path of the program being executed | Y |

The JSON Factory checks the type field for a string value of proc-exec. It contains the BaseEvent fields and all of the fields in the table above: {"type": "proc-exec",
"container_id": "4cb5b14f2f6b8e2a3e57188e230d1-40f2a8880d236a5f21face723678a2c50a",
"container name": "test-container",
"image_id": "7328f6f8b41890597575cbaadc884e-7386ae0acc53b747401ebce5cf0d624560",
"image_name": "alpine:3.6",
"sensor_id": "0d76a2a9ede1bc3df805d26e90501-af54b11eabe180e963c56d27f065d9243f4",
"monotime_nanos": 58800000000,
"process_uuid": "a856880a77274d238a5a9d1057831dec",
"process_pid": 3333,
"filename": "'exit 1'"}

7. Process Exit

This Event represents when a process in a monitored Container exits.

Event Type constant: protectevent.PROCESS_EVENT_TYPE_EXIT

Additional Fields

| Fields | Type | Meaning | Always Present (Y/N) |
|---|---|---|---|
| ProcessUUID | string | ProcessUUID in base event is filled in | Y |
| ProcessPID | int | the PID of the process that called the fork | Y |
| ExitCode | int | the Return code returned by the process that is terminating | Y |

The JSON Factory checks the type field for a string value of proc-exit. It contains the BaseEvent fields and all of the fields in the table above: {"type": "proc-exit",
"container_id": "4cb5b14f2f6b8e2a3e57188e230d1-40f2a8880d236a5f21face723678a2c50a",
"container name": "test-container",
"image_id": "7328f6f8b41890597575cbaadc884e7-386ae0acc53b747401ebce5cf0d624560",
"image_name": "alpine:3.6",
"sensor_id": "0d76a2a9ede1bc3df805d26e90501af5-4b11eabe180e963c56d27f065d9243f4",
"monotime_nanos": 58800000000,
"process_uuid": "a856880a77274d238a5a9d1057831dec",
"process_pid": 3333,
"exit_code": 1}

8. Syscall Enter

This represents that a given system call is about to be executed in a monitored Container. This is used to get scalar arguments and other values but does not tell if the system call was successful.

Event Type constant: protectevent.PROCESS_EVENT_TYPE_ENTER

Additional Fields

| Fields | Type | Meaning | Always Present (Y/N) |
|---|---|---|---|
| ProcessUUID | string | ProcessUUID in base event is filled in | Y |
| ProcessPID | int | the PID of the process that called the fork | Y |
| Number | int | the syscall number | Y |
| Name | string | the name of the syscall | Y |
| Args | [ ]uint64 | the scalar arguments to the syscall | Y |

The JSON Factory checks the type field for a string value of syscall. It contains the BaseEvent fields and all of the fields in the table above. One of the field's number or name may be omitted but not both. At the time of creation the JSON Event Factory will fill in both the name and number provided that one of the fields is present: {"type": "syscall",
"container_id": "4cb5b14f2f6b8e2a3e57188e230d-140f2a8880d236a5f21face723678a2c50a",
"container name": "test-container",
"image_id": "7328f6f8b41890597575cbaadc884-e7386ae0acc53b747401ebce5cf0d624560",
"image_name": "alpine:3.6",
"sensor_id": "0d76a2a9ede1bc3df805d26e90501-af54b11eabe180e963c56d27f065d9243f4",
"monotime_nanos": 58800000000,
"process_uuid": "394bd04468b541bdbe132a71de3671cb",
"process_pid": 3333,
"number": 0,
"name": "sys_read",
"args": [0, 1203740476025595838784, 20]}

9. Syscall Exit

This represents that a given syscall is about to return in a monitored Container. This is used to get the return values of syscalls which can indicate if the syscall was successful.

Event Type constant: protectevent.PROCESS_EVENT_TYPE_EXIT

Additional Fields

| Fields | Type | Meaning | Always Present (Y/N) |
|---|---|---|---|
| ProcessUUID | string | ProcessUUID in base event is filled in | Y |
| ProcessPID | int | the PID of the process that called the fork | Y |
| Number | int | the syscall number | Y |
| Name | string | the name of the syscall | Y |
| Ret | int64 | the scalar return value for the syscall | Y |

The JSON Factory checks the type field for a string value of syscall-exit. It contains the BaseEvent fields and all of the fields in the table above. One of the field's number or name may be omitted but not both. At the time of creation the JSON Event Factory will fill in both the name and number provided that one of the fields is present: {"type": "syscall-exit",
"container_id": "4cb5b14f2f6b8e2a3e57188e230d1-40f2a8880d236a5f21face723678a2c50a",
"container name": "test-container",
"image_id": "7328f6f8b41890597575cbaadc884e7-386ae0acc53b747401ebce5cf0d624560",
"image_name": "alpine:3.6",
"sensor_id": "0d76a2a9ede1bc3df805d26e90501af5-4b11eabe180e963c56d27f065d9243f4",
"monotime_nanos": 58800000000,
"process_uuid": "394bd04468b541bdbe132a71de3671cb",
"process_pid": 3333,
"number": 0,
"name": "sys_read",
"ret": 23}

10. File Open

This Event represents when a File is opened inside of a Container/Monitored Host.

Event Type constant: protectevent.FILE_EVENT_TYPE_OPEN

Additional Fields

| Fields | Type | Meaning | Always Present (Y/N) |
|---|---|---|---|
| Filename | string | The path to the file that was opened | Y |
| OpenFlags | int32 | The flags passed to the open syscall | Y |
| OpenMode | int32 | The mode the file was opened with | Y |

The JSON Factory checks the type field for a string value of file-open. It contains the BaseEvent fields and all of the fields in the table above: {"type": "file-open",
"container_id": "4cb5b14f2f6b8e2a3e57188e230d140f2-a8880d236a5f21face723678a2c50a",
"container name": "test-container",
"image_id": "7328f6f8b41890597575cbaadc884e738-6ae0acc53b747401ebce5cf0d624560",
"image_name": "alpine:3.6",
"sensor_id": "0d76a2a9ede1bc3df805d26e90501af54-b11eabe180e963c56d27f065d9243f4",
"monotime_nanos": 58800000000,
"process_uuid": "394bd04468b541bdbe132a71de3671cb",
"process_pid": 2222,
"filename": "/tmp/foo.txt",
"flags": 0,
"mode": 700}

11. File Close

This Event represents the combined event of ENTER and EXIT for syscall close inside of a Container.

Event Type constant: protectevent.FILE_EVENT_CLOSE

Additional Fields

| Fields | Type | Meaning | Always Present (Y/N) |
|---|---|---|---|
| FD | int32 | passed file Descriptor to be closed | Y |
| Ret | int32 | Return value of the syscall close | Y |

The JSON Factory checks the type field for a string value of syscall-close. It contains the BaseEvent fields and all of the fields in the table above: {"type": "syscall-close",
  "container_id": "4cb5b14f2f6b8e02a3e57188e230d14-0f2a8880d236a5f21face723678a2c50a",
  "container name": "test-container",
  "image_id": "7328f6f8b41890597575cbaadc884e7-386ae0acc53b747401ebce5cf0d624560",
  "image_name": "alpine:3.6",
  "sensor_id": "0d76a2a9ede1bc3df805d26e90501af5-4b11eabe180e963c56d27f065d9243f4",
  "monotime_nanos": 58800000000,
  "process_uuid": "394bd04468b541bdbe132a71de3671cb",
  "Fd": 23,
  "Ret": 0}

12. Syscall Dup

This event represents the combined event of ENTER and EXIT for syscall DUP event inside of a Container.

Event Type constant: protectevent.SYSCALL_EVENT_DUP

Additional Fields

| Fields | Type | Meaning | Always Present (Y/N) |
|---|---|---|---|
| OldFD | int32 | passed file Descriptor to be copied | Y |
| Ret | int32 | Return value of the syscall dup/ represents duplicate file descriptor of OldFD | Y |

The JSON Factory checks the type field for a string value of syscall-dup. It contains the BaseEvent fields and all of the fields in the table above: {"type": "syscall-dup",
  "container_id": "4cb5b14f2f6b8e2a3e57188e230d14-0f2a8880d236a5f21face723678a2c50a",
  "container name": "test-container",
  "image_id": "7328f6f8b41890597575cbaadc884e7-386ae0acc53b747401ebce5cf0d624560",
  "image_name": "alpine:3.6",
  "sensor_id": "0d76a2a9ede1bc3df805d26e90501af-54b11eabe180e963c56d27f065d9243f4",
  "monotime_nanos": 58800000000,
  "process_uuid": "394bd04468b541bdbe132a71de3671cb",
  "OldFd": 23,
  "Ret": 32}

13. Syscall DUP2

This Event represents the combined event of ENTER and EXIT for syscall DUP2 event inside of a Container.

Event Type constant: protectevent.SYSCALL_EVENT_DUP2

Additional Fields

| Fields | Type | Meaning | Always Present (Y/N) |
|---|---|---|---|
| OldFD | int32 | passed file Descriptor to be copied | Y |
| NewFD | int32 | passed file Descriptor to be copied to | Y |
| Ret | int32 | Return value of the syscall dup2/ represents new descriptor for OldFD | Y |

The JSON Factory checks the type field for a string value of syscall-dup2. It contains the BaseEvent fields and all of the fields in the table above: {"type": "syscall-dup2",
  "container_id": "4cb5b14f2f6b8e02a3e57188e230d1-40f2a8880d236a5f21face723678a2c50a",
  "container name": "test-container",
  "image_id": "7328f6f8b41890597575cbaadc884e7-386ae0acc53b747401ebce5cf0d624560",
  "image_name": "alpine:3.6",
  "sensor_id": "0d76a2a9ede1bc3df805d26e90501af5-4b11eabe180e963c56d27f065d9243f4",
  "monotime_nanos": 58800000000,
  "process_uuid": "394bd04468b541bdbe132a71de3671cb",
  "OldFd": 23,
  "NewFd": 32,
  "Ret": 0}

14. Syscall DUP3

This Event represents the combined event of ENTER and EXIT for syscall DUP3 event inside of a Container.

Event Type constant: protectevent.SYSCALL_EVENT_DUP3

Additional Fields

| Fields | Type | Meaning | Always Present (Y/N) |
|---|---|---|---|
| OldFD | int32 | passed file descriptor to be copied | Y |
| NewFD | int32 | passed file descriptor to be copied to | Y |
| Flags | int32 | passed flags passed for new file descriptor | Y |
| Ret | int32 | Return value of the syscall dup3/ represents duplicate descriptor for OldFD | Y |

The JSON Factory checks the type field for a string value of syscall-dup3. It contains the BaseEvent fields and all of the fields in the table above: {"type": "syscall-dup3",
  "container_id": "4cb5b14f2f6b8e2a3e57188e230d1-40f2a8880d236a5f21face723678a2c50a",
  "container_name": "test-container",
  "image_id": "7328f6f8b41890597575cbaadc884e7-386ae0acc53b747401ebce5cf0d624560",
  "image_name": "alpine:3.6",
  "sensor_id": "0d76a2a9ede1bc3df805d26e90501a-f54b11eabe180e963c56d27f065d9243f4",
  "monotime_nanos": 58800000000,
  "process_uuid": "394bd04468b541bdbe132a71de3671cb",
  "OldFd": 23,
  "NewFd": 32,
  "Flags": 444,
  "Ret": 0}

15. Type NetworkAddress

This struct defines fields for NetworkAddress.

| Fields | Type | Meaning | Always Present (Y/N) |
|---|---|---|---|
| Family | NetworkAddressFamily | Represents family one of UNKNOWN, IPV4, IPV6, LOCAL | Y |
| Address | string | network address of type CIDR | Y |

16. Syscall Connect

This Event represents combined event of ENTER and EXIT for syscall connect event inside of a Container.

Event Type constant: protectevent.SYSCALL_EVENT_CONNECT

Additional Fields

| Fields | Type | Meaning | Always Present (Y/N) |
|---|---|---|---|
| MonotimeNanosEnter | int64 | Timestamp of syscall connect enter event | Y |
| Fd | int32 | passed socket file descriptor | Y |
| NetworkAddr | NetworkAddress | passed network address | Y |
| Port | int32 | Passed port number | Y |
| Ret | int32 | Return value of the syscall connect | Y |

The JSON Factory checks the type field for a string value of syscall-connect. It contains the BaseEvent fields and all of the fields in the table above: {"type": "syscall-connect",
 "container_id": "4cb5b14f2f6b8e2a3e57188e230d14-0f2a8880d236a5f21face723678a2c50a",
 "container name": "test-container",
 "image_id": "7328f6f8b41890597575cbaadc884e-7386ae0acc53b747401ebce5cf0d624560",
 "image_name": "alpine:3.6",
 "sensor_id": "0d76a2a9ede1bc3df805d26e90501-af54b11eabe180e963c56d27f065d9243f4",
 "monotime_nanos": 58800000000,
 "process_uuid":
    "394bd04468b541bdbe132a71de3671cb",
 "Fd": 23,
 "SockAddrPtr": 40404040,
 "AddrLen": 4,
 "Ret": 0}

17. Syscall Accept

This Event represents the combined event of ENTER and EXIT for syscall accept event inside of a Container.

Event Type constant: protectevent.SYSCALL_EVENT_ACCEPT

Additional Fields

| Fields | Type | Meaning | Always Present (Y/N) |
|---|---|---|---|
| MonotimeNanosEnter | int64 | Timestamp of syscall connect enter event | Y |
| Fd | int32 | passed socket file descriptor | Y |
| NetworkAddr | NetworkAddress | passed network address | Y |
| Port | int32 | Passed port number | Y |
| Ret | int32 | Return value of the syscall accept/new socket descriptor for connection | Y |

The JSON Factory checks the type field for a string value of syscall-accept. It contains the BaseEvent fields and all of the fields in the table above: {"type": "syscall-accept",
 "container_id": "4cb5b14f2f6b8e2a3e57188e230d14-0f2a8880d236a5f21face723678a2c50a",
 "container name": "test-container",
 "image_id": "7328f6f8b41890597575cbaadc884e7-386ae0acc53b747401ebce5cf0d624560",
 "image_name": "alpine:3.6",
 "sensor_id": "0d76a2a9ede1bc3df805d26e90501af5-4b11eabe180e963c56d27f065d9243f4",
 "monotime_nanos": 58800000000,
 "process_uuid":
    "394bd04468b541bdbe132a71de3671cb",
 "Fd": 23,
 "networkaddress": {"family": 0,
 "address": "192.168.0.1./24"},
 "Ret": 32}

18. Syscall Bind

This Event represents the combined event of ENTER and EXIT for syscall bind event inside of a Container.

Event Type constant: protectevent.SYSCALL_EVENT_BIND

Additional Fields

| Fields | Type | Meaning | Always Present (Y/N) |
|---|---|---|---|
| MonotimeNanosEnter | int64 | Timestamp of syscall connect enter event | Y |
| Fd | int32 | passed socket file descriptor | Y |
| NetworkAddr | NetworkAddress | passed network address | Y |
| Port | int32 | Passed port number | Y |
| Ret | int32 | Return value of the syscall bind | Y |

19. Syscall Listen

This Event represents the combined event of ENTER and EXIT for syscall listen event inside of a Container.

Event Type constant: protectevent.SYSCALL_EVENT_LISTEN

Additional Fields

| Fields | Type | Meaning | Always Present (Y/N) |
|---|---|---|---|
| MonotimeNanosEnter | int64 | Timestamp of syscall connect enter event | Y |

-continued

| Fields | Type | Meaning | Always Present (Y/N) |
|---|---|---|---|
| Fd | int32 | passed socket file descriptor | Y |
| Backlog | int32 | passed maximum number of pending connections | Y |
| Ret | int32 | Return value of the syscall listen/new socket descriptor for connection | Y |

Example JSON: {"type": "syscall-accept",
"container_id": "4cb5b14f2f6b8e2a3e57188e230d14-0f2a8880d236a5f21face723678a2c50a",
"container name": "test-container",
"image_id": "7328f6f8b41890597575cbaadc884e7-386ae0acc53b747401ebce5cf0d624560",
"image_name": "alpine:3.6",
"sensor_id": "0d76a2a9ede1bc3df805d26e90501af-54b11eabe180e963c56d27f065d9243f4",
"monotime_nanos": 58800000000,
"process_uuid": "394bd04468b541bdbe132a71de3671cb",
"Fd": 23,
"SockAddrPtr": 40404040,
"AddrLenPtr": 41414141,
"Ret": 32}

20. KProbe SMEP SMAP

This Event represents when the function native_write_cr4 was called in the kernel, by using a kprobe. It contains the new CR4 value (the first argument to that function) and is used to determine if the new value disables SMEP/SMAP in the CR4 register of a given processor.

Event Type constant: protectevent.KPROBE_EVENT_SMEP_SMAP_TYPE

Additional Fields

| Fields | Type | Meaning | Always Present (Y/N) |
|---|---|---|---|
| NewCR4Value | uint64 | The Value of CR4 that will be set | Y |

This type also defines helper functions to determine if the NewCR4Value disables SMEP and SMAP. They are:
DisablesSMEP( ) bool
DisablesSMAP( ) bool The JSON Factory checks the type field for a string value of smep-smap for container reaped events. They include only the BaseEvent fields and a cr4 field which is the integer value that the CR4 register would be set to: {"type": "smep-smap",
"container_id": "4cb5b14f2f6b8e2a3e57188e230d1-40f2a8880d236a5f21face723678a2c50a",
"container name": "test-container",
"image_id": "7328f6f8b41890597575cbaadc884-e7386ae0acc53b747401ebce5cf0d624560",
"image_name": "alpine:3.6",
"sensor_id": "0d76a2a9ede1bc3df805d26e905-01af54b11eabe180e963c56d27f065d9243f4",
"monotime_nanos": 58800000000,
"cr4": 4226827}

21. KProbe AppArmor

This Event represents when a KProbe has been used to scan Kernel Memory to check if AppArmor is enabled and enforcing its policies. It returns the value of the memory used for the configuration variable.

Event Type constant: protectevent.KPROBE_EVENT_APP_ARMOR_TYPE

Additional Fields

| Fields | Type | Meaning | Always Present (Y/N) |
|---|---|---|---|
| None | | | |

22. KProbe SELinux

This Event represents when a KProbe has been used to scan Kernel Memory to check if SELinux is enabled and enforcing its policies. It returns the values of the variables that control SELinux.

Event Type Constant:
Additional Fields

| Fields | Type | Meaning | Always Present (Y/N) |
|---|---|---|---|
| None | | | |

23. KProbe Stack Create

This Event represents when the KProbe on arch_align_stack has fired, which means a program's stack has been created.

Event Type constant: protectevent.KPROBE_EVENT_STACK_CREATE

Additional Fields

| Fields | Type | Meaning | Always Present (Y/N) |
|---|---|---|---|
| stackhighaddr | uint64 | The high bound of the stack | Y |

24. KProbe Stack Expand

This Event represents when the KProbe on expand_stack has fired, which means a program's stack has been expanded down.

Event Type constant: protectevent.KPROBE_EVENT_STACK_EXPAND

Additional Fields

| Fields | Type | Meaning | Always Present (Y/N) |
|---|---|---|---|
| Stack_low_addr | uint64 | The new low bound of the stack | Y |

25. KProbe Load Kernel Module

This Event represents when the KProbe on do_init_module has fired, which means a new kernel module is being loaded.

Event Type constant: protectevent.KPROBE_EVENT_LOAD_KERNEL_MODULE_TYPE

Additional Fields

| Fields | Type | Meaning | Always Present (Y/N) |
|---|---|---|---|
| Do_init_module_module_name | string | The name of the module being loaded | Y |

26. KProbe Permissions Modification

This Event represents when the KProbe on sys_fchmodat has fired, which means a permissions change has been requested.

Event Type constant: protectevent.KPROBE_EVENT_CHMOD_TYPE

Additional Fields

| Fields | Type | Meaning | Always Present (Y/N) |
|---|---|---|---|
| Sys_fchmodatf_name | string | The name of the file/directory whose permissions are changed | Y |
| sysfchmodatmode | uint64 | The new permissions mask | Y |

27. Ticker

This Event represents the state of the host clock on a given sensor.

Event Type constant: protectevent.TICKEREVENTTYPE

Additional Fields

| Fields | Type | Meaning | Always Present (Y/N) |
|---|---|---|---|
| nanoseconds | int64 | The number of nanoseconds since the UNIX epoch according to the sensor's clock | Y |
| seconds | int64 | The number of seconds since the UNIX epoch according to the sensor's clock | Y |

The JSON Factory checks the type field for a string value "ticker" for container creation events. They include all of the BaseFields and the fields mentioned above. optionally includes the DockerConfigJSON or OCIConfigJSON fields as strings: {"type": "ticker",
  "container_id": "4cb5b14f2f6b8e2a3e57188e230d140f-2a8880d236a5f21face723678a2c50a",
  "container_name": "test-container",
  "image_id": "7328f6f8b41890597575cbaadc884e7-386ae0acc53b747401ebce5cf0d624560",
  "image_name": "alpine:3.6",
  "sensor_id": "0d76a2a9ede1bc3df805d26e90501af5-4b11eabe180e963c56d27f065d9243f4",
  "monotime_nanos": 58800000000,
  "nanoseconds": 1257894000000000000,
  "seconds": 1257894000}

28. Configuration Event

This Event is used by the JSON Factory to simulate a Platform API message indicating a configuration change, since the platform provides configuration files for each strategy/component.

Event Type constant: protectevent.CONFIG_EVENT

Additional Fields

| Fields | Type | Meaning | Always Present (Y/N) |
|---|---|---|---|
| topic | string | The string topic name of the configurations, it is effectively a section prefix. for all values | Y |
| values | string | a list of Javascript objects with keys "name", and "value": as strings | Y |

Example JSON: {"type": "config",
"topic": "strategy.dummy",
"values": [{"name": "enabled", "value": "true"}]
}

A more complicated example follows. Arbiter 408 requires that filters be applied. The below JSON example shows how to apply two filters: one that says only alerts from the container where the ID is 98e73918fad6, and one that says any Alerts that are have a priority lower than HIGH should be provided:
{"type": "config",
"topic": "arbiter",
"values": [{"name": "enabled", "value": "true"},
  {"filters": "container_id==98e73918fad6, priority <HIGH"}]
}

VI. Strategies

Analytics framework 400 provides security monitoring capabilities through modular components called Strategies. As discussed above, a Strategy is a piece of detection logic that consumes Events and produces either Alerts or Events of Interest, in various embodiments.

A. Overview

Strategies are designed to provide diverse, overlapping layers of system security monitoring to cover the many facets of an attack. Attack categories and entire vulnerability classes are covered by detecting the low-level behaviors required to carry out an exploit or other security violation. Therefore, Strategies are geared towards low-level system monitoring, providing a lightweight mechanism for the observation and detection of behavioral events which may be indications of unauthorized or malicious behavior within an organization's environment.

Individual Strategies are mechanisms for defining policies or sets of rules for a specific class of security-related Events which may occur on a system. A Strategy is defined by a policy type and a set of rules; each Strategy is responsible for monitoring a certain set of behaviors defined by its policy type and for raising an alert if any of these behaviors violate its rules. For instance, Strategies having a policy of type "connect" monitor network connections. If the rules specified in a given Strategy configuration match the behavior observed (e.g., if a connection to a blacklisted domain is performed), then an Alert is raised. Each Strategy will generate a single Alert when it detects a violation. Users may deploy multiple Strategies of the same policy concurrently, so as to have granular control of how many Alerts are to be generated and how these Alerts shall be generated for different contexts. For example, an unexpected outbound connection to an internal subnet could raise a lower-priority alert than an outbound connection to an unknown host on the Internet.

The types of Events that Strategies monitor vary, ranging from common system operations (such as network connections and program execution) to Events which are explicitly impactful on security (such as unauthorized privilege escalation or the disabling of Linux Security Modules). Detection of low-level system Events is carried out by a Sensor; this Event stream is then sent to Analytics framework 400, which processes the Events and extracts data to be used by the Strategies. Each Strategy receives Event data relevant to its policy type, determines if the operation observed matches any of its rules, and raises an Alert if necessary.

B. Strategy Configuration

The rules that are set for a Strategy define whether an observed behavior is authorized or unauthorized. For example, a strategy may be built upon the program policy, which monitors program execution, and have a set of rules that authorize commands issued only from a certain list of whitelisted programs. This Strategy will raise Alerts whenever a command is executed from a program not on this list. The nature of the rules that can be defined in various Strategies depends on the policy of the respective strategy. Thus, IP addresses present in rules might only be relevant for Strategies based on connect or sendto policies, whereas program/parent program names might only be relevant for policies involving process interactions.

Below is an example of a configuration file that defines a single Strategy which monitors program execution:
Program Execution Whitelist Strategy:
  policy: program
  alertMessage: Unauthorized Program Execution
  comments: This strategy detects when an unauthorized program has issued a command.
  priority: High
  enabled: true
  rules:
  ignore programName in $ProgramWhitelist
  default match
ProgramWhitelist:
  type: paths
  description: whitelist of authorized programs
  list:
  /bin/ls
  /bin/sh In the example above, a Strategy named "Program Execution Whitelist Strategy" is defined, which is of policy "program." The message to appear in the generated Alert should this Strategy fire in the alertMessage field is also specified, as well as the priority of this Alert, priority. The Strategy rules denoting when and how this Strategy will fire alerts are listed under rules. The rules defined above are denoting that an Alert should always be fired unless the program name of the executing program is in the "ProgramWhitelist" list. The defined list "ProgramWhitelist" is a list of paths (as denoted by its type) of programs in the system that are allowed to execute commands.

The aforementioned example is a simple use case of the supported policies. Different types of lists and policies are supported, and a configuration file may define any number of Strategies and lists. More information on list and Strategy configurations is defined later in this section.

Strategies may refer to lists when constructing rules, and multiple Strategies may refer to the same list; any list referenced by a Strategy must be defined within the same configuration file. A Strategy rule refers to a list by prepending the list name with the special character $.

A strategy is uniquely identified, in various embodiments, as a YAML key containing a policy sub-key. The top-level key, which essentially denotes the start of a Strategy configuration, also serves as the name of the Strategy for the given configuration (see "Program Execution Whitelist Strategy" in the previous example).

1. List Definitions

Lists are defined to be used in Strategy rules, controlling when and how Alerts should be fired.

a. List Types

Configuration lists can have the following types, in various embodiments:

i. names

Name lists store strings. The following is an example of a valid name list:
ContainerWhitelist:
  type: "names"
  description: "ignore all activity from these containers"
  list:
  "/test-container-001": "this is a test container"
  "/test-container-002": "this is a second test container"

ii. Hosts

Host lists store IP addresses as CIDR blocks. Additionally, host lists have a required lookupDNS variable, which will resolve a domain name to an IP address if set to true. Users may add domain names to their host list only if lookupDNS is true; a host list with lookupDNS set to false and a domain name in its list will not be a valid list and return a configuration error. The following are examples of valid host lists:
SampleHostlist_1:
type: "hosts"
lookupDNS: false
list:
  "1.0.0.0/8"
  "3.3.3.0/16"
SampleHostlist_2:
type: "hosts"
lookupDNS: true
list:
  "www.capsule8.com": "our website!"

iii. Paths

Path lists store program or file paths. Paths may be written with the wildcard operator *, which will match on all paths that fit the pattern. The following is an example of a valid path list:
AuthorizedPrograms
type: "paths"
description: whitelist of authorized programs
list:
  "/bin/bash"
  "/bin/sh"
  "/usr/sbin/*": "this will match all programs beginning with /usr/sbin/"

iv. Numbers

Number lists store integers. The following is an example of a valid number list:
PortList
type: "numbers"
list:
  80
  443

2. Strategy Definitions

In addition to default fields, Strategies may have extra configuration options that are specific to the operation of their policy. These are documented in each policy's respective documentation file.

a. Strategy Rules

Each policy exposes a set of valid fields that can be used for the construction of higher-level rules in strategies. Thus, in each strategy's definition, the rules option determines how an alert will be generated upon the receipt of an event.

i. Match and Ignore Rules

Each rule begins with either the keyword match or ignore. If the predicate following a match rule is satisfied, that will result in an alert being fired by the respective strategy, whereas a predicate that satisfies an ignore rule will not. The only cases of rules that do not start with either a match or ignore directive are default rules, which are always defined at the end of any given ruleset, and specify what action should be taken if none of the predicates up to that point were satisfied.

A ruleset may have any number of match or ignore rules, but must have at least a default match or a default ignore. A default match operates as a whitelist: the Strategy will alert on all cases, unless the behavior event satisfied a previous ignore rule. A default ignore operates as a blacklist: the Strategy will not alert on any cases, unless the behavior event satisfied a previous match rule.

If a Strategy has multiple rules, all rules are evaluated in order beginning from the top of the list. If the rule predicate evaluates to true on a certain behavior event, further evaluation for that event stops and the Strategy either raises an alert (if it was a match rule) or ignores (if it was an ignore rule). Otherwise the Strategy proceeds to evaluation of the following rule, until it reaches the default match or the default ignore at the end of the ruleset.

ii. Predicates

A predicate may be constructed from operations on valid event fields of each policy, or from operations on other predicates. Predicate operations on event fields take two operands: the field name and a value to be checked against. The value may be a literal (e.g., string, int) or a list.

iii. Valid Event Fields

Each policy type has valid Event fields on which to filter behavioral Events.

iv. Examples

The following ruleset will alert on every event:
rules:
default match
The following ruleset will not alert on any event:
rules:
default ignore
The following two rulesets are equivalent:
rules:
ignore containerName=="test-container"
default match
rules:
match containerName "test-container"
default ignore These rules will raise an alert on every event except those where containerName is test-container (equivalent to whitelisting test-container). The following is an example of nested rules:
rules:
ignore programName=="/foo/bar/*"
match programName=="/foo/*"
default ignore These rules effectively blacklist the directory /foo/, except for the subdirectory /foo/bar/within it. To match all containers whose names start with "gcp" and end with "_Europe":
rules:
match containerName like ^gcp.*_Europe$
default ignore
To match all containers except those whose names start with "gcp" and end with "_Europe",
rules:
match containerName not_like ^gcp.*_Europe$
default ignore

3. Alerts

The following is a sample Alert, generated by a strategy which alerts on execution of newly created files:
{
"timestamp": "2018-10-03T15:31:41.849692582Z",
"scope": "PROCESS",
"priority": "HIGH",
"confidence": 1,
"notifications": [
  {
    "timestamp": "2018-10-03T15:31:41.849692582Z",
    "name": "NewFilesShouldNeverBeExecdByNginx",
    "uuid": "806d2e1b-ba46-453e-9458-d441a685d-9e6",
    "message": "The program \"/usr/bin/nginx\" with PID 850174 in container \"/k8s_capsule8-server_capsule8-server-85b5dc8568-86c88_default_d8ee4a59-c35e-11e8-abbe-42010a800037_0\" executed newly created file \"./privesc.sh\". This action matched the \"match parentProgramName==/usr/bin/nginx\" policy rule (where parentProgramName (/usr/bin/nginx)==/usr/bin/nginx)."
  }
],
"matched_rule": "match parentProgramName==/usr/bin/nginx",
"matched_objects": [
  {
    "matched_field": "parentProgramName",
    "matched_value": "/usr/bin/nginx",
    "matched_pattern": "/usr/bin/nginx",
    "matched_description": " "
  }
],
"alert_group_id": " ",
"description": "New File executed by web server",
"uuid": "NewFilesShouldNeverBeExecdByNginx-c2c481cbe8370168041cc7ebf2dd5864fe25aa4abf6e-4d4d66dcebcO3ed016d",
"location": {
  "node_name": "capsule8-sensor-4vfk7",
  "container id": "f6e3elda2878c27b35df874d486e701dab5b3f477-6c8b578cde89dcfc90e4760",
  "container_name": "/k8s_capsule8-server_capsule8-server-85b5dc8568-86c88_default_d8ee4a59-c35e-11e8-abbe-42010a800037_0",
  "image_id": "14dbf0b16f71ae7736dbae4a23f8212-c912178c318511cb96f9c603b501478",
  "image_name": "us.gcr.io/testing-playground-214818/capsule8-server@sha256:b521ea40d7cf311cc9f7-bdfcO1dd44f2b8542c88ef445ef9fec7487ed9caec-12",

```
"sensor_id":    "7f61568de0df2240e20e7932781d782-
    ae72d9db128f3ce826fd7bb59c1e25db4"
},
"process_info": {
    "pid": 873136,
    "ppid": 850174,
    "pid_uuid":         "5900db11-aab6-481c-b8cc-
        fc6fa5a3b76a-873136-3005012116940388",
    "name": "./privesc.sh",
    "args": [
        "./privesc.sh"
    ],
    "children": null,
    "parent": null,
    "cwd": " ",
    "uid": 0,
    "gid": 0,
    "euid": 100,
    "egid": 65533,
    "suid": 0,
    "sgid": 1131636068,
    "fsuid": 100,
    "fsgid": 65533
},
"strategy_name": "NewFilesShouldNeverBeExecdByNginx",
"policy_type": "newFileExec",
"metadata": {
    "arch": "x86_64",
    "container_runtime": "not-found",
    "in_container": "false",
    "kernel_release": "4.4.0-134-generic",
    "kernel_version": "#160-Ubuntu SMP Wed Aug 15 14:58:00 UTC 2018",
    "network_interface_br-aa43deac176c_flags":
        "up|broadcast|multicast",
    "network_interface_br-
        aa43deac176c_hardware_addr":    "02:42:26:50:f3:
        47",
    "network_interface_br-aa43deac176c_index": "4",
    "network_interface_br-aa43deac176c_mtu": "1500",
    "network_interface_docker0_flags":    "up|broadcast-
        |multicast",
    "network_interface_docker0_hardware_addr": "02:42:
        1b:7a:8e:6e",
    "network_interface_docker0_index": "3",
    "network_interface_docker0_mtu": "1500",
    "network_interface_enp0s3_flags":    "up|broadcast-
        |multicast",
    "network_interface_enp0s3_hardware_addr":  "02:fe:
        a1:ea:7d:d1",
    "network_interface_enps3_index": "2",
    "network_interface_enp0s3_mtu": "1500",
    "network_interface_lo_flags": "up|loopback",
    "network_interface_lo_index": "1",
    "network_interface_lo_mtu": "65536",
    "network_interface_vethc468d59_flags":   "up|broad-
        cast|multicast",
    "network_interface_vethc468d59_hardware_addr":
        "ca:de:c2:f7:27:79",
    "network_interface_vethc468d59_index": "17576",
    "network_interface_vethc468d59_mtu": "1500",
    "node_hostname": "ubuntu-xenial",
    "starttime": "2018-10-18T19:22:13.620487107Z",
    "uname_hostname": "ubuntu-xenial",
    "uname_os": "Linux"
    }
}
```

The Strategy deployed to create an Alert on the above activity is shown below:

NewFilesShouldNeverBeExecdByNginx:
    alertMessage: New File executed by web server
    comments: New files should never be executed by a web server, this indicated potential compromise through a web shell
    enabled: true
    fileTimeout: 30
    policy: newFileExec
    priority: High
    rules:
    match parentProgramName==/usr/bin/nginx
    default ignore Upon detecting an attack or policy violation, Strategies generate output in the form of Alerts. Alerts can be grouped together by Strategies based on properties of interest (e.g., in case they belong to the same node or Process Tree).

a. Scope

The scope is intended to identify the "blast radius" of an attack, which aims to act as guidance for the amount of remediation or forensic response required. For example, if the Alert scope is "container," it indicates that other containers on the same host are not affected, and so a response action could be as simple as destroying the offending container. Another example is if the scope is "process," the impact is scoped to a single process, and killing that process would mitigate the attack or policy violation. In the case of a Strategy detecting kernel-level exploitation, the scope will be "node," indicating that the entire node should be distrusted (where an appropriate response might be to bring the node offline).

b. Location

The Alert location describes the most specific entity that produced the Alert. Note that locations are container-aware and as such may have empty values for container/image when not in a containerized environment. For example, not all of the location fields will be present for alerts relating to kernel attacks, as those attacks apply to the node (existing outside of the container) and thus do not have corresponding container information.

| Field | Description |
| --- | --- |
| sensor_id | The ID of the Sensor running on the node responsible for the events described in the Alert |
| container_id | The ID of the container responsible for the events described in the alert |
| container_name | The name of the container described by container_id |
| image_id | The ID of the container image for the container described by container_id |
| image_name | The name of the image described by the image_id | c. Process Information

The process_info field describes the process and any parent processes of the process that generated the Alert. It is used as a further refinement of the Alert location and allows for further context to be included as part of the Alert. As with Alert location, note that the process_info fields will not be present for Alerts for which there is no associated process.

| Field | Description |
| --- | --- |
| pid | The process ID |
| ppid | The parent process ID |
| pid_uuid | Unique process identifier; as PIDs can be reused, this identifier uniquely describes a process instance |
| name | The program running in the process at time of Alert |
| args | Program arguments of the process this Alert occurred in |
| children | Child processes of the process |
| parent | Parent process of this process |
| cwd | Current working directory of this process |
| uid | User ID of the task/thread |
| gid | Group ID of the task/thread |
| euid | Effective user ID of the task/thread |
| egid | Effective group ID of the task/thread |
| suid | Set user ID of the task/thread |
| sgid | Set group ID of the task/thread |
| fsuid | File system user ID of the task/thread |
| fsgid | File system group ID of the task/thread | d. Notifications

In Analytics framework 400, multiple pieces of the system may modify or take actions related to a specific Alert. To accommodate this, the Alert format contains a notifications field to allow for updates to a specific Alert. At a minimum there is always one notification from the strategy that created the Alert. The information in the notifications field contains more detailed information about what action was taken and when. In the case of Strategies this is the initial reason that an Alert was created.

Example notifications subfields include:

| Field | Description |
| --- | --- |
| timestamp | notification-specific Unix timestamp in nanoseconds, generated by protect at time of notification creation |
| name | name of the notification (commonly the name of the strategy) |
| uuid | notification-specific unique identifier |
| message | the message text of the notification, most commonly for describing the specific details of an alert |

4. Caveats a. YAML Special Characters

Since configuration for Strategies follows the YAML specification, an assumption can be made that any characters with a special YAML functionality will be escaped with quotes whenever they are to be used in list or Strategy definitions. For instance, the following path list will result in an error, since, according to the YAML specification, *x is used as a reference, and the YAML parser will look for the appropriate anchor.

FailingList:
type: paths
description: this fails since x is treated as a reference to an anchor
list:
  *x Thus, if *x is to act as a wildcard for any path ending in x, the respective entry in the list should be "*x". The same principle applies to the following:

Any of the characters :, {, }, [,], , &, *, #, ?, |, -, <, >, =, !, %, @, '

Any of the control characters \0, \x01, \x02, \x03, \x04, \x05, \x06, \a, \b, \t, \n, \v, \f, \r, \x0e, \x0f, \x10, \x11, \x12, \x13, \x14, \x15, \x16, \x17, \x18, \x19, \x1a, \e, \x1c, \x1d, \x1e, \x1f, \N, _, \L, \P The strings true and false Null and ~

In the same spirit, attention should be given to strings that could be parsed as numbers (e.g., 12e7, 3.4) and vice-versa, or strings that could be parsed as dates (2018-01-08).

b. Regular Expression Matching

Path comparisons follow the glob format. However, advanced cases requiring regular expression matching can be used using the like and not_like operators.

Regular expressions used in the filter rules match the POSIX ERE (egrep) syntax and the match semantics follow the leftmost-longest convention. That is, when matching against text, the regexp returns a match that begins as early as possible in the input (leftmost), and among those it chooses a match that is as long as possible. There can be multiple leftmost-longest matches, with different submatch choices: among the possible leftmost-longest matches, in various embodiments, the one that a backtracking search would have found first is selected, per Golang's POSIX-compliant regular expression matching.

C. Strategy Telemetry Collection Map

1. Introduction

This section describes example data collected by Strategies and can be used to identify which Strategies may result in a higher rate of data collection (and thus also additional processing time/resource requirements) based on different workload types.

The Sensor employs multiple methods of telemetry collection from different data sources based on data-source availability, which is usually dependent on kernel version and build options. The primary mechanisms used for telemetry collection are:

Tracepoints: data-collection taps built into various kernel subsystems.

Kprobes: on-demand collection "hooks" capable of being placed on almost any of the exported kernel symbols, and can be set to collect data on function entry or on function return, which are called Kretprobes. Kprobes allow for basic filters to be set to limit collection to occur only when the conditions of the filter match.

Perf Counters: these are the hardware-enabled performance counters, accessed through the perf subsystem. Specifically, the performance counters for cache fetch and cache miss are used for detecting side-channel attacks.

In various embodiments, the Sensor attempts to use the highest performing and modern collection mechanisms whenever possible, falling back on using older or less well performing data sources in the presence of less equipped kernels or unsupported mechanisms. For example, Tracepoints are used instead of Kretprobes to collect return-values from syscalls; however, Kretprobes must often be used for collecting other (non-syscall) return-values where Tracepoint support is not available.

One approach attackers often use when attempting to compromise a server (e.g., workload instance 102 or legacy system 106) is to exploit the server's kernel. One such technique is to disable Supervisor Mode Execution Prevention (SMEP) and/or Supervisor Mode Access Prevention (SMAP) by modifying the corresponding bit in the CR4 control register. Another such technique is, on servers protected with SELinux and/or AppArmor, for attackers to attempt to disable those protection modules. Yet another technique attackers use is to call sensitive kernel functions with a return-address in userland. Another technique includes accessing/reaching internal kernel functions or states without the requisite predecessor functions or states having taken place. An example is the behavior of calling a sensitive internal kernel function used to modify a process's privileges, which was not first preceded by calling the functions which determine if such authorization is granted. An analogy is that under normal circumstances, one should never observe a bank vault door opening if no one is signed into the bank/if no one has used the front door to first get inside the bank (as is the normal route). Each of these types of attacks, and similar types of attacks, can be detected by embodiments of analytics framework 400.

Figure 25:
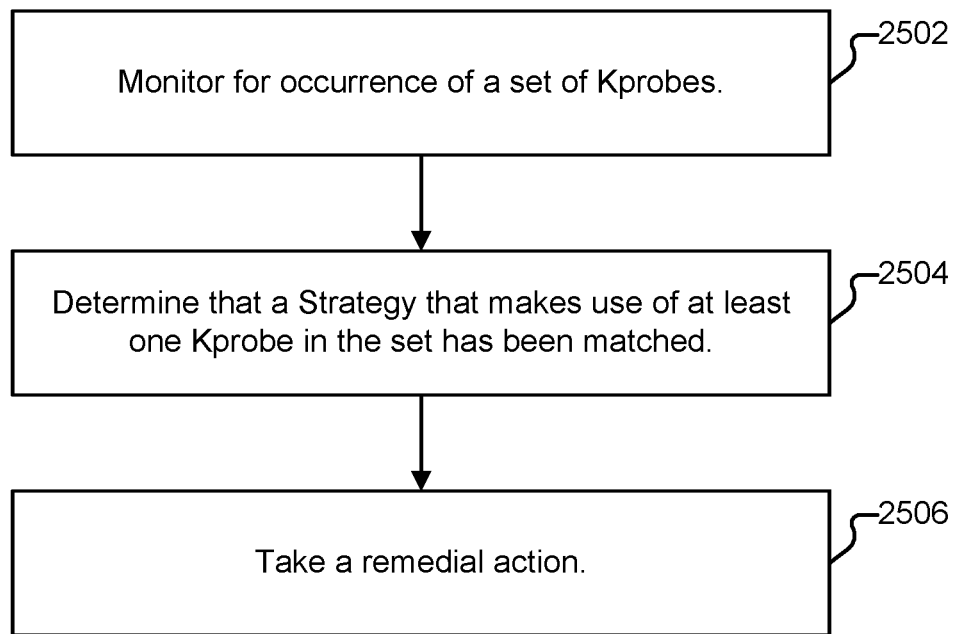
FIG. 25 illustrates an embodiment of a process for detecting use of a kernel exploit.

FIG. 25 illustrates an embodiment of a process for detecting use of a kernel exploit. In various embodiments, process 2500 is performed by analytics framework 400. Process 2500 begins at 2502 when a set of Kprobes is monitored for occurrence (and, as applicable, particular arguments/data associated with those Kprobes). As one example, a function used to set the CR4 control register (e.g., native_write_cr4) is monitored for execution. Other examples of Kprobes are discussed throughout this Specification. At 2504, a determination is made that a Strategy involving at least one of the Kprobes in the set has been matched. As one example, the SMEP/SMAP Strategy monitors for use of the function used to set the CR4 register. If the function is used, the Strategy will be met. At 2506, a remedial action is taken in response to the determination made at 2504. A variety of actions can be taken in response to determining that a kernel is being exploited. As one example, the node (e.g., workload instance 102) can be segregated from network functionality.

2. Internal Sensor Telemetry Collection

By default, the Sensor collects a set of limited telemetry to establish a core capability of system monitoring focused on processes and containers; this collection is independent of any externally requested or strategy-defined subscriptions. The sources for this data vary depending on kernel version and availability. FIG. 26 outlines example and fallback tracepoints and kprobes the Sensor uses for its core facilities, grouped by the purpose the telemetry serves.

3. Strategy Telemetry Subscriptions

This section details example telemetry collected by various Strategies.

a. Ptrace Strategy

The Ptrace Strategy produces an alert when ptrace (or ptrace-related) functions are used in a non-whitelisted process. Ptrace is intended to provide debugging facilities on Linux, but can be used as a means of stealthy lateral movement between processes, such as in injecting malicious code into services such as SSH. This use of ptrace functions also serves as a signal that someone is using debugging functionality, which may violate production-environment policies.

Kprobes: sys_ptrace, sys_process_vm_writev
Tracepoint (return): sys_ptrace b. Memory Protection Strategy The Memory Protection Strategy provides monitoring for attempts to exploit memory-mismanagement software vulnerabilities. Attempts to exploit these vulnerabilities to execute arbitrary code (also known as shellcode) commonly involve a step to modify the permissions on memory containing attacker-controlled data, so that the attacker-controlled data can be executed as program code.

Kprobes: sys_mprotect, sys_brk, sys_sigaltstack, expand_stack
Kretprobes: arch_align_stack
Tracepoint (return): sys_mprotect, sys_brk c. Stack Pivot Strategy The stack pivot detection Strategy examines the stack pointer on certain syscalls and ensures that it is within normal stack bounds. Having a stack pointer reference an address outside the bounds of the stack is normally indicative of a stack pivot as part of an exploit chain.

Kprobes: sys_execve, sys_mprotect, sys_sigaltstack, expand_stack
Kretprobes: arch_align_stack d. New File Exec The new file exec Strategy watches for execution of newly created files by non-whitelisted programs and if such created files are executed within the configured timeout.

Kprobes: sys_execve, do_sys_open with a filter for O_CREAT e. Privilege Escalation The Privilege Escalation Strategy monitors for privilege escalation attacks that overwrite process privileges without going through a setuid or setgid call.

Kprobes: sys_setuid, sys_setgid, sys_setreuid, sys_setregid, sys_setresuid, sys_setresgid, commit_creds, install_exec_creds
Kretprobes: install_exec_creds
Tracepoint (return): sys_setuid, sys_setgid, sys_setreuid, sys_setregid, sys_setresuid, sys_setresgid f. Sendto Blacklist/Whitelist The connection blacklist and whitelist strategies monitor calls to sendtoo and sendmsgo (most commonly UDP) and compare the destination host to its configured blacklists or whitelists.

Kprobes: sys_sendto, sys_sendmsg
Tracepoint (return): sys_sendto, sys_sendmsg g. Connect Blacklist/Whitelist The connection blacklist and whitelist Strategies monitor calls to connecto (most commonly TCP) and compare the destination host to its configured blacklists or whitelists.

Kprobes: sys_connect
Tracepoint (return): sys_connect h. Program Blacklist/Whitelist The program execution blacklist and whitelist Strategies monitor program execution and compare the program name to its configured blacklists or whitelists.

Kprobes: sys_execve i. Interactive Shell

The Interactive Shell Strategy observes the execution of shell programs (such as /bin/sh, /bin/bash, etc.) and monitors for activity indicative of shell interactivity (vs being used to run a shell script, for example).

Kprobes: sys_execve, sys_ioctl with FD=2 or FD=10 j. Remote Interactive Shell

The Remote Interactive Shell Strategy is similar to the functionality of the Interactive Shell Strategy, but specifically monitors for interactive shells processing input/output from a network connection, such as the behavior exhibited by exploit payloads using mechanisms like bash's/dev/tcp to connect back to an attacker's machine.

Kprobes: sys_execve, sys_dup, sys_dup2, sys_dup3, sys_bind, sys_connect, sys_ioctl with FD=2 or FD=10
Tracepoint: sys_accept, sys_accept4
Tracepoint (return): sys_dup, sys_dup2, sys_dup3, sys_accept, sys_accept4, sys_connect, sys_bind k. Kernel Payload The kernel payload Strategy observes sensitive kernel functions, to determine if a function is being called with a return-address in userland.

Kprobes: prepare_creds, prepare_kernel_cred

1. SMEP/SMAP

The SMEP/SMAP Strategy monitors a function used to set the CR4 register, which is inlined in its legitimate uses, but still exported as a symbol, and which has become a popular target for disabling SMEP/SMAP.

Kprobes: native_write_cr4 m. SELinux & AppArmor

These two Strategies scan kernel memory to determine if these mechanisms have been disabled (if the strategies were configured to expect that these security mechanisms were on). The scanning of kernel memory for these strategies is done by a kprobe which is triggered by a specific syscall, which the sensor triggers periodically.

Kprobes: sys_uname with filter for a magic cookie value as the function argument n. Kernel Module Loading The kernel module load Strategy allows whitelisting of which kernel modules can be loaded.

Kprobes: do_init_module o. Spectre/Meltdown

The Spectre/Meltdown strategy employs performance counters to detect side-channel attacks by examining cache fetch and cache miss ratios.

PerfCounters: PerfEvent CacheReferences, PerfEvent CacheMiss, PerfEvent BranchMisses D. Strategy Examples 1. General Policies a. File Policy (Policy Identifier: File)

Valid filter rule fields for this policy are listed below:

| Type | Description |
|---|---|
| containerId | names |
| containerName | names |
| sensorId | names |
| imageId | names |
| imageName | names |
| filePath | paths |
| programName | paths |

Description: This Strategy monitors calls to create files and generates Alerts for creation of file names in disallowed locations. An example configuration is presented below:

File Policy Example:
policy: file
enabled: true
alertMessage: Blacklisted File Created
comments: Example strategy using the file policy
priority: High
rules:
match filePath in $filepathlist
default ignore
timeout: 10
FilePathList:
type: paths
list:
/*/trustme: "example"

A sample generated Alert for the above configuration (dummy values shown where normally real pids/uuids/timestamps etc. would be present) is presented below:

{
"alert_group_id": " ",
"confidence": "Max",
"description": "Blacklisted File Created",
"location": {
  "container_id": "98e73918fad6ce45d2f84f76b0e61d2bf789fe6cd-a74b24184918133c3a32863",
  "container_name": "/test-container",
  "image_id": "7328f6f8b41890597575cbaadc884e-7386ae0acc53b747401ebce5cf0d624560",
  "image_name": "TEST_IMAGE",
  "node_name": " ",
  "sensor_id": "0d76a2a9ede1bc3df805d26e90501a-f54b11eabe180e963c56d27f065d9243f4"
},
"matched_objects": null,
"matched_rule": " ",
"metadata": null,
"notifications": [
  {
    "message": "The program \"/usr/bin/trustme\" with PID 1001 in container \"/test-container\" created the file \"/usr/bin/trustme\". This action matched the \"match filePath in $filepathlist\" policy rule (where filePath (/usr/bin/trustme) in /*/trustme (pattern description: example)).",
    "name": "File Policy Example",
    "timestamp": 1509474507990963973,
    "uuid": "ZZZ"
  }
],
"policy_type": " ",
"priority": "High",
"process_info": {
  "args": [ ],
  "children": null,
  "cwd": " ",
  "egid": 15,
  "euid": 12,
  "fsgid": 15,
  "fsuid": 12,
  "gid": 15,
  "name": "/usr/bin/trustme",
  "parent": null,
  "pid": 1001,
  "pid_uuid": "/usr/bin/trustme-YYY",
  "ppid": 0,
  "sgid": 15,
  "suid": 12,
  "uid": 12
},
"scope": "Process",
"strategy_name": "File Policy Example",
"timestamp": 1509474507990963973,
"uuid": "File Policy Example-XXX"
} b. PTrace Policy (Policy Identifier: Ptrace)

Valid filter rule fields for this policy are listed below:

| Type | Description |
|---|---|
| containerId | names |
| containerName | names |
| sensorId | names |
| imageId | names |
| imageName | names |
| programName | paths |
| parentProgramName | paths |

Description: This Strategy triggers an Alert if ptrace policy is violated by a non-whitelisted program. An example configuration is presented below:
Ptrace Policy Example:
policy: ptrace
enabled: true
alertMessage: Ptrace Invoked
comments: Example strategy using the ptrace policy
priority: High
rules:
ignore programName==/tmp/safe/*
default match
A sample generated Alert for the above configuration (dummy values shown where normally real pids/uuids/timestamps etc. would be present) is presented below:
{
"alert_group_id": " ",
"confidence": "Max",
"description": "Ptrace Invoked",
"location": {
   "container_id": "98e73918fad6ce45d2f84f76b0e61d2bf789fe6cda-74b24184918133c3a32863",
   "container_name": "/test-container",
   "image_id": "7328f6f8b41890597575cbaadc884e7-386ae0acc53b747401ebce5cf0d624560",
   "image_name": "TEST_IMAGE",
   "node_name": " ",
   "sensor_id": "0d76a2a9ede1bc3df805d26e90501af54b-11eabe180e963c56d27f065d9243f4"
},
"matched_objects": null,
"matched_rule": " ",
"metadata": null,
"notifications": [
   {
      "message": "The program \"/usr/bin/trustme\" with PID 1001 in container \"/test-container\" attempted to write memory in the process with PID 10032. This action matched the \"default match\" policy rule.",
      "name": "testPtracePolicy1",
      "timestamp": 1509474507990963973,
      "uuid": "ZZZ"
   }
],
"policy_type": " ",
"priority": "High",
"process_info": {
   "args": [ ],
   "children": null,
   "cwd": " "
   "egid": 15,
   "euid": 12,
   "fsgid": 15,
   "fsuid": 12,
   "gid": 15,
   "name": "/usr/bin/trustme",
   "parent": null,
   "pid": 1001,
   "pid_uuid": "YYY",
   "ppid": 0,
   "sgid": 15,
   "suid": 12,
   "uid": 12
},
"scope": "Process",
"strategy_name": "Ptrace Policy Example",
"timestamp": 1509474507990963973,
"uuid": "XXX"
} c. Permissions Modification Policy (Policy Identifier: chmod)
Valid filter rule fields for this policy are listed below:

| Type | Description |
|---|---|
| containerId | names |
| containerName | names |
| sensorId | names |
| imageId | names |
| imageName | names |
| filePath | paths |
| fileMode | — |
| programName | paths |

Additional configuration options for this policy are listed below:

| Configuration Option | Type | Default | Description |
|---|---|---|---|
| suid | bool | True | Alert if set-user-id set |
| sgid | bool | False | Alert if set-group-id set |
| svtx | bool | False | Alert if sticky bit set |
| rusr | bool | False | Alert if read by owner set |
| wusr | bool | False | Alert if write by owner set |
| xusr | bool | False | Alert if execute/search by owner (search for directories) set |
| rgrp | bool | False | Alert if read by group set |
| wgrp | bool | False | Alert if write by group set |
| xgrp | bool | False | Alert if execute/search by group set |
| roth | bool | False | Alert if read by others set |
| woth | bool | False | Alert if write by others set |
| xoth | bool | False | Alert if execute/search by others set |

Description: This Strategy produces an Alert if a permission change matching the rules set occurs. An example configuration is presented below:
Permissions Modification Policy Example:
policy: chmod
enabled: true
alertMessage: Permissions Modification Strategy Fired
comments: Example strategy using the chmod policy
priority: High
rules:
ignore programName==/tmp/safe/*
default match
suid: true
sgid: false
svtx:false
rusr: false
wusr: false
xusr: false rgrp:false
wgrp: false
xgrp: false
roth:false
woth: false
xoth: false A sample generated Alert for the above configuration (dummy values shown where normally real pids/uuids/timestamps etc. would be present) is presented below:

```
{
"confidence": "Max",
"description": "Permissions Modification Strategy Fired",
"location": {
    "container_id": "4cb5b14f2f6b8e02a3e57188e230d140f2a8880d23-6a5f21face723678a2c50a",
    "container_name": "test-container",
    "image_id": "7328f6f8b41890597575cbaadc884-e7386ae0acc53b747401ebce5cf0d624560",
    "image_name": "alpine:3.6",
    "sensor_id": "0d76a2a9ede1bc3df805d26e90501-af54b11eabe180e963c56d27f065d9243f4"
},
"notifications": [
    {
    "actor_uuid": "3ad2bfe3-8665-4d6b-a2d6-60238-b05d02e",
    "message": "Permissions Modification Strategy Fired for "testfile". New permissions: 4000 (suid). This action matched the "default match" policy rule.",
    "name": "Permissions Modification Policy Example",
    "timestamp": 12434343435
    }
],
"priority": "High",
"process_info": {
    "args": [ ],
    "name": " ",
    "pid": 22059,
    "pid_uuid": "080a6767-9f37-4d70-b00d-015a9ed-f9099",
    "ppid": 0
},
"scope": "Process",
"strategy_name": "Permissions Modification Policy Example",
"timestamp": 134334343,
"uuid": "Permissions-Modification-Policy-Example-"
}
``` d. Program Policy (Policy Identifier: Program)
Valid filter rule fields for this policy are listed below:

| Type | Description |
|---|---|
| containerId | names |
| containerName | names |
| sensorId | names |
| imageId | names |
| imageName | names |
| programName | paths |
| parentProgramName | paths |

Description: This Strategy monitors program execution and compares the program name to its configured filters. It generates Alerts when a program matches an entry in one of the configured filters. An example configuration is presented below:

Program Policy Example:
policy: program
enabled: true
alertMessage: Unauthorized Program Executed
comments: Example strategy using the program policy
priority: High
rules:
default match A sample generated Alert for the above configuration (dummy values shown where normally real pids/uuids/timestamps etc. would be present) is presented below:

```
{
"alert_group_id": " ",
"confidence": "Max",
"description": "Unauthorized Program Executed",
"location": {
    "container_id": "N/A",
    "container_name": "N/A",
    "image_id": "N/A",
    "image_name": "N/A",
    "node_name": " ",
    "sensor_id": "0d76a2a9ede1bc3df805d26e90501a-f54b11eabe180e963c56d27f065d9243f4"
},
"matched_objects": null,
"matched_rule": " ",
"metadata": null,
"notifications": [
    {
    "message": "The program (name unknown) with PID 0 executed the program \"/usr/bin/bash\". This action matched the \"default match\" policy rule.",
    "name": "testProgramPolicy1",
    "timestamp": 1509474507990963973,
    "uuid": "ZZZ"
    }
],
"policy_type": " ",
"priority": "High",
"process_info": {
    "args": [ ],
    "children": null,
    "cwd": " ",
    "egid": 15,
    "euid": 12,
    "fsgid": 15,
    "fsuid": 12,
    "gid": 15,
    "name": "/usr/bin/bash",
    "parent": null,
    "pid": 1001,
    "pid_uuid": "YYY/usr/bin/bash",
    "ppid": 0,
    "sgid": 15,
    "suid": 12,
    "uid": 12
},
"scope": "Process",
"strategy_name": "Program Policy Example",
"timestamp": 1509474507990963973,
"uuid": "XXX"
}
``` e. Sendto Policy (Policy Identifier: Sendto)
Valid filter rule fields for this policy are listed below:

| Type | Description |
| --- | --- |
| containerId | names |
| containerName | names |
| sensorId | names |
| imageId | names |
| imageName | names |
| remoteHost | host |
| outboundPort | numbers |
| programName | paths |

Description: This Strategy provides network-level IP-based policy monitoring for TCP connections, comparing the destination IP of outbound TCP connections against its configured filters. An example configuration is presented below:
SendTo Example Policy:
policy: sendto
enabled: true
alertMessage: Sendto Blacklist Alert
comments: Example strategy using the sendto policy
priority: High
rules:
default match
A sample generated Alert for the above configuration (dummy values shown where normally real pids/uuids/timestamps etc. would be present) is presented below:
{
"alert_group_id": " ",
"confidence": "Max",
"description": "Sendto Blacklist Alert",
"location": {
  "container_id": "98e73918fad6ce45d2f84f76b0e61d2bf789fe6cda-74b24184918133c3a32863",
  "container_name": "/test-container",
  "image_id": "7328f6f8b41890597575cbaadc884-e7386ae0acc53b747401ebce5cf0d624560",
  "image_name": "TEST_IMAGE",
  "node_name": " ",
  "sensor_id": "0d76a2a9ede1bc3df805d26e9050-1af54b11eabe180e963c56d27f065d9243f4"
},
"matched_objects": null,
"matched_rule": " ",
"metadata": null,
"notifications": [
  {
    "message": "The program (name unknown) with PID 1001 in container \"/test-container\" communicated with 192.168.1.2 on UDP port 30030. This attempt was not successful. This action matched the \"default match\" policy rule.",
    "name": "SendTo Example Policy",
    "timestamp": 1509474507990963973,
    "uuid": "ZZZ"
  }
],
"policy_type": " ",
"priority": "High",
"process_info": {
  "args": [ ],
  "children": null,
  "cwd": " ",
  "egid": 15,
  "euid": 12,
  "fsgid": 15,
  "fsuid": 12,
  "gid": 15,
  "name": " ",
  "parent": null,
  "pid": 1001,
  "pid_uuid": "YYY",
  "ppid": 0,
  "sgid": 15,
  "suid": 12,
  "uid": 12
},
"scope": "Process",
"strategy_name": "SendTo Example Policy",
"timestamp": 1509474507990963973,
"uuid": "XXX"
}
f. Sensor Timeout Policy (Policy Identifier: sensorTimeout)
Valid filter rule fields for this policy are listed below:

| Type | Description |
| --- | --- |
| containerId | names |
| containerName | names |
| sensorId | names |
| imageId | names |
| imageName | names |

Configuration options for this policy are listed below:

| Configuration Option | Type | Default | Description |
| --- | --- | --- | --- |
| timeout | int | 1 | Minutes since last event from the sensor was received |

Description: This Strategy sends an Alert on sensor timeout. An example configuration is presented below:
Sensor Timeout Example Policy:
policy: sensorTimeout
enabled: true
alertMessage: Sensor Timeout Alert
comments: Example strategy using the sensorTimeout policy
priority: High
rules:
ignore sensorId==aabbccddeeff
default match
timeout: 20
A sample generated alert for the above configuration (dummy values shown where normally real pids/uuids/timestamps etc. would be present) is presented below:
{
"alert_group_id": " ",
"confidence": "Max",
"description": "Sensor Timeout Alert",
"location": {
  "container_id": "test-container",
  "container_name": "test-container-name",
  "image_id": "test-image",
  "image_name": "test-image-name",
  "node_name": " ",

```
    "sensor_id":    "0d76a2a9ede1bc3df805d26e90501a-
        f54b11eabe180e963c56d27f065d9243f4"
},
"matched_objects": null,
"matched_rule": "default match",
"metadata": null,
"notifications": [
    {
        "message": "The sensor has not received any process
            telemetry in the past \u0014 minutes. This action
            matched the \"default match\" policy rule.",
        "name": "Sensor Timeout Example Policy",
        "timestamp": 1539804600351876590,
        "uuid":    "2a34c683-83e3-4653-97bc-4224b0ba-
            a757"
    }
],
"policy_type": "sensorTimeout",
"priority": "High",
"process_info": {
    "args": null,
    "children": null,
    "cwd": " ",]
    "egid": 0,
    "euid": 0,
    "fsgid": 0,
    "fsuid": 0,
    "gid": 0,
    "name": " ",
    "parent": null,
    "pid": 0,
    "pid_uuid": " ",
    "ppid": 0,
    "sgid": 0,
    "suid": 0,
    "uid": 0
},
"scope": "Node",
"strategy_name": "Sensor Timeout Example Policy",
"timestamp": 1539727643594264759,
"uuid": "Sensor-Timeout-Example-Policy-XXX"
}
```

2. Local Exploitation Policies
a. BPF Protection Policy (Policy Identifier: bpfexec)
Valid filter rule fields for this policy are listed below:

| Type | Description |
|---|---|
| containerId | names |
| containerName | names |
| sensorId | names |
| imageId | names |
| imageName | names |
| programName | paths |

Description: This Strategy provides monitoring for attempts to call the BPF subsystem. An example configuration is presented below:
BPF Example Policy:
policy: bpfexec
enabled: true
comments: Example strategy using the bpf policy
priority: Medium
rules:
  ignore programName in $exampleWhitelist
  default match
  alertMessage: BPF was called exampleWhitelist:
  type: paths
  list:
  /usr/share/bcc/tools/*: "bcc tools"

A sample generated Alert for the above configuration (dummy values shown where normally real pids/uuids/ timestamps etc. would be present) is presented below:

```
{
"alert_group_id": " ",
"confidence": "Max",
"description": "BPF was called",
"location": {
    "container_id": "N/A",
    "container_name": "N/A",
    "image_id": "N/A",
    "image_name": "N/A",
    "node_name": " ",
    "sensor_id":    "0d76a2a9ede1bc3df805d26e90501a-
        f54b11eabe180e963c56d27f065d9243f4"
},
"matched_objects": null,
"matched_rule": " ",
"metadata": null,
"notifications": [
    {
        "message": "BPF was invoked! This action matched
            the "default match" policy rule.",
        "name": "BPF",
        "timestamp": 1509474507990963973,
        "uuid": "ZZZ"
    }
],
"policy_type": " "
"priority": "Medium",
"process_info": {
    "args": [ ],
    "children": null,
    "cwd": "/tmp/non-whitelisted_program",
    "egid": 0,
    "euid": 0,
    "fsgid": 0,
    "fsuid": 0,
    "gid": 0,
    "name": " ",
    "parent": null,
    "pid": 0,
    "pid_uuid": "394bd04468b541bdbe132a71de3671cb",
    "ppid": 0,
    "sgid": 0,
    "suid": 0,
    "uid": 0
},
"scope": "Process",
"strategy_name": "BPF Example Policy",
"timestamp": 1509474507990963973,
"uuid": "XXX"
}
```

3. Local and Post-Exploitation Policies
a. AppArmor Policy (Policy Identifier appArmor)
Valid filter rule fields for this policy are listed below:

| Type | Description |
|---|---|
| containerId | names |
| containerName | names |
| sensorId | names |

-continued

| Type | Description |
| --- | --- |
| imageId | names |
| imageName | names |

Additional configuration options for this policy are listed below:

| Configuration Option | Type | Default | Description |
| --- | --- | --- | --- |
| defaultAppArmorState | bool | False | If true, any event that either disables AppArmor at startup or disables AppArmor enforcement will trigger an alert. If false, will only trigger alerts if whatever setting existed at startup is modified. |

Description: AppArmor is a Linux Security Module implementation and confines individual programs to a set of listed files and run-time capabilities. This Strategy will generate an alert if AppArmor settings are illegally modified. An example configuration is presented below:

AppArmor Example Policy:
policy: apparmor
enabled: true
alertMessage: AppArmor settings were modified!
defaultAppArmorState: false
comments: Example strategy using the apparmor policy
priority: High
rules:
default match A sample generated Alert for the above configuration (dummy values shown where normally real pids/uuids/timestamps etc. would be present) is presented below:
{
"alert_group_id": " ",
"confidence": "Max",
"description": "AppArmor settings were modified!",
"location": {
  "container_id": "4cb5b14f2f6b8e02a3e57188e230d140f2a8880d23-6a5f21face723678a2c50a",
  "container_name": "test-container",
  "image_id": "7328f6f8b41890597575cbaadc884e7-386ae0acc53b747401ebce5cf0d624560",
  "image_name": "alpine:3.6",
  "sensor_id": "0d76a2a9ede1bc3df805d26e90501af5-4b11eabe180e963c56d27f065d9243f4"
},
"notifications": [
  {
    "message": "The AppArmor security mechanism, which was previously enabled, has been disabled. This action matched the "default match" policy rule.",
    "name": "AppArmor Example Policy",
    "timestamp": 1536090770072590607,
    "uuid": "7512f16f-9b3c-4b50-b53d-75d90d0f8468"
  }
],
"priority": "High",
"process_info": {
  "args": null,
  "children": null,
  "cwd": " ",1
  "egid": 0,
  "euid": 0,
  "fsgid": 0,
  "fsuid": 0,
  "gid": 0,
  "name": " ",
  "parent": null,
  "pid": 0,
  "pid_uuid": " ",
  "ppid": 0,
  "sgid": 0,
  "suid": 0,
  "uid": 0
},
"scope": "Node",
"strategy_name": "AppArmor Example Policy",
"timestamp": 1536090770072588478,
"uuid": "Apparmor-Policy-Enabled-Sample-Config-cf30c7fd-c138-4957-bf87-6722afe5cd4a"
} b. Kernel Module Loading Policy (Policy Identifier: loadkernelmodule)

Valid filter rule fields for this policy are listed below:

| Type | Description |
| --- | --- |
| containerId | names |
| containerName | names |
| sensorId | names |
| imageId | names |
| imageName | names |
| programName | paths |
| uid | numbers |
| gid | numbers |
| kernelModuleName | names |

Description: This Strategy produces an Alert whenever a kernel module is loaded. An example configuration is presented below:

Kernel Module Example Policy:
policy: loadKernelModule
enabled: true
alertMessage: A kernel module was loaded
comments: Example strategy using the loadKernelModule policy
priority: Medium
rules:
default match A sample generated Alert for the above configuration (dummy values shown where normally real pids/uuids/timestamps etc. would be present) is presented below:
{
"confidence": "Max",
"description": "A kernel module was loaded",

```
"location": {
    "container_id":
        "4cb5b14f2f6b8e02a3e57188e230d140f2a8880d23-
        6a5f21face723678a2c50a",
    "container_name": "test-container",
    "image_id":     "7328f6f8b41890597575cbaadc884-
        e7386ae0acc53b747401ebce5cf0d624560"
    "image_name": "alpine:3.6",
    "sensor_id":    "0d76a2a9ede1bc3df805d26e90501a-
        f54b11eabe180e963c56d27f065d9243f4"
},
"notifications": [
    {
        "actor_uuid": "3ad2bfe3-8665-4d6b-a2d6-60238b0-
            5d02e",
        "message": "Kernel Module "sampleModule" was
            loaded. This action matched the \"default match\"
            policy rule.",
        "name": "Kernel Module Example Policy",
        "timestamp": 12434343435
    }
],
"priority": "Medium",
"process_info": {
    "args": [ ],
    "name": " ",
    "pid": 22059,
    "pid_uuid":     "080a6767-9f37-4d70-b00d-015a9edf-
        9099",
    "ppid": 0
},
"scope": "Node",
"strategy_name": "Kernel Module Example Policy",
"timestamp": 134334343,
"uuid": "4ba42670-4790-460e-b3cf-9f40ab3f197a"
}
``` c. Kernel Payload Policy (Policy Identifier kernelPayload)
Valid filter rule fields for this policy are listed below:

| Type | Description |
| --- | --- |
| containerId | names |
| containerName | names |
| sensorId | names |
| imageId | names |
| imageName | names |
| programName | paths |

Additional configuration options for this policy are listed below:

| Configuration Option | Type | Default | Description |
| --- | --- | --- | --- |
| extraLargeMemorySystems | bool | False | Whether or not hosts are using 5-level page tables |

Description: This Strategy detects when kernel functions commonly used by kernel-based exploits are called in unusual ways, in patterns that are unique to kernel exploitation. An example configuration is presented below:
Kernel Payload Example Strategy:
policy: kernelPayload
enabled: true
alertMessage: Kernel Exploitation
comments: test strategy for the kernelPayload policy
priority: High
rules:
default match
extraLargeMemorySystems: false A sample generated alert for the above configuration (dummy values shown where normally real pids/uuids/timestamps etc. would be present) is presented below:

```
{
"alert_group_id": " ",
"confidence": "Max",
"description": "Kernel Exploitation",
"location": {
    "container_id": "N/A",
    "container_name": "N/A",
    "image_id": "N/A",
    "image_name": "N/A",
    "node_name": " ",
    "sensor_id":    "0d76a2a9ede1bc3df805d26e90501-
        af54b11eabe180e963c56d27f065d9243f4"
},
"matched_objects": null,
"matched_rule": " ",
"metadata": null,
"notifications": [
    {
        "message": "The kernel function prepare_kernel_
            cred with a return address in userland was invoked
            during the execution of the program \"/sbin/tcp-
            ping\" with PID 1001. This action matched
            the \"default match\" policy rule.",
        "name": "Kernel Payload Example Strategy",
        "timestamp": 1509474507990963973,
        "uuid": "ZZZ"
    }
],
"policy_type": " ",
"priority": "High",
"process_info": {
    "args": [ ],
    "children": null,
    "egid": 15,
    "euid": 12,
    "fsgid": 15,
    "fsuid": 12,
    "gid": 15,
    "name": "/sbin/tcpping",
    "parent": null,
    "pid": 1001,
    "pid_uuid": "YYY",
    "ppid": 0,
    "sgid": 15,
    "suid": 12,
    "uid": 12
},
"scope": "Node",
"strategy_name": "Kernel Payload Example Strategy",
"timestamp": 1509474507990963973,
"uuid": "XXX"
}
``` d. Privilege Escalation Policy (Policy Identifier: privilegeEscalation)

Valid filter rule fields for this policy are listed below:

| Type | Description |
| --- | --- |
| containerId | names |
| containerName | names |
| sensorId | names |
| imageId | names |
| imageName | names |

Description: This Strategy monitors for privilege escalation attacks that overwrite process privileges without going through a setuid or setgid call. If there is an attempt to set a privilege to root without a matching open privilege-related syscall, the strategy raises an alert. An example configuration is presented below:

Privilege Escalation Strategy:
policy: privilegeEscalation
enabled: true
alertMessage: Privilege Escalation Attempt
comments: Example strategy using the privilegeEscalation policy
priority: High
rules:
default match A sample generated Alert for the above configuration (dummy values shown where normally real pids/uuids/timestamps etc. would be present) is presented below:
{
"alert_group_id": " ",
"confidence": "Max",
"description": "Privilege Escalation Alert",
"location": {
  "container_id": "4cb5b14f2f6b8e02a3e57188e230d140f2a8880d23-6a5f21face723678a2c50a",
  "container_name": "test-container",
  "image_id": "7328f6f8b41890597575cbaadc884e-7386ae0acc53b747401ebce5cf0d624560",
  "image_name": "alpine:3.6",
  "node_name": " ",
  "sensor_id": "0d76a2a9ede1bc3df805d26e905-01af54b11eabe180e963c56d27f065d9243f4"
},
"notifications": [
  {
    "message": "A privilege escalation exploit was detected in unknown program with PID 12 in container \"test-container\". This action matched the \"default match\" policy rule.",
    "name": "Privilege Escalation Strategy",
    "timestamp": 1536602201654990745,
    "uuid": "3ebf360f-f915-4422-afc1-3e7561779b5c"
  }
],
"priority": "High",
"process_info": {
  "args": [
    "no open syscall for attempted set of uid, no open syscall for attempted set of gid,"
  ],
  "children": null,
  "cwd": " ",
  "egid": 0,
  "euid": 1000,
  "fsgid": 0,
  "fsuid": 0,
  "gid": 1000,
  "name": " ",
  "parent": null,
  "pid": 12,
  "pid_uuid": "394bd04468b541bdbe132a71de3671cb",
  "ppid": 0,
  "sgid": 1000,
  "suid": 1000,
  "uid": 0
},
"scope": "Process",
"strategy_name": "Privilege Escalation Strategy",
"timestamp": 1536602201654985695,
"uuid": "Privilege-Escalation-Strategy-"
} e. Resource Limit Policy (Policy Identifier: setrlimit)

Valid filter rule fields for this policy are listed below:

| Type | Description |
| --- | --- |
| containerId | names |
| containerName | names |
| sensorId | names |
| imageId | names |
| imageName | names |
| parentProgramName | paths |
| programName | paths |

Description: This Strategy alerts when a process's resource limits are set to an unusually high value (for example, an unlimited stack size). This operation is performed by some exploits and may indicate an attempted privilege escalation exploit. This Strategy can be triggered by the "make" program. As such, it is recommended to include "ignore programName==/usr/*make" in the rules for this strategy to reduce false positives, or to disable this strategy on hosts that regularly perform software builds. An example configuration is presented below:

SetRlimit Example Policy:
policy: setrlimit
enabled: true
alertMessage: Resource Limit Policy
comments: Example strategy using the setrlimit policy
priority: Low
rules:
default match A sample generated Alert for the above configuration (dummy values shown where normally real pids/uuids/timestamps etc. would be present) is presented below:
{
"alert_group_id": " ",
"confidence": "Max",
"description": "Resource Limit Policy",
"location": {
  "container_id": "98e73918fad6ce45d2f84f76b0e61d2bf789fe6cda7-4b24184918133c3a32863",
  "container_name": "/test-container",
  "image_id": "7328f6f8b41890597575cbaadc884e7-386ae0acc53b747401ebce5cf0d624560",
  "image_name": "TEST_IMAGE",
  "node_name": " ",
  "sensor_id": "0d76a2a9ede1bc3df805d26e90501af54-b11eabe180e963c56d27f065d9243f4"
},
"matched_objects": null,
"matched_rule": " ",
"metadata": null,

```
"notifications": [
    {
        "message": "The program \"/tmp/badprog\" with
            PID 1001 in container \"/test-container\" has
            increased its resource limits. This may be per-
            formed as part of an exploitation attempt. This
            action matched the \"default match\" policy rule.",
        "name": "Resource Limits",
        "timestamp": 1509474507990963973,
        "uuid": "ZZZ"
    }
],
"policy_type": " ",
"priority": "Low",
"process_info": {
    "args": [ ],
    "children": null,
    "cwd": " ",1
    "egid": 15,
    "euid": 12,
    "fsgid": 15,
    "fsuid": 12,
    "gid": 15,
    "name": "/tmp/badprog",
    "parent": null,
    "pid": 1001,
    "pid_uuid": "YYY",
    "ppid": 0,
    "sgid": 15,
    "suid": 12,
    "uid": 12 "scope": "Process",
},
"strategy_name": "SetRlimit Example Policy",
"timestamp": 1509474507990963973,
"uuid": "XXX"
}
``` f. SELinux Policy (Policy Identifier: Selinux)
Valid filter rule fields for this policy are listed below:

| Type | Description |
| --- | --- |
| containerId | names |
| containerName | names |
| sensorId | names |
| imageId | names |
| imageName | names |

Additional configuration options for this policy are listed below:

| Configuration Option | Type | Default | Description |
| --- | --- | --- | --- |
| default | bool | False | If true, any event that either disables SELinux at startup or disables SELinux enforcement will trigger an alert. If false, will only trigger alerts if whatever setting existed at startup is modified. |

Description: Security-Enhanced Linux (SELinux) is a Linux kernel security module that provides a mechanism for supporting access control security policies. This Strategy will generate an Alert if a kernel exploit illegally modified the SELinux settings. An example configuration is presented below:

SELinux Example Strategy:
policy: selinux
enabled: true
alertMessage: SELinux Disabled
comments: Example strategy using the selinux policy
priority: High
rules:
ignore sensorId==aabbccddeeff
default match
default: false A sample generated Alert for the above configuration (dummy values shown where normally real pids/uuids/timestamps etc. would be present) is presented below:

```
{
"confidence": "Max",
"description": "SELinux Disabled",
"location": {
    "container_id":
        "4cb5b14f2f6b8e02a3e57188e230d140f2a8880d23-
        6a5f21face723678a2c50a",
    "container_name": "test-container",
    "image_id":     "7328f6f8b41890597575cbaadc884-
        e7386ae0acc53b747401ebce5cf0d624560",
    "image_name": "alpine:3.6",
    "sensor_id":        "0d76a2a9ede1bc3df805d26e9050-
        1af54b11eabe180e963c56d27f065d9243f4"
},
"notifications": [
    {
        "actor_uuid": "6f4d23d6-686b-4bf6-9401-86d3394-
            85f6a",
        "message": "The SELinux security mechanism,
            which was previously enabled, has been disabled.
            This action matched the \"default match\" policy
            rule.",
        "name": "SELinux Disabled",
        "timestamp": 1535569121667980508
    }
"priority": "High",
"scope": "Node",
"strategy_name": "SELinux Example Strategy",
"timestamp": 1535569121667976757,
"uuid": "Example-SELinux"
}
``` g. SMEP/SMAP Policy (Policy Identifier: smepSmap)
Valid filter rule fields for this policy are listed below:

| Type | Description |
| --- | --- |
| sensorId | names |

Description: The SMEP SMAP Strategy monitors for kernel exploitation attempts which involve disabling specific kernel memory protection mechanisms (as is common in kernel-based local-privilege-escalation exploits). The Supervisor-Mode-Execution-Prevention (SMEP) and Supervisor-Mode-Access-Prevention (SMAP) are mechanisms on modern CPUs to protect the kernel from exploitation techniques involving userland memory. This Strategy alerts on detection of kernel behavior disabling these protection mechanisms. An example configuration is presented below:

SMEP SMAP Policy:
policy: smepSmap
enabled: true
alertMessage: SMEP/SMAP was disabled
comments: Example strategy using the smepSmap policy
priority: High
rules:
ignore sensorId==aabbccddeeff
default match
A sample generated Alert for the above configuration (dummy values shown where normally real pids/uuids/ timestamps etc. would be present) is presented below:
{
  "confidence": "Max",
  "description": "SMEP/SMAP was disabled",
  "location": {
    "container_id": "4cb5b14f2f6b8e02a3e57188e230d140f2a8880d236-a5f21face723678a2c50a",
    "container_name": "test-container",
    "image_id": "7328f6f8b41890597575cbaadc88-4e7386ae0acc53b747401ebce5cf0d624560",
    "image_name": "alpine:3.6",
    "sensor_id": "0d76a2a9ede1bc3df805d26e9050-1af54b11eabe180e963c56d27f065d9243f4"
  },
  "notifications": [
    {
      "message": "The SMEP/SMAP security mechanism, which was previously enabled, has been disabled. This action matched the "default match" policy rule.",
      "name": "SMEP/SMAP was disabled",
      "timestamp": 1535569121667980508,
      "uuid": "6f4d23d6-686b-4bf6-9401-86d339485f6a"
    }
  ],
  "priority": "High",
  "scope": "Node",
  "strategy_name": "SMEP SMAP Policy",
  "timestamp": 1535569121667976758,
  "uuid": "Default-SmepSmap-Config-Example"
} h. Set Privilege Policy (Policy Identifier: setPrivilege) Valid filter rule fields for this policy are listed below:

| Type | Description |
|---|---|
| containerId | names |
| containerName | names |
| sensorId | names |
| imageId | names |
| imageName | names |
| programName | paths |
| parentProgramName | paths |
| uid | numbers |
| targetuid | — |
| targeteuid | — |
| targetsuid | — |
| targetfsuid | — |
| gid | numbers |
| targetgid | — |
| targetegid | — |
| targetsgid | — |
| targetfsgid | — |

Additional configuration options for this policy are listed below:

| Configuration Option | Type | Default | Description |
|---|---|---|---|
| setuid | bool | True | Alert if setuid is called |
| setreuid | bool | True | Alert if setreuid is called |
| setresuid | bool | True | Alert if setresuid is called |
| setfsuid | bool | True | Alert if setfsuid is called |
| setgid | bool | True | Alert if setgid is called |
| setregid | bool | True | alert if setregid is called |
| setresgid | bool | True | alert if setresgid is called |
| setfsgid | bool | True | Alert if setfsgid is called |

Description: This Strategy monitors calls to the setuid and setgid family of system calls used by processes to run with the privileges of a specific user or group. This can be used to alert on unusual usage of these system calls (e.g., usage as part of an exploit) as well as to monitor usage of privilege-altering commands such as "sudo". An example configuration is presented below:
SetPrivilegeTest:
policy: setPrivilege
enabled: true
alertMessage: set privilege alert
comments: testStratDescription
priority: Medium
rules:
default match
setuid: true
setreuid: true
setresuid: true
setfsuid: true
setgid: true
setregid: true
setresgid: true
setfsgid: true
A sample generated Alert for the above configuration (dummy values shown where normally real pids/uuids/ timestamps etc. would be present) is presented below:
{
  "alert_group_id": " ",
  "confidence": "Max",
  "description": "set privilege alert",
  "location": {
    "container_id": "98e73918fad6ce45d2f84f76b0e61d2bf789fe6cda7-4b24184918133c3a32863",
    "container_name": "/test-container",
    "image_id": "7328f6f8b41890597575cbaadc884-e7386ae0acc53b747401ebce5cf0d624560",
    "image_name": "TEST_IMAGE",
    "node_name": " ",
    "sensor_id": "0d76a2a9ede1bc3df805d26e9050-1af54b11eabe180e963c56d27f065d9243f4"
  },
  "matched_objects": null,
  "matched_rule": " ",
  "metadata": null,
  "notifications": [
    {
      "message": "The program (name unknown) with PID 1001 in container \"/test-container\" made an unauthorized call to setuid to set uid: 1000. This action matched the \"default match\" policy rule.",
"name": "SetPrivilegeTest",
"timestamp": 1509474507990963973,
"uuid": "ZZZ"
}
],
"policy_type": " ",
"priority": "Medium",
"process_info": {
  "args": [ ],
  "children": null,
  "egid": 10,
  "euid": 10,
  "fsgid": 10,
  "fsuid": 10,
  "gid": 10,
  "name": " ",1
  "parent": null,
  "pid": 1001,
  "pid_uuid": "YYY/bin/bash",
  "ppid": 0,
  "sgid": 10,
  "suid": 10,
  "uid": 10
},
"scope": "Process",
"strategy_name": "SetPrivilegeTest",
"timestamp": 1509474507990963973,
"uuid": "XXX"
} i. Spectre Meltdown Policy (Policy Identifier: spectreMeltdown)

Valid filter rule fields for this policy are listed below:

| Type | Description |
| --- | --- |
| sensorId | names |

Additional configuration options for this policy are listed below:

| Configuration Option | Type | Default | Description |
| --- | --- | --- | --- |
| cacheMissRatioThreshold | float64 | 0.97 | Maximum allowed ratio of cache reads to cache misses |

Description: This Strategy monitors for spectre or meltdown attacks by monitoring hardware performance counters. If the cachemiss ratio and cachemiss-branchmiss ratio fall under a certain threshold derived through stocastic modeling (SVM), the Strategy raises an alert. An example configuration is presented below:
Spectre Meltdown Policy:
policy: spectreMeltdown
enabled: true
alertMessage: Spectre/Meltdown Exploit Detected
comments: Example strategy using the spectreMeltdown policy
priority: High
rules:
ignore sensorId==aabbccddeeff
default match
cacheMissRatioThreshold: 0.97

A sample generated alert for the above configuration (dummy values shown where normally real pids/uuids/timestamps etc. would be present) is presented below:
{
"confidence": "Max",
"description": "Spectre/Meltdown Exploit Detected",
"location": {
  "container_id": "4cb5b14f2f6b8e02a3e57188e230d140f2a8880d23-6a5f21face723678a2c50a",
  "container_name": "test-container",
  "image_id": "7328f6f8b41890597575cbaadc884e7-386ae0acc53b747401ebce5cf0d624560",
  "image_name": "alpine:3.6",
  "sensor_id": "0d76a2a9ede1bc3df805d26e90501a-f54b11eabe180e963c56d27f065d9243f4"
},
"notifications": [
  {
    "actor_uuid": "6f4d23d6-686b-4bf6-9401-86d339-485f6a",
    "message": "Spectre Meltdown Attack noticed on sensor ID 0d76a2a9ede1bc3df805d26e90501af-54b11eabe180e963c56d27f065d9243f4. This action matched the \"default match\" policy rule.",
    "name": "Spectre/Meltdown Exploit Detected",
    "timestamp": 1535569121667980508
  }
],
"priority": "High",
"scope": "Node",
"strategy_name": "Spectre Meltdown Policy",
"timestamp": 1535569121667976755,
"uuid": "Default-Spectre-Config-1"
}

4. Remote Exploitation Policies
a. Connect Policy (Policy Identifier: Connect)
Valid filter rule fields for this policy are listed below:

| Type | Description |
| --- | --- |
| containerId | names |
| containerName | names |
| sensorId | names |
| imageId | names |
| imageName | names |
| remoteHost | host |
| outboundPort | numbers |
| programName | paths |

Description: This Strategy provides network-level IP-based policy monitoring for TCP connections. An example configuration is presented below:
Connect Policy Example:
policy: connect
enabled: true
alertMessage: Illegal Connection Attempted
comments: Example strategy using the connect policy
priority: High
rules:
match remoteHost in $connecthosts
default ignore
CONNECTHOSTS:
type: hosts
description: Connectable Hosts list:
192.168.1.0/24

A sample generated alert for the above configuration (dummy values shown where normally real pids/uuids/timestamps etc. would be present) is presented below:

```
{
"alert_group_id": " ",
"confidence": "Max",
"description": "Illegal Connection Attempted",
"location": {
   "container_id":
   "98e73918fad6ce45d2f84f76b0e61d2bf789fe6cda7-
   4b24184918133c3a32863",
   "container_name": "/test-container",
   "image_id":   "7328f6f8b41890597575cbaadc-
     884e7386ae0acc53b747401ebce5cf0d624560",
   "image_name": "TEST_IMAGE",
   "node_name": " ",
   "sensor_id":   "0d76a2a9ede1bc3df805d26e-
     90501af54b11eabe180e963c56d27f065d9243f4"
},
"matched_objects": null,
"matched_rule": " ",
"metadata": null,
"notifications": [
   {
     "message": "The program \"/sbin/tcpping\" with PID
       1001 in container \"/test-container\" communi-
       cated with 192.168.1.2 on TCP port 8080. This
       attempt was not successful. This action matched
       the \"match remoteHost in $connecthosts\" policy
       rule (where remoteHost (192.168.1.2) in
       192.168.1.0/24).",
     "name": "testconnectpolicy1",
     "timestamp": 1509474507990963973,
     "uuid": "ZZZ"
   }
],
"policy_type": " ",
"priority": "High",
"process_info": {
   "args": [ ],
   "children": null,
   "cwd": " ",
   "egid": 15,
   "euid": 12,
   "fsgid": 15,
   "fsuid": 12,
   "gid": 15,
   "name": "/sbin/tcpping",
   "parent": null,
   "pid": 1001,
   "pid_uuid": "YYY",
   "ppid": 0,
   "sgid": 15,
   "suid": 12,
   "uid": 12
},
"scope": "Process",
"strategy_name": "Connect Policy Example",
"timestamp": 1509474507990963973,
"uuid": "testconnectpolicy1-XXX"
}
``` b. Interactive Shell Policy (Policy Identifier: interactiveShell)

Valid filter rule fields for this policy are listed below:

| Type | Description |
| --- | --- |
| containerId | names |
| containerName | names |
| sensorId | names |
| imageId | names |
| imageName | names |
| programName | paths |
| parentProgramName | paths |

Additional configuration options for this policy are listed below:

| Configuration Option | Type | Default | Description |
| --- | --- | --- | --- |
| alertOnIncompleteData | bool | True | Generate an alert even if some of the alert info is absent |

Description: This Strategy provides policy monitoring of interactive shell sessions (like/bin/bash). The premise for this Strategy is that security and operational best-practices generally discourage direct system shell interaction with containers running in production, such as logging-in over SSH to a production container. In addition to being generally discouraged, the presence of an interactive shell can also be an indicator of an attack, such as one delivering a payload that "pops" a shell for the attacker. This Strategy employs a whitelist of programs which are permitted to spawn interactive shells, and generates an alert if an interactive shell is executed by a non-whitelisted parent process. One caveat is that a whitelisted interactive-shell can spawn other interactive-shells without triggering an alert. The identification of permitted sub-shells is made by their relationship to a whitelist-permitted parent process. An example configuration is presented below:

Interactive Shell Policy Example:
policy: interactiveShell
enabled: true
alertMessage: An interactive shell was spawned!
comments: Example of interactive shell policy with a whitelist
priority: High
rules:
ignore parentProgramName in $authorizedprograms
default match
alertOnIncompleteData: true
AUTHORIZEDPROGRAMS:
type: paths
list:
"/usr/sbin/sshd": "ssh"

A sample generated Alert for the above configuration (dummy values shown where normally real pids/uuids/timestamps etc. would be present) is presented below:

```
{
"confidence": "MediumHigh",
"description": "An interactive shell was spawned!",
"location": {
   "container_id":   "b56b34be-aba8-439e-b488-
     827cdd869446",
   "container_name": "container_1507908229.024124",
```

```
    "image_id":         "4ba42670-4790-460e-b3cf-
        9f40ab3f197a",
    "image_name": "unit_test:1507908229.024146",
    "sensor_id":        "2862d402-9814-4d14-9996-
        f4d97c675cd5"
},
"notifications": [
    {
        "message": "The interactive shell \"/bin/bash\" with
            PID 3 was executed by the program (name
            unknown). The current configuration of Capsule8
            is to alert on interactive shells even if the parent
            program is unknown. This action matched the
            \"default match\" policy rule.",
        "name": "Interactive Shell Policy Example",
        "timestamp": 12434343435,
        "uuid": "3ad2bfe3-8665-4d6b-a2d6-60238b05d02e"
    }
],
"priority": "High",
"process_info": {
    "args": [
        "/bin/bash"
    ],
    "name": "/bin/bash",
    "pid":3,
    "pid_uuid": "cccc",
    "ppid": 2
},
"scope": "Process",
"strategy_name": "Interactive Shell Policy Example",
"timestamp": 134334343,
"uuid": "3ad2bfe3-8665-4d6b-a2d6-60238b05d10b"
}
``` c. Memory Protection Policy (Policy Identifier: memory-Protection)

Valid filter rule fields for this policy are listed below:

| Type | Description |
|---|---|
| containerId | names |
| containerName | names |
| sensorId | names |
| imageId | names |
| imageName | names |
| programName | paths |

Description: This Strategy provides monitoring for attempts to exploit memory-mismanagement software vulnerabilities. Attempts to exploit these vulnerabilities to execute arbitrary code (also known as shellcode) commonly involve a step to modify the permissions on memory containing attacker-controlled data, so that the attacker-controlled data can be executed as program code. This Strategy specifically monitors for attempts to modify heap memory to be executable, and if that behavior is observed, an Alert is generated informing which process is under attack. Alerts include related container information. An example configuration is presented below:

```
MemProtect Example Policy:
policy: memoryprotection
enabled: true
comments: Example strategy using the memoryprotection
policy
priority: High
rules:
    ignore programName in $exampleWhitelist
    default match
    alertMessage: Memory Protection Alert
exampleWhitelist:
    type: paths
    list:
        "/tmp/whitelisted_program": "example of whitelisted
            program"
```

A sample generated Alert for the above configuration (dummy values shown where normally real pids/uuids/timestamps etc. would be present) is presented below:

```
{
"alert_group_id": " ",
"confidence": "Max",
"description": "Memory Protection Alert",
"location": {
    "container_id":
        "4cb5b14f2f6b8e02a3e57188e230d140f2a8880d2-
        36a5f21face723678a2c50a",
    "container_name": "test-container",
    "image_id":         "7328f6f8b41890597575cbaadc8-
        84e7386ae0acc53b747401ebce5cf0d624560",
    "image_name": "alpine:3.6",
    "node_name": " ",
    "sensor_id":        "0d76a2a9ede1bc3df805d26e905-
        01af54b11eabe180e963c56d27f065d9243f4"
},
"matched_objects": null,
"matched_rule": " ",
"metadata": null,
"notifications": [
    {
        "message": "A memory corruption exploit was
            detected in the program \"/tmp/non-whitelist-
            ed_program\" with PID 3333 in container \"test-
            container\". This action matched the \"default
            match\" policy rule.",
        "name": "MemProtect Example Policy",
        "timestamp": 1509474507990963973,
        "uuid": "ZZZ"
    }
],
"policy_type": " "
"priority": "High",
"process_info": {
    "args": [ ],
    "children": null,
    "cwd": " ",
    "egid": 0,
    "euid": 0,
    "fsgid": 0,
    "fsuid": 0,
    "gid": 0,
    "name": "/tmp/non-whitelisted_program",
    "parent": null,
    "pid": 3333,
    "pid_uuid": "a856880a77274d238a5a9d1057831dec",
    "ppid": 0,
    "sgid": 0,
    "suid": 0,
    "uid": 0
},
"scope": "Process",
"strategy_name": "MemProtect Example Policy",
"timestamp": 1509474507990963973,
"uuid": "XXX"
}
``` d. New File Exec Policy (Policy Identifier: newFileExec)
Valid filter rule fields for this policy are listed below:

| Type | Description |
|---|---|
| containerId | names |
| containerName | names |
| sensorId | names |
| imageId | names |
| imageName | names |
| parentProgramName | paths |
| programName | paths |

Additional configuration options for this policy are listed below:

| Configuration Option | Type | Default | Description |
|---|---|---|---|
| fileTimeout | int | 30 | Minutes after which newly created files can be executed without triggering an alert |

Description: This Strategy watches for execution of newly-created files by non-whitelisted programs. If such created files are executed within the configured timeout, the Strategy produces Alerts. This behavior is often associated with webshells. An example configuration is presented below:
New File Exec Policy Example:
policy: newFileExec
enabled: true
alertMessage: A file not previously present in the system was executed
comments: Example strategy using the newFileExec policy
priority: High
rules:
ignore programName==/tmp/safe/*
default match
fileTimeout: 30
A sample generated alert for the above configuration (dummy values shown where normally real pids/uuids/ timestamps etc. would be present) is presented below:
{
"confidence": "Max",
"description": "A kernel module was loaded",
"location": {
"container_id": "4cb5b14f2f6b8e02a3e57188e230d140f2a8880d23-6a5f21face723678a2c50a",
"container_name": "test-container",
"image_id": "7328f6f8b41890597575cbaadc88-4e7386ae0acc53b747401ebce5cf0d624560",
"image_name": "alpine:3.6",
"sensor_id": "0d76a2a9ede1bc3df805d26e90-501af54b11eabe180e963c56d27f065d9243f4"
},
"notifications": [
{
"actor_uuid": "3ad2bfe3-8665-4d6b-a2d6-60238b-05d02e",
"message": "Kernel Module \"sampleModule\" was loaded. This action matched the following policy rule: \"default match\"",
"name": "Kernel Module Example Policy",
"timestamp": 12434343435
}
],
"priority": "Medium",
"process_info": {
"args": [ ],
"name": " ",
"pid": 22059,
"pid_uuid": "080a6767-9f37-4d70-b00d-015a9edf9099",
"ppid": 0
},
"scope": "Node",
"strategy_name": "Kernel Module Example Policy",
"timestamp": 134334343,
"uuid": "4ba42670-4790-460e-b3cf-9f40ab3f197a"
}
e. Remote Interactive Shell Policy (Policy Identifier: remoteInteractiveShell)
Valid filter rule fields for this policy are listed below:

| Type | Description |
|---|---|
| containerId | names |
| containerName | names |
| sensorId | names |
| imageId | names |
| imageName | names |
| remoteHost | host |
| outboundPort | numbers |
| inboundPort | numbers |
| uid | numbers |
| gid | numbers |
| programName | paths |
| parentProgramName | paths |

Description: This Strategy is similar to the functionality of the Interactive Shell strategy, but specifically monitors for interactive shells processing input/output from a network connection, such as the behavior exhibited by exploit payloads using mechanisms like the bash shell's /dev/tcp to connect back to an attacker's machine. An example configuration is presented below:
Remote Interactive Shell Strategy Example:
policy: remoteInteractiveShell
enabled: true
alertMessage: Remote Interactive Shell Executed
comments: Example strategy using the remoteInteractive-Shell policy
priority: High
rules:
ignore parentProgramName in $programlist
default match
alertOnIncompleteData: true
PROGRAMLIST:
type: paths
list:
/bin/baz: " "
A sample generated alert for the above configuration (dummy values shown where normally real pids/uuids/ timestamps etc. would be present) is presented below:
{
"confidence": "Max",
"description": "Remote Interactive Shell Executed",
"location": {
"container_id": "b56b34be-aba8-439e-b488-827cdd869446",
"container_name": "container_1507908229.024124",

```
    "image_id":          "4ba42670-4790-460e-b3cf-
        9f40ab3f197a",
    "image_name": "unit_test:1507908229.024146",
    "sensor_id":    "2862d402-9814-4d14-9996-f4d97c6-
        75cd5"
},
"notifications": [
    {
        "actor_uuid":   "3ad2bfe3-8665-4d6b-a2d6-60238b-
            05d02e",
        "message": "The interactive shell \"/bin/bash\" with
            PID   2   in   container   \"con-
            tainer_1507908229.024124\" was spawned with
            remote-control operation through an outbound
            connection to 192.168.0.1. This action matched
            the \"default match\" policy rule.",
        "name": "Remote Interactive Shell Strategy
            Example",
        "timestamp": 12434343435
    }
],
"priority": "High",
"process_info": {
    "args": [
        "/bin/bash"
    ],
    "name": "/bin/bash",
    "pid": 2,
    "pid_uuid":          "080a6767-9f37-4d70-b00d-
        015a9edf9099",
    "ppid": 0
},
"scope": "Process",
"strategy_name": "Remote Interactive Shell Strategy
    Example",
"timestamp": 134334343,
"uuid": "XXXX"
}
``` f. Stack Pivot Detection Policy (Policy Identifier: stackPivotDetection)

Valid filter rule fields for this policy are listed below:

| Type | Description |
| --- | --- |
| containerId | names |
| containerName | names |
| sensorId | names |
| imageId | names |
| imageName | names |
| programName | paths |

Description: This Strategy examines the stack pointer on certain syscalls and ensures that it is within normal stack bounds. If it is not, it raises an Alert. The stack pointer being outside the bounds of the stack is normally indicative of a stack pivot as part of an exploit chain. An example configuration is presented below:
Example Stack Pivot Policy:
policy: stackPivotDetection
enabled: true
alertMessage: Stack Pivot Detected
comments: Example strategy using the stackPivotDetection policy
priority: Medium
rules:
default match A sample generated alert for the above configuration (dummy values shown where normally real pids/uuids/timestamps etc. would be present) is presented below:

```
{
    "confidence": "High",
    "description": "Stack Pivot Detected",
    "location": {
        "container_id":
            "4cb5b14f2f6b8e02a3e57188e230d140f2a8880d236-
            a5f21face723678a2c50a",
        "container_name": "test-container",
        "image_id":         "7328f6f8b41890597575cbaadc884-
            e7386ae0acc53b747401ebce5cf0d624560"
        "image_name": "alpine:3.6",
        "sensor_id":         "0d76a2a9ede1bc3df805d26e9050-
            1af54b11eabe180e963c56d27f065d9243f4"
    },
    "notifications": [
        {
            "actor_uuid": "6f4d23d6-686b-4bf6-9401-86d3394-
                85f6a",
            "message": "A stack pivot was detected in the program with PID 3333 in container \"test-container\". This action matched the \"default match\" policy rule.",
            "name": "Stack Pivot Detected",
            "timestamp": 15355691216679805085
        }
    ],
    "priority": "Medium",
    "process_info": {
        "args": [ ],
        "name": " ",
        "pid": 3333,
        "pid_uuid": "a856880a77274d238a5a9d1057831dec",
        "ppid": 0
    },
    "scope": "Process",
    "strategy_name": "Example Stack Pivot Policy",
    "timestamp": 15355691216679767555,
    "uuid": "Example-StackPivot-Config-1"
}
```

VII. Alerts

A. Getting Events from the Platform

At startup, Gateway 404's instance registers its HandleEvent function as a callback with CommsClient 402's instance. It then gets the list of Events each Strategy needs by calling each Strategy's GetSubscription( ) method and combines them into a set to form a single telemetry subscription. Any time an Event is received via this telemetry subscription, it does the following. First, CommsClient 402 invokes its factory and creates a corresponding Event as a Platform Event. Second, it calls Gateway 404's HandleEvent method as a callback.

B. Passing Events to Strategies

Figure 27:
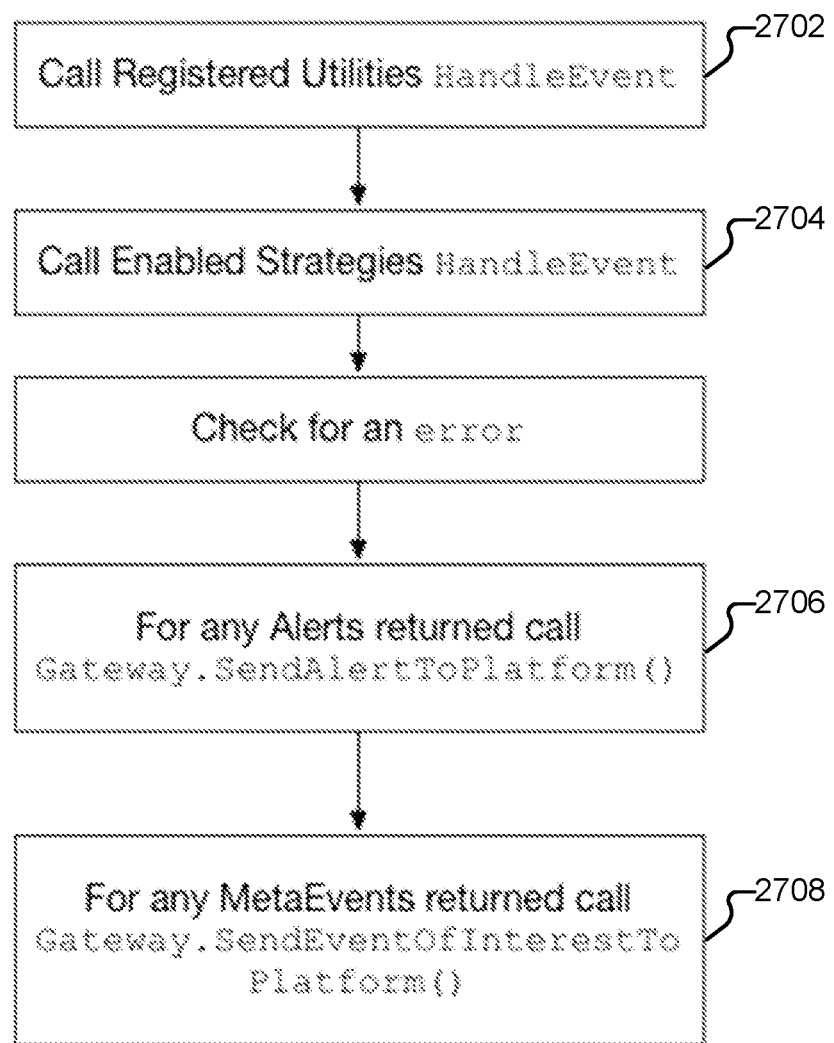
FIG. 27 illustrates an example flow for a HandleEvent method.

FIG. 27 illustrates an example flow for a HandleEvent method. When Gateway 404's HandleEvent method is called, it first invokes all of its registered Event Utilities (2702). This is to allow them to update their internal state, as Strategies may use these utilities to determine whether an Alert should be emitted. After updating the state of registered utilities, it then calls each of the enabled Strategies' HandleEvent methods (2704). This method has the following signature in various embodiments: HandleEvent(event protectevent.Event) ([ ]alert.Alert, [ ]metaevent.Event, error) and is defined in pkg/strategy/interface.go. When invoked, the Strategy consumes the Event and produces one or more Alerts (2706) and/or one or more MetaEvents (2708).

The MetaEvents produced by the call to a Strategy's HandleEvent method are sent back to analytics framework 400 to be published by invoking Gateway 404's SendEventOfInterestToPlatform method, which sends it to CommsClient 402. Comms Client 402 translates this to a protobuf message and publishes it on a topic supplied inside of the specific MetaEvent struct.

Each Alert is sent back to analytics framework 400 by calling Gateway 404's SendAlertToPlatform. This method does a few things. First, it applies any registered Alert Utilities to enrich the Alert data by calling their HandleAlert methods. Examples include things like adding process lineage, annotating an Alert with other metadata such as number of alerts for the sensor node, etc. This passes the Alert to Arbiter 408, by calling its HandleAlert method. This either returns the Alert or nil. If Arbiter 408 returns the Alert, then it is sent back to CommsClient 402 which converts it to an API protobuf format and then publishes it on the Alerting topic. If CommsClient 402 is a standalone or Embedded Server Library Client, then the Alert has the ability to be printed to Stdout, a local file, or a BLOB storage provider.

C. Alert Filtering and the Arbiter

In order to keep false positives from becoming an issue, Arbiter 408 supports filtering in the form of Alert filter logic, as follows: A set of filters are passed as strings and then compiled into an evaluation format. When an Alert is passed to Arbiter 408 it evaluates each filter in the list against the Alert. If any of the filters match then the Alert is discarded. The filters themselves are described using the following Alert filter language.

Arbiter 408's Alert filter language works by evaluating the predicate rule against a given Alert. If any of the rules evaluate to true then the Alert is filtered. Rules start with an Alert field identifier that identifies the specific field in the Alert to compare. Rules may be combined into more compound statements using special "and" and "or" operators.

1. Value Types a. Alert Field Identifiers

The Alert Field Identifiers type identifies a specific property of an Alert to check.

The following are examples of supported fields:

| Identifier | Alert Field | Type |
| --- | --- | --- |
| "container_id" | alert.Location.ContainerID | string (hex_string) |
| "image_id" | alert.Location.ImageID | string (hex_string) |
| "sensor_id" | alert.Location.SensorID | string (hex_string) |
| "container_name" | alert.Location.ContainerName | string |
| "image_name" | alert.Location.ImageName | string |
| "program_name" | alert.ProcessInfo.ProgamName | string |
| "strategy" | alert.StrategyName | string |
| "priority" | alert.Priority | int |
| "confidence" | alert.Confidence | float64 | b. String

Strings are identifiers that are not keywords or operators, and do not need quotes. For example:
foobar
baz
basil
Example Usage:
container_name in foobar baz basil
program_name==/bin/sh c. Hex String A hex string represents a string of only hexidecimal characters. It can be either 64 characters or 12 characters long. It is used to represent UUIDs that are commonly SHA256 hashes such as container IDs, image IDs, and sensor IDs. If a short form is specified only the first 12 characters of the specified field will be compared. For example:
98e73918fad6ce45d2f84f76b0e61d2bf789fe6cda74b2418-4918133c3a32863 0d76a2a9ede1
Example Usage:
sensor_id in 0d76a2a9ede1 7ef86f8e8b85
container_id==0d76a2a9ede1 d. FLOAT64

The FLOAT64 type represents a 64-bit signed floating point number. It is used only with the alert confidence field. All operators are valid for the float. For example:
3.145962
Example Usage:
confidence >=0.95 and confidence <0.971245 e. Integer

The integer type represents a 64-bit integer. This is used only for the priority field. Additionally there are special keywords such as LOW, MEDIUM, and HIGH which represent 1, 2, and 3.
Example Usage:
priority in HIGH LOW
priority <HIGH 2. Operators in: The "in" operator tests whether the Alert field's value is in the specified list of values. Example Usage:
priority in HIGH LOW
sensor_id in 0d76a2a9ede1 7ef86f8e8b85 not_in: The "not_in" operator tests whether the Alert field's value is not in the specified list of values. Example Usage:
sensor_id not_in 0d76a2a9ede1 7ef86f8e8b85

==: The equality operator ("==") tests whether the Alert field's value is equal to the specified value. Example Usage:
program_name==/bin/zsh !=: The negative equality operator ("!=") tests whether the Alert field's value is not equal to the specified value. Example Usage:
container_name !=steve >: The greater than operator (">") tests whether the Alert field's value is greater than the value specified. Example Usage:
priority >1
priority >LOW >=: The greater than or equal operator (">=") tests whether the Alert field's value is greater than or equal to the value specified. Example Usage: confidence >=0.90

<: The less than operator ("<") tests whether the Alert field's value is less than the value specified. Example Usage:
priority <3
priority <HIGH
confidence <0.942

<=: The less than or equal operator ("<=") tests whether the Alert field's value is less than or equal to the value specified. Example Usage:
priority <=2
priority <=MEDIUM
confidence <=0.942

OR: The OR operator joins two rules together into a single rule. This requires that one of the rules is joined by the OR operator to evaluate to true. Example Usage:
container_name==steve or priority >LOW AND: The AND operator joins two or more rules together into a single rule. This requires that all of the rules joined by the AND operator evaluate to true. Example Usage:
container_name==load_balancer:3.8 and priority >LOW VIII. Query API In various embodiments, platform 100 provides a query API. The query API can be used for a variety of purposes, such as providing more context around Alerts in the form of high-level Events (also referred to herein as MetaEvents), providing a mechanism that an operator can use to see high-level Events leading up to an Alert, providing a mechanism for an operator to query other monitored hosts for MetaEvents, and to allow Sensors (e.g., Sensor 112) to stay within their performance budgets.

Figure 28A:
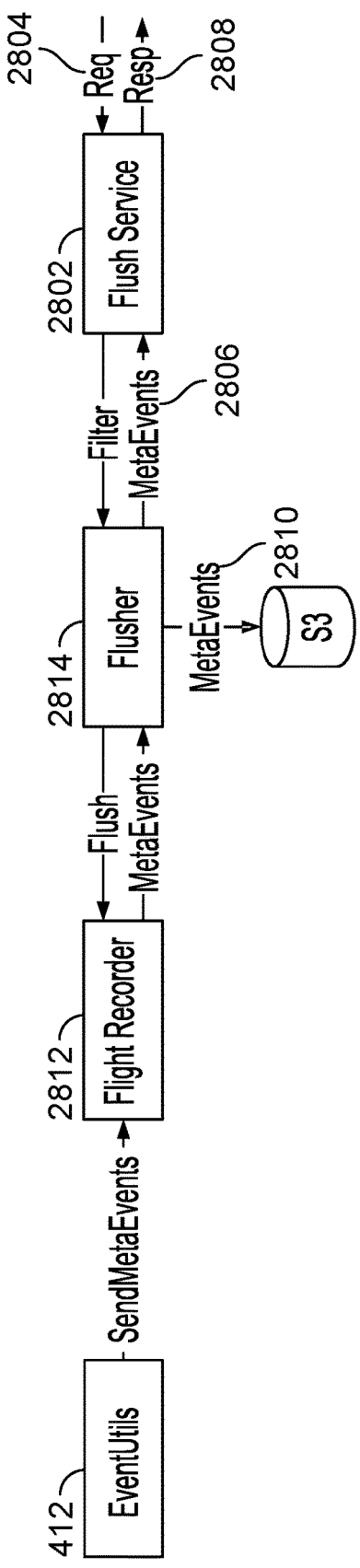
FIG. 28A illustrates an embodiment of a Sensor.

FIG. 28A illustrates an embodiment of a Sensor (e.g., Sensor 112). Flush service 2802 is responsible for starting a gRPC stream to flush Sensors for MetaEvents (e.g., as request 2804, that opens the gRPC stream). MetaEvents can be flushed as a "response," (2806, 2808) and/or flushed to an external mount (e.g., an S3 bucket 2810) depending on Sensor configuration. Flight recorder 2812 is a ring buffer configured to hold a specified size limit of MetaEvents. Each entry in the Flight Recorder holds the following fields: Timestamp, EventType, and Payload. The Payload comprises Flatbuffer-encoded MetaEvents. Flusher 2814 is responsible for deciding where to flush the Extracted MetaEvents from flight recorder 2812.

Figure 28B:
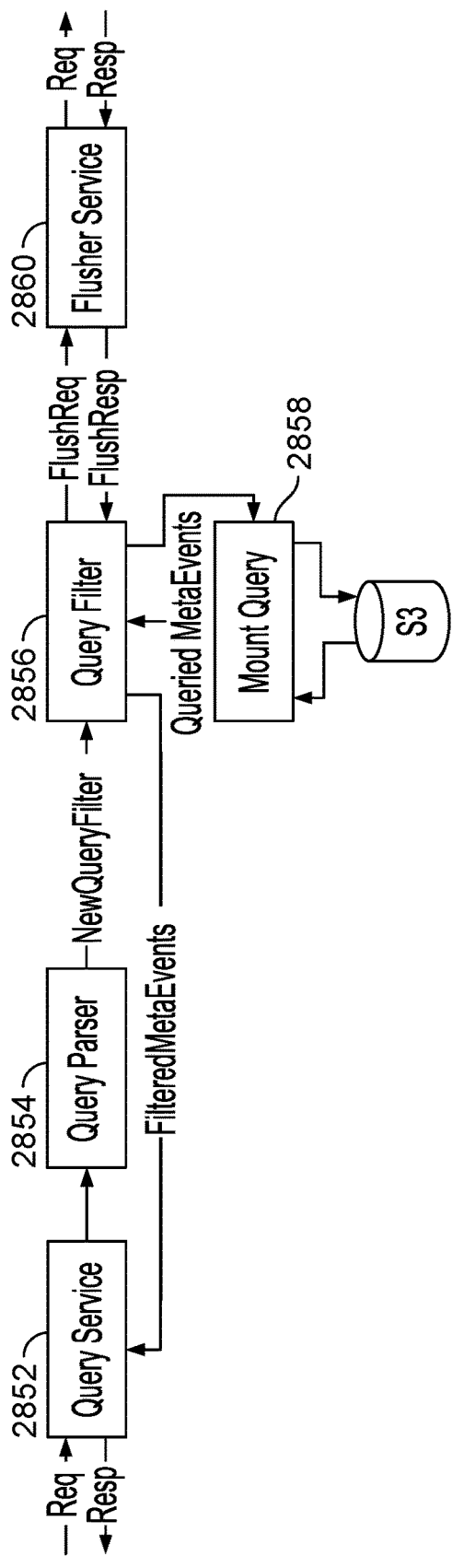
FIG. 28B illustrates an embodiment of a security server.

FIG. 28B illustrates an embodiment of a security server (e.g., security server 110). Query service 2852 is responsible for handling requests to filter MetaEvents from Clients (e.g., via CLI 124 or Console 122). Filtering is applied for a specified time range and supplied NYQL query string. Query Parser 2854 is configured to parse the Query Statement using NYQL's syntax and create/execute a Query Filter 2856 using the parsed Query data. The Query Filter component is responsible for figuring out to which Sensors the flush should be sent, filtering flushed MetaEvent responses, and determining if Mount Query component 2858 is needed. Mount Query component 2858 is responsible for querying a mounted drive (e.g., S3) for a dump of MetaEvents. Flusher service 2860 contains the gRPC Streaming endpoint for flushing flight recorder 2812. The flush request starts a stream and receives a StartTime, EndTime, and EventType.

Figure 29A:
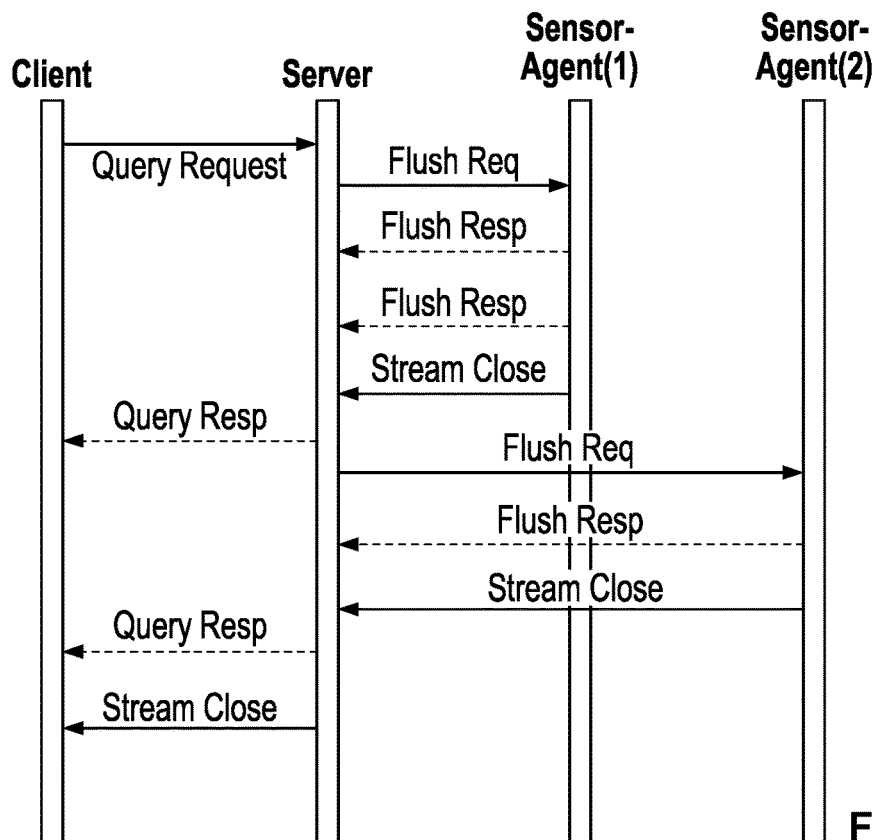
FIG. 29A illustrates an example flow of requests and responses.

FIG. 29A illustrates an example flow of requests and responses used in a scenario where no mount is configured for Sensors to store MetaEvents.

Figure 29B:
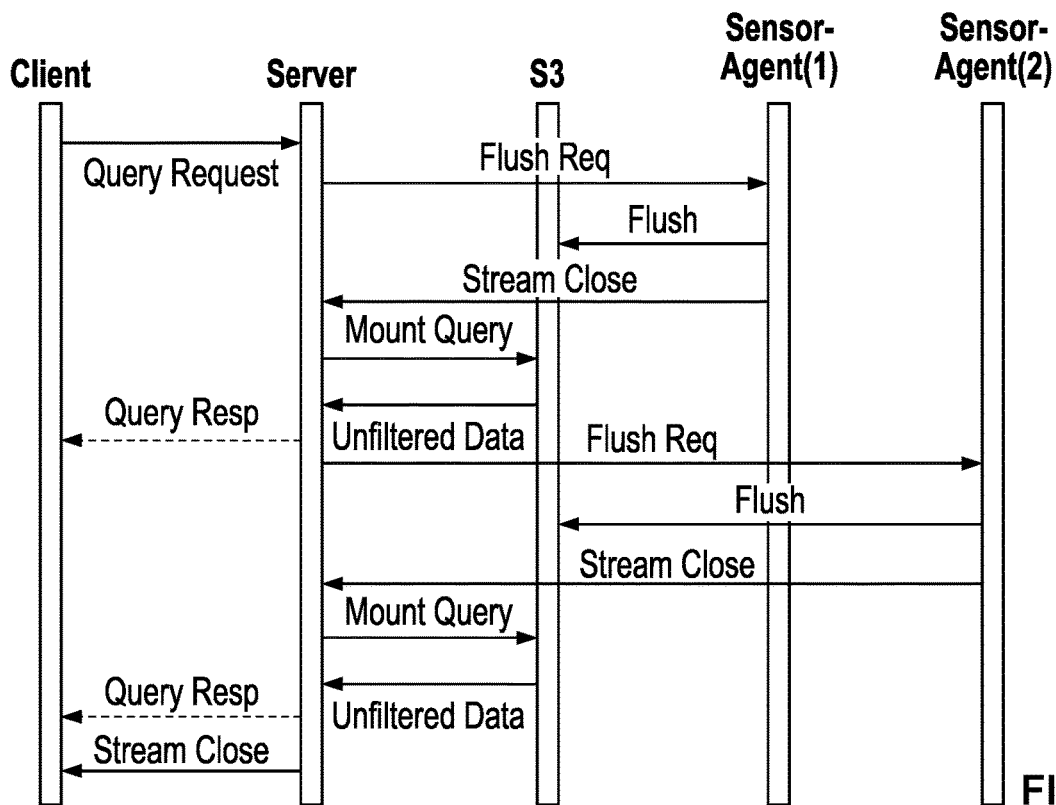
FIG. 29B illustrates an example flow of requests and responses.

FIG. 29B illustrates an example flow of requests and responses used in a scenario where there is a mount configured for Sensors to store MetaEvents. In this configuration, an S3 mount is used as the external MetaEvent store.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      receive information associated with a process;
      use at least a portion of the received information to modify a Process Tree, wherein modifying the Process Tree includes at least one of: (1) adding a Tag to the Process Tree, including by adding a new authorized heir Tag to the Process Tree in response to determining that an original authorized shell process is still alive, and (2) modifying a Tag in the Process Tree;
      return a NIL in response to determining that the original authorized shell process is dead; and
      generate an Alert, based at least in part in response to determining that a Strategy has been matched; and
   a memory coupled to the processor and configured to provide the processor with instructions.

2. The system of claim 1, wherein the received information indicates that the process has been forked.

3. The system of claim 1, wherein the received information indicates that the process has been initialized.

4. The system of claim 1, wherein the received information indicates that the process has been exited.

5. The system of claim 1, wherein, in response to receiving the information, the processor is configured to determine whether any Tags are associated with the process.

6. The system of claim 5, wherein the processor is further configured to determine whether any Tags determined to be associated with the process expect to have a callback associated with an Event.

7. The system of claim 1, wherein the information includes a change to at least one of a UID and a GID.

8. The system of claim 1, wherein the Alert indicates that an insecure privilege escalation has occurred.

9. The system of claim 1, wherein the Alert indicates an original user that is different from a user currently associated with the process.

10. The system of claim 1, wherein the Process Tree uses a timeout-driven hash map.

11. The system of claim 1, wherein the information is received from a sensor executing in a user space without kernel modification.

12. The system of claim 1, wherein the information is read out of a ring buffer.

13. The system of claim 1, wherein the processor is further configured to propagate an Alert group to children of the process.

14. The system of claim 1, wherein the Strategy comprises a cross-node Strategy.

15. The system of claim 1, wherein the Alert includes a lineage associated with the process.

16. The system of claim 1, wherein, in response to the Alert being generated, a remedial action is taken.

17. The system of claim 16, wherein the remedial action includes contacting a user associated with the process.

18. A method, comprising:
   receiving information associated with a process;
   using at least a portion of the received information to modify a Process Tree, wherein modifying the Process Tree includes at least one of: (1) adding a Tag to the Process Tree, including by adding a new authorized heir Tag to the Process Tree in response to determining that an original authorized shell process is still alive, and (2) modifying a Tag in the Process Tree;
   returning a NIL in response to determining that the original authorized shell process is dead; and
   generating an Alert, based at least in part in response to determining that a Strategy has been matched.

19. The method of claim 18, wherein the received information indicates that the process has been forked.

20. The method of claim 18, wherein the received information indicates that the process has been initialized.

21. The method of claim 18, wherein the received information indicates that the process has been exited.

22. The method of claim 18, further comprising, in response to receiving the information, determining whether any Tags are associated with the process.

23. The method of claim 22, further comprising determining whether any Tags determined to be associated with the process expect to have a callback associated with an Event.

24. The method of claim 18, wherein the information includes a change to at least one of a UID and a GID.

25. The method of claim 18, wherein the Alert indicates that an insecure privilege escalation has occurred.

26. The method of claim 18, wherein the Alert indicates an original user that is different from a user currently associated with the process.

27. The method of claim 18, wherein the Process Tree uses a timeout-driven hash map.

28. The method of claim 18, wherein the information is received from a sensor executing in a user space without kernel modification.

29. The method of claim 18, wherein the information is read out of a ring buffer.

30. The method of claim 18, further comprising propagating an Alert group to children of the process.

31. The method of claim 18, wherein the Strategy comprises a cross-node Strategy.

32. The method of claim 18, wherein the Alert includes a lineage associated with the process.

33. The method of claim 18, wherein, in response to the Alert being generated, a remedial action is taken.

34. The method of claim 33, wherein the remedial action includes contacting a user associated with the process.

35. A computer program product embodied in a non-transitory computer readable storage medium and comprising computer instructions for:

receiving information associated with a process;

using at least a portion of the received information to modify a Process Tree, wherein modifying the Process Tree includes at least one of: (1) adding a Tag to the Process Tree, including by adding a new authorized heir Tag to the Process Tree in response to determining that an original authorized shell process is still alive, and (2) modifying a Tag in the Process Tree;

returning a NIL in response to determining that the original authorized shell process is dead; and generating an Alert, based at least in part in response to determining that a Strategy has been matched.

\* \* \* \* \*